(12) United States Patent
Noyes et al.

(10) Patent No.: US 12,526,504 B2
(45) Date of Patent: Jan. 13, 2026

(54) MODULAR ENDOSCOPE ASSEMBLY

(71) Applicant: ResnENT, LLC, Bloomington, IL (US)

(72) Inventors: Willard S. Noyes, Bloomington, IL (US); Benjamin Joseph Gray, Portland, ME (US)

(73) Assignee: RESNENT, LLC, Bloomington, IL (US)

( * ) Notice: Subject to any disclaimer, the term of this patent is extended or adjusted under 35 U.S.C. 154(b) by 0 days.

(21) Appl. No.: 18/963,351

(22) Filed: Nov. 27, 2024

(65) Prior Publication Data

US 2025/0175690 A1    May 29, 2025

Related U.S. Application Data

(60) Provisional application No. 63/604,071, filed on Nov. 29, 2023.

(51) Int. Cl.
  *A61B 1/00* (2006.01)
  *A61B 1/05* (2006.01)
  (Continued)

(52) U.S. Cl.
  CPC ......... *H04N 23/555* (2023.01); *A61B 1/0005* (2013.01); *A61B 1/00066* (2013.01);
  (Continued)

(58) Field of Classification Search
  CPC ............... A61B 1/00105; A61B 1/053; A61B 1/00066; A61B 1/00124; A61B 1/0676;
  (Continued)

(56) References Cited

U.S. PATENT DOCUMENTS 6,432,046 B1 * 8/2002 Yarush ............. A61B 1/07
                                                  600/179
6,623,500 B1 * 9/2003 Cook ............ A61B 18/1402
                                                  702/106
(Continued)

FOREIGN PATENT DOCUMENTS

DE   102010034623 A1   2/2012
EP       3146927 A1    3/2017
WO   WO 2022/003569 A1  1/2022

OTHER PUBLICATIONS

Witt et al., "Types of Sialendoscopes and Accessories-Diagnostic Sialendoscopy: Polydiagnost Modular Endoscope," Surgery of the Salivary Glands (2021), 7 pages.
(Continued)

*Primary Examiner* — Anh Tuan T Nguyen
*Assistant Examiner* — Shankar Raj Ghimire
(74) *Attorney, Agent, or Firm* — Sheppard, Mullin, Richter & Hampton LLP

(57) ABSTRACT

The technology described herein is directed toward a detachable, powered, modular endoscope system with interconnected components and coupling mechanisms that enable power or data signal connectivity between many different detachable instruments, devices, and endoscope shaft variations. In some implementations, an endoscope assembly includes: an endoscope housing comprising first circuitry configured to receive one or more data signals, and second circuitry configured to supply power; and a rigid attachment segment distally extending from the endoscope housing, the rigid attachment segment including: third circuitry configured to electrically couple the rigid attachment segment to the first and second circuitry of the endoscope housing, and one or more surfaces configured to be removably, mechanically, and electrically coupled to an instrument, adapter, or cable, the instrument, adapter, or cable configured to receive
(Continued)

power from the endoscope housing or transmit data signals to the endoscope housing when electrically coupled to the one or more surfaces.

27 Claims, 55 Drawing Sheets

(51) Int. Cl.
    *A61B 1/06*     (2006.01)
    *A61B 17/00*     (2006.01)
    *A61B 17/29*     (2006.01)
    *H04N 7/18*     (2006.01)
    *H04N 23/50*     (2023.01)
    *H04N 23/51*     (2023.01)

(52) U.S. Cl.
    CPC ...... *A61B 1/00105* (2013.01); *A61B 1/00124* (2013.01); *A61B 1/053* (2013.01); *A61B 1/0676* (2013.01); *A61B 17/29* (2013.01); *H04N 7/185* (2013.01); *H04N 23/51* (2023.01); *A61B 1/00114* (2013.01); *A61B 2017/00296* (2013.01); *A61B 2017/0046* (2013.01)

(58) Field of Classification Search
    CPC ................ A61B 17/29; A61B 1/00114; A61B 2017/00296; A61B 2017/0046; H04N 23/555; H04N 7/185; H04N 23/51
    See application file for complete search history.

(56) References Cited

U.S. PATENT DOCUMENTS

| | | | | |
|---|---|---|---|---|
| 7,828,720 | B2* | 11/2010 | Miller | A61B 17/32053 |
| | | | | 600/117 |
| 8,419,623 | B2 | 4/2013 | Garcia et al. | |
| 8,460,182 | B2* | 6/2013 | Ouyang | A61B 1/053 |
| | | | | 600/156 |
| 8,920,309 | B2 | 12/2014 | Boulnois et al. | |
| 8,992,424 | B2* | 3/2015 | Orbay | A61B 1/00105 |
| | | | | 600/183 |
| 9,107,573 | B2* | 8/2015 | Birnkrant | A61B 1/00066 |
| 9,161,769 | B2 | 10/2015 | Stoddard et al. | |
| 9,386,914 | B2* | 7/2016 | Birnkrant | A61B 1/00105 |
| 9,717,399 | B2 | 8/2017 | Newman | |
| 10,512,391 | B2* | 12/2019 | Noyes | A61B 1/00114 |
| 10,674,897 | B2 | 6/2020 | Levy | |
| 11,291,357 | B2 | 4/2022 | Levy et al. | |
| 2005/0191046 | A1 | 9/2005 | Dehmel et al. | |
| 2007/0106119 | A1* | 5/2007 | Hirata | G02B 23/2423 |
| | | | | 600/179 |
| 2008/0188848 | A1* | 8/2008 | Deutmeyer | A61B 18/1485 |
| | | | | 606/45 |
| 2008/0195128 | A1* | 8/2008 | Orbay | A61B 1/00048 |
| | | | | 600/183 |
| 2008/0300456 | A1* | 12/2008 | Irion | A61B 1/0607 |
| | | | | 600/109 |
| 2011/0306834 | A1* | 12/2011 | Schrader | G02B 23/2484 |
| | | | | 600/109 |
| 2012/0224047 | A1 | 9/2012 | Schneider et al. | |
| 2014/0107416 | A1* | 4/2014 | Birnkrant | A61B 1/00124 |
| | | | | 600/110 |
| 2018/0206707 | A9 | 7/2018 | Ouyang et al. | |
| 2018/0256009 | A1 | 9/2018 | Ouyang et al. | |
| 2018/0303314 | A1* | 10/2018 | Noyes | A61B 1/00066 |
| 2018/0326144 | A1 | 11/2018 | Truckai | |
| 2019/0313881 | A1* | 10/2019 | Francher | A61B 1/00052 |
| 2019/0374095 | A1* | 12/2019 | Lord | A61B 1/00121 |
| 2020/0178993 | A1* | 6/2020 | Ebrahimi | A61B 17/24 |
| 2020/0397232 | A1* | 12/2020 | Ulmschneider | A61B 1/00018 |
| 2021/0169310 | A1* | 6/2021 | Hsia | A61B 1/00124 |
| 2021/0338052 | A1 | 11/2021 | Ouyang et al. | |
| 2022/0117465 | A1* | 4/2022 | Noyes | A61B 1/00073 |
| 2022/0192471 | A1 | 6/2022 | Levy et al. | |
| 2023/0124488 | A1 | 4/2023 | Noyes | |
| 2023/0200659 | A1* | 6/2023 | Hsia | A61B 1/00105 |
| | | | | 600/473 |

OTHER PUBLICATIONS

International Search Report and Written Opinion mailed Feb. 8, 2023 for International Application No. PCT/US2022/046914, filed Oct. 17, 2022.
Invitation to Pay Additional Fees dated Feb. 19, 2025 for International Application No. PCT/US2024/057901.
International Search Report & Written Opinion dated Apr. 9, 2025 for International Application No. PCT/US2024/057901.

\* cited by examiner

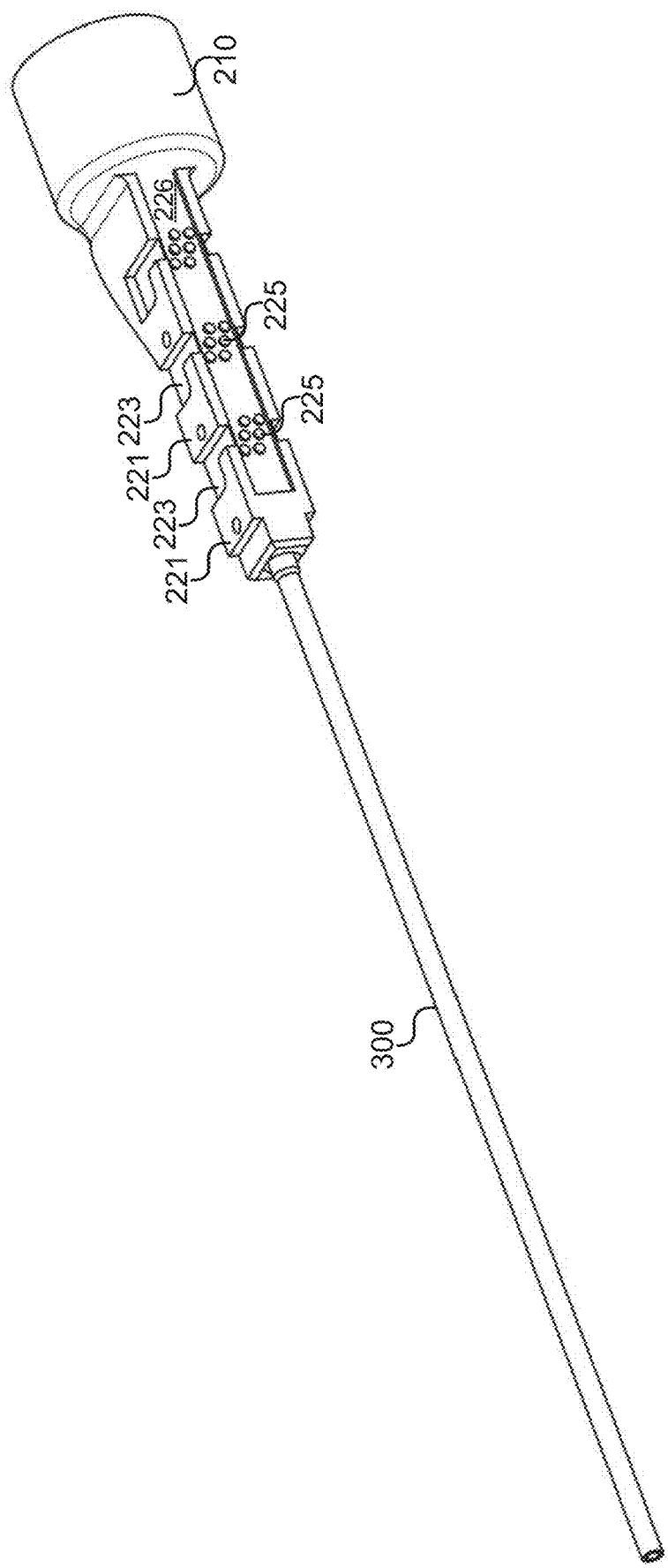

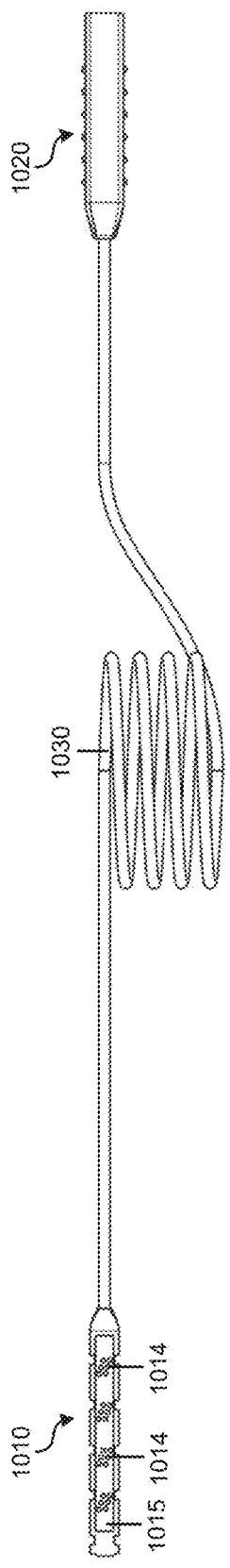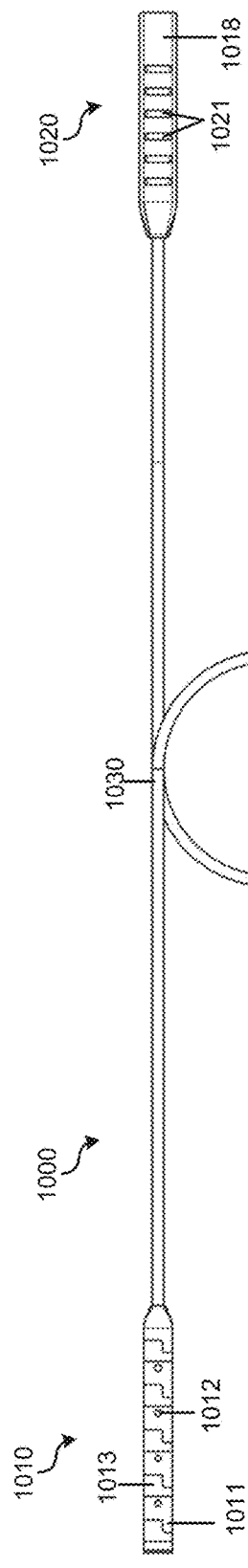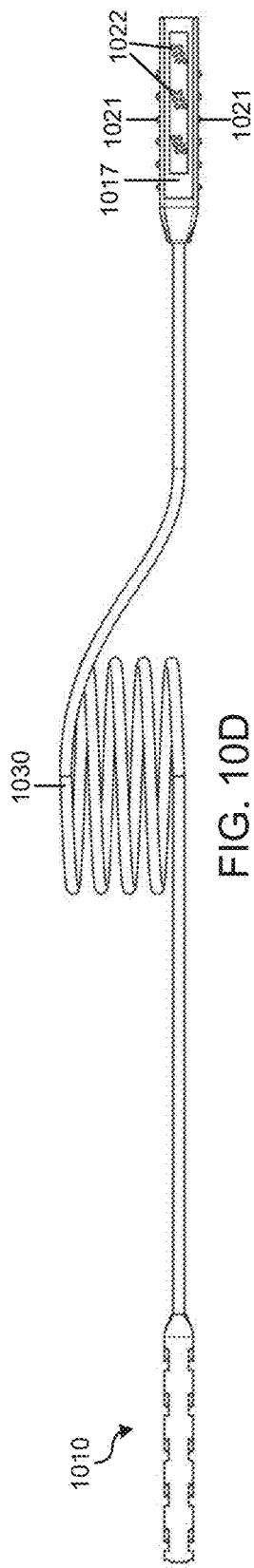

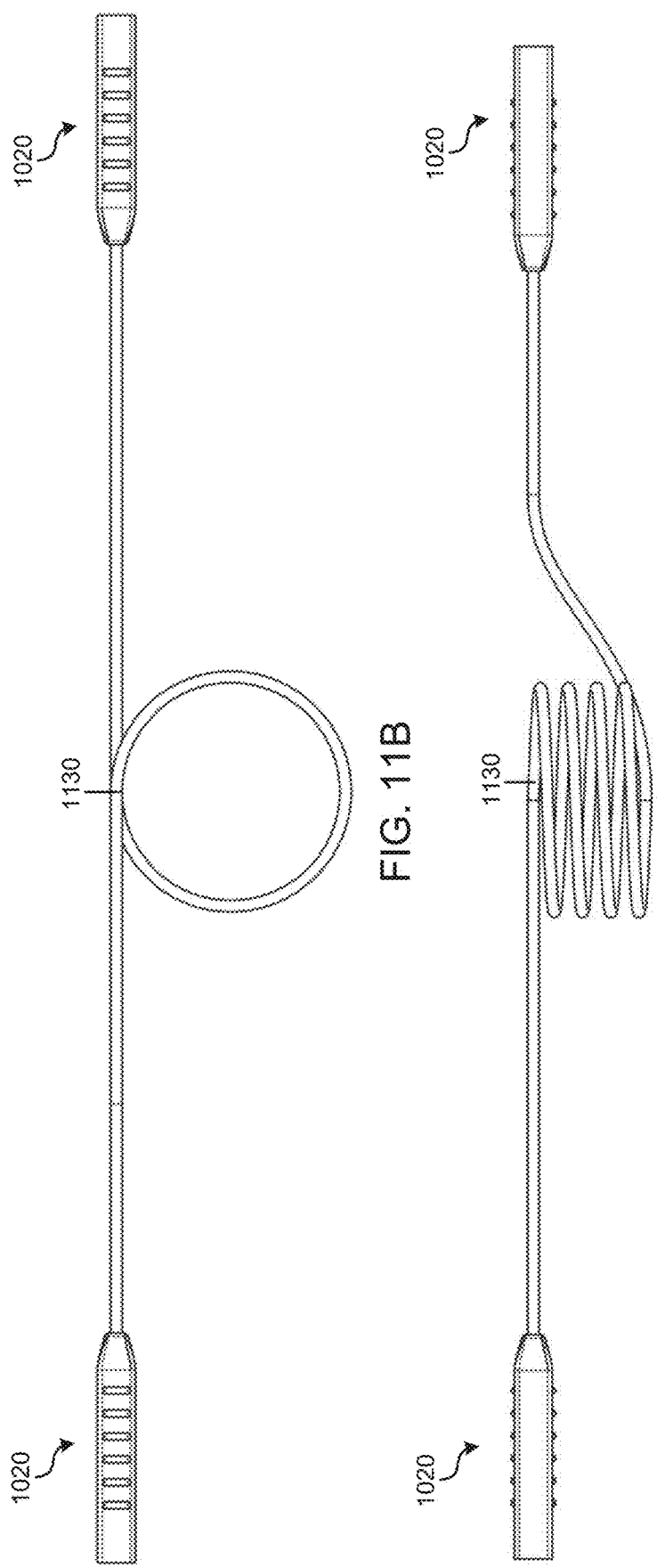
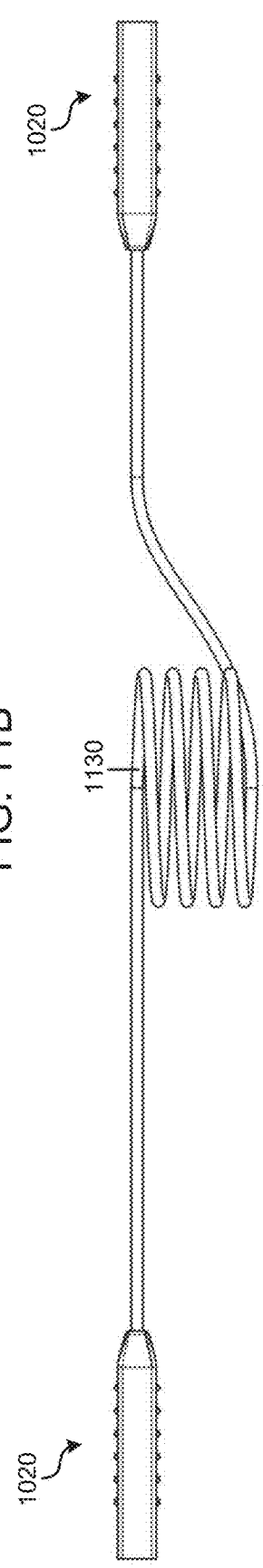
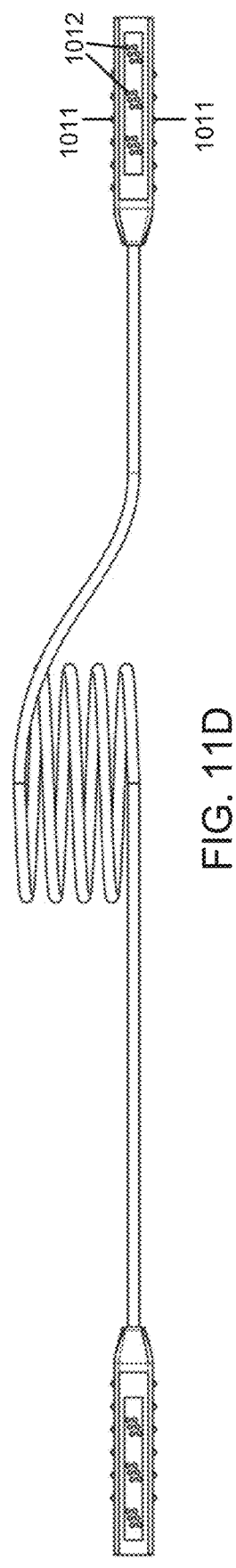
FIG. 11B
FIG. 11C
FIG. 11D

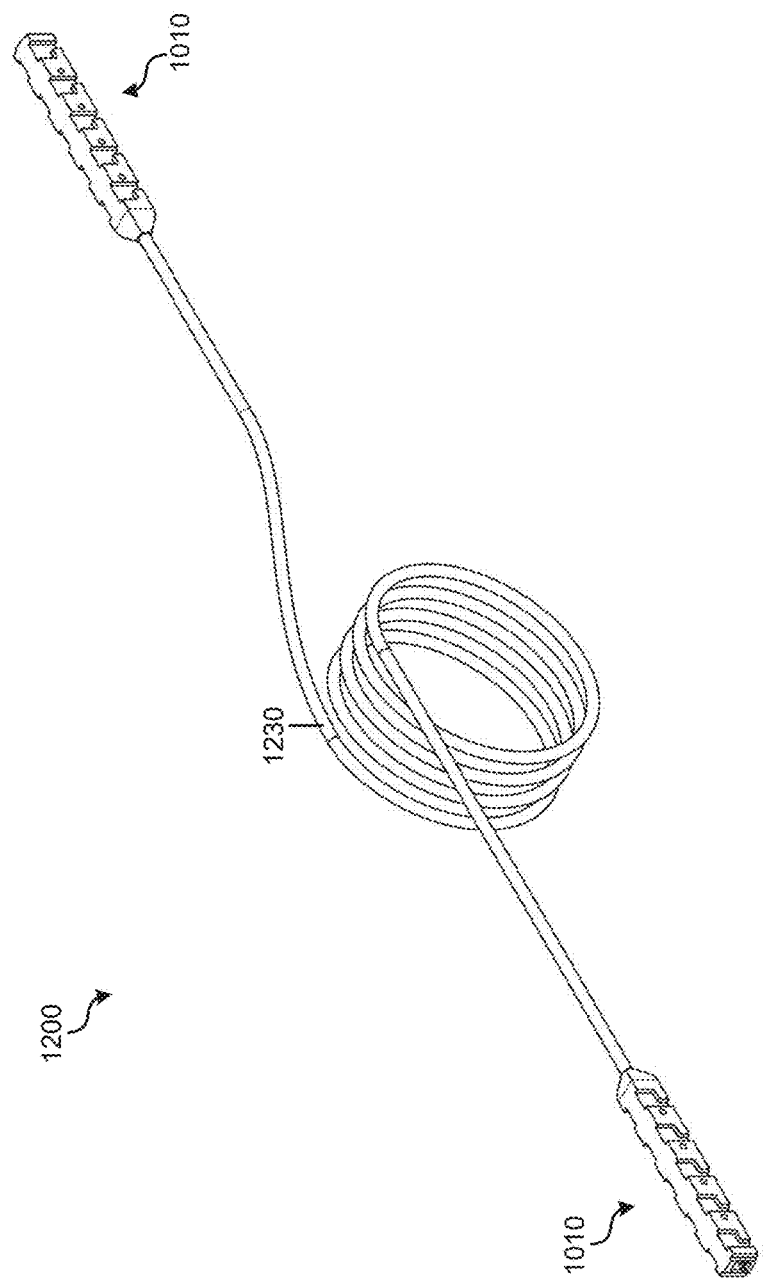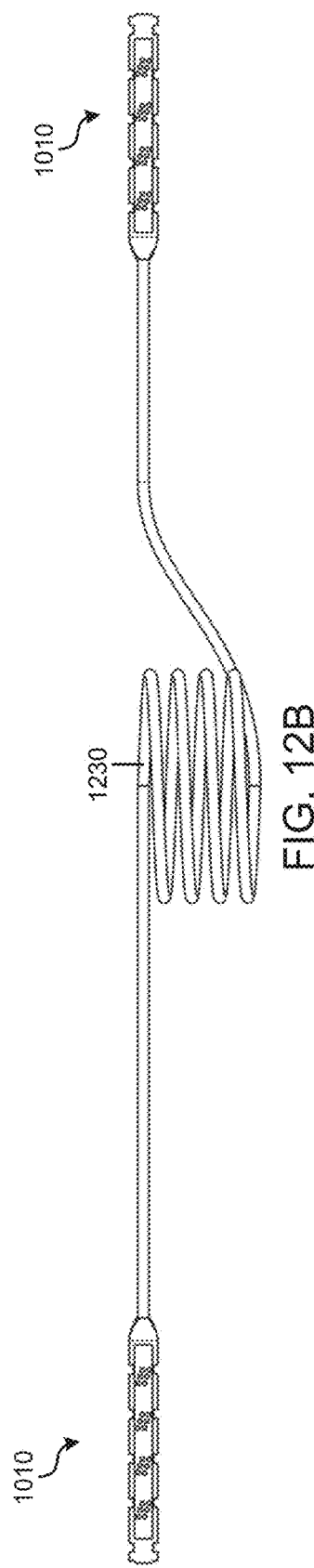
FIG. 12A
FIG. 12B

MODULAR ENDOSCOPE ASSEMBLY

CROSS-REFERENCE TO RELATED APPLICATIONS

The present application claims the benefit of U.S. Provisional Patent Application No. 63/604,071 filed on Nov. 29, 2023, and titled "MODULAR ENDOSCOPE ASSEMBLY," which is incorporated herein by reference in its entirety.

BACKGROUND

Functional endoscopic sinus surgery (FESS) is recognized as the gold standard for management of paranasal sinus disease. Over the past 30 years, advances in surgical endoscope technology have led to improvements in endoscope design, miniaturization, and image resolution. Currently there are many different types of nasal endoscopes on the market including rigid and flexible versions. Some endoscopes utilize fiberoptic bundles for both light and image transfer while other endoscopes may incorporate light emitting diodes (LEDs) for anatomic lighting and distal CMOS sensors for image capture or any combination thereof.

Surgical endoscopes are also used in other medical and surgical specialties including but not limited to gastroenterology, pulmonary, critical care, OB/GYN, urology, general surgery, neurosurgery, and anesthesia. Through improvements in circuitry design and manufacturing, high resolution CMOS sensors continue to get smaller and cheaper while maintaining an ever-improving pixel resolution. Image resolution for endoscopes that incorporate CMOS sensors depends not only on the size of the CMOS pixel array but also on the amount of light delivered to the anatomic field. Generally, the smaller the CMOS chip, the more light is required to maintain optimal image quality. Endoscopes emit light through the tip of the endoscope either via an LED located at the distal tip of the endoscope adjacent to the CMOS sensor or by optical fibers that carry light from a more proximal LED or halogen light source to the endoscope tip.

An endoscope shaft may contain multiple components within its circular walls. For instance, some surgical endoscopes contain only optical fibers for image capture and light delivery. Some of the smallest <=1 mm fiber scopes on the market utilize these types of coherent fiber bundles (~10,000 fibers). Early flexible laryngoscopes contained optical/light fibers and articulation wires to allow for manual articulation of the distal endoscope shaft. Newer and larger endoscopes however may include any combination of single or multiple working instrument channels, suction channels, irrigation channels, CMOS sensors, LEDs, electrical wires, optical/laser fibers, articulation wires, etc.

Traditional fiberoptic endoscopes lose resolution as the diameter of the endoscope decreases because resolution is dependent on the number of coherent optical fibers contained within the endoscope shaft. Conversely, the resolution of CMOS "chip in the tip" endoscopes is limited by the number of pixels each chip can process. Generally speaking, the larger the size of the CMOS sensor, the more pixels it can process. As technology improves, manufacturers can pack more pixels into a smaller CMOS sensor footprint. As CMOS sensors continue to miniaturize, it would stand to reason that endoscope shafts will be made smaller without loss of image resolution, so long as light output remains adequate.

The method of distal endoscope light emission contributes to endoscope shaft diameter. Much like CMOS sensor technology, light emitting diodes (LEDs) are being made smaller and brighter, but when an LED is placed adjacent to a CMOS sensor at the tip of the endoscope, the resultant shaft/tip diameter is naturally larger than what could be achieved by the CMOS sensor alone. Utilizing optical fibers for light delivery allows for a smaller footprint surrounding a distal CMOS sensor when compared to an LED light source. As an example, when a CMOS sensor that is 0.55 mm is combined with light fibers and external shaft sheathing, an endoscope shaft as small as 1 mm can be produced. Light fibers however are still space occupying, more expensive to manufacture, and more susceptible to breakage with overbending and external trauma when compared to an LED.

Noyes (U.S. Pat. Nos. 10,512,391, 10,925,467, 11,478,130, 11,529,040) describes a portable hybrid endoscope system encompassing a reusable hybrid flexible/rigid endoscope capable of attaching to a multitude of surgical instrument devices. In this system, the endoscope housing can contain an internal LED that transmits light through optical light fibers to the endoscope tip. The housing also can contain circuitry that receives image data from a distal CMOS chip and transmits it via a detachable cable to an external control box comprising a rechargeable energy source and image processor with wireless functionality. Anticipated embodiments of Noyes' system allow for detachable endoscope shafts that connect to the endoscope housing via a coupling mechanism located near the proximal segment of the endoscope shaft and distal endoscope housing. This coupler can link the wires from one or more image sensors, as well as the lighting and electrical elements. For instance, some detachable endoscope shafts may have an LED at the tip of the endoscope shaft while other detachable shafts may have optical light fibers that receive light from an LED located within the endoscope housing.

Until recently, medical and surgical endoscopy has limited the operator to work small instrument forceps passed through a tiny working channel contained within the endoscope shaft. Newer options allow for attaching the endoscope to the outside of an instrument, but visualization of the tool tip still requires the endoscope shaft to ride piggyback along the instrument shaft, thereby increasing the vertical height and thickness of the combined shafts. Certain anatomic spaces require a much smaller endoscope/instrument footprint and much tighter endoscope shaft bending radius. In these instances, standard flexible endoscopes, although useful for visualization, still require two hands to operate, making it hard to free up a hand to work an instrument through a channel. Surgical robotics is beginning to overcome some of these inefficiencies, but the cost for surgical robotic systems is quite prohibitive especially for rural hospitals or in countries with limited funding and resources. Robotic instrumentation is generally not shared across platforms from different manufacturers. In addition, robotic systems are not used by most surgeons and require separate training and a steep learning curve to become proficient. Surgical time slots for surgeons to access robotic systems is also limited since most hospitals have only one robot.

As medical device technology advances, so does the number of device consoles required to run the devices. Rarely are device consoles interchangeable between instruments performing different functions or produced by different companies. For instance, an otolaryngologist in a typical surgery requires separate device consoles for a video camera, video light source, video recording module, endoscopic video monitors, image guidance computer and monitor, electrocautery machine, coblation device, suction machine, suction/irrigation pumps, headlight stand, anesthesia video laryngoscope stand, and microdebrider machine. Each of these carts and consoles takes up valuable operating room space and each comes with its own set of electrical cords, grounding wires, video cables, suction hoses, foot pedals, and irrigation tubing. Each console must be tended to by a staff member knowledgeable and proficient in the setup and functionality of each device. Staff shortages and staff turnover make it increasingly difficult to manage all of these devices in a time-efficient and cost-saving manner. In certain orthopedic cases for instance, very small diameter arthroscopes are being used, but these scopes require their own video monitor and electrical cables. The anesthesiologist may require a video laryngoscope which requires a separate monitor, and there is another video monitor and camera system on standby in the event a larger arthroscope is ultimately required. All in all, three separate video enabled systems are required for the same procedure.

As a result of increasing healthcare costs, greater emphasis is being placed on methods and devices that permit surgeries to be performed in-office as opposed to surgeries performed in the hospital or ambulatory surgical setting. A surgeon who wishes to perform surgeries in the office cannot afford to purchase all of the equipment found in the ASC or hospital setting. Office space and resources are limited and there is a need for systems that lessen the cost and complexities associated with in-office surgical procedures. The system disclosed herein minimizes these costs by condensing the number of device consoles, wires, and instrumentation into a much more streamlined and convenient surgical endoscopy system.

SUMMARY

As used herein to describe an instrument including a "tool portion" and "handle portion", the term "tool portion" refers to the portion of the instrument other than the "handle portion" of the instrument. For example, the tool portion of an instrument can include the instrument shaft, the instrument tool for examining or operating on an anatomical site, and/or associated components of the shaft and tool.

As used herein, when two devices are "optically coupled" or "optically connected", this is intended to refer to one device being adapted to impart light to the other device directly or indirectly (e.g., via a cable connector).

More and more intraoperative, optically-enabled instruments are being introduced into the marketplace. Inventing a modular surgical system that can be shared by various devices across multiple platforms by physicians of different medical and surgical disciplines would allow for simplified use, easier setup, less clutter, and universal interchangeability of components. The technology described herein is directed toward a detachable, powered, modular endoscope system with interconnected components and coupling mechanisms that enable power and/or image signal connectivity between a variety of detachable instruments, devices, and endoscope shaft variations. In addition to electrical power and image signal transmission, modular connectivity could also be provided for various sensors including, pH, manometry, oxygen sensors, and ultrasound probes. Further connectivity might involve therapeutic and ultraviolet light delivery, electrosurgical capabilities, communication and control functionality, etc. In accordance with example embodiments described in the present disclosure, multiple devices can connect through a single or multiple endoscope housings. By connecting to various adapters and cable assemblies, the same endoscope housing can provide electrical power and optical connections to a detachable endoscope shaft while simultaneously permitting electrical power and/or image signal transmission between one or more additional powered or optically enabled instruments. Devices could be connected serially or in parallel with other devices all linked to one another and sharing the same power source, data, electrical, and optical connectivity. By virtue of the modular endoscopic systems described herein, multiple medical devices, including three or more medical devices, could be daisy chained together.

The modular components of the endoscope system, including the endoscope housing, may be reusable and easy to clean and sterilize. Conversely, endoscope housings, certain adapters, cables, and various attachable devices may be single-use and disposable. In addition, the various components described herein can be connected utilizing a universal connection mechanism that easily adapts to multiple devices thus increasing user and staff familiarity with the system. By condensing the number of device consoles, wires, and instrumentation into a much more streamlined and convenient surgical endoscopy system, the technology described herein can also reduce the costs associated with in-office surgical procedures.

In implementations described herein, a battery-enabled, portable control box would contain circuitry for powering the system and processing the received electrical and optical data from the attached devices and/or endoscope housing(s). The connection from the control box to the endoscope housing(s) could be provided via a single cable, thereby simplifying the system setup for surgical procedures. In other embodiments, multiple cable ports on the control box could receive multiple cables from multiple inputs depending on the device or application. Additional functions of the control box may include video/image capture, user input capability, data storage, wireless data and image transmission, computer docking capabilities, audible or vibratory outputs, and a self-contained video display. Depending on the number of CMOS or other data sensors transmitting data, the control box video display may have split screen capability.

As described herein, one embodiment of the system could permit an anesthesiologist to visualize and monitor vocal cord function on the portable control box display while the surgeon simultaneously operates an endoscope that wirelessly transmits separate video to a secondary external monitor. Certain embodiments described herein would permit power transfer to an LED and/or optical CMOS sensor placed at the tip of a secondary instrument such as a surgical forceps. Other lighted, optically enabled instrument embodiments might include, but are not limited to, surgical retractors, tongue blades, balloon catheters, stylets, ear specula, balloon cannulas, ear tube insertion devices, microdebrider blades, endotracheal tubes, tracheostomy tubes, nasogastric tubes, feeding tubes, ventricular shunts, etc.

An LED or fiberoptic light enabled instrument could contain multiple LEDs or fibers spaced together or separately on an instrument or placed circumferentially around the diameter of a cannula or ear speculum, thereby increasing light output. The lighted instrument could attach to a wire, device, or endoscope shaft having only a CMOS chip and no light capabilities. By separating the light source(s) from the optical chip, the diameter of the CMOS endoscope shaft/wire can be made significantly smaller while allowing greater light output for improved visualization. Multiple LEDs placed along an instrument shaft could provide more light than what could be achieved by LEDS or optical fibers confined to the tip of an endoscope shaft, therefore keeping the endoscope shaft diameter as small as possible. Having only one optical CMOS wire within the shaft could allow for a more acute bend radius of the shaft without worry of damaging optical or light emitting fibers. Having a smaller radius endoscope shaft could also lessen the vertical and horizontal measurement of a combined endoscope and instrument shaft inserted into a limited anatomic space.

By utilizing the systems described herein, patient comfort can be improved and there can be more space for other instrumentation within the same anatomic space. In addition to an LED or series of LEDs, the power received from the endoscope housing could also be used to drive a drill, burr, shaver blade, laser, pump, tactile vibrator, headlight, smart glasses, or any other conceivable device requiring a power source or CMOS sensor. It is envisioned that in some implementations, the control box would be capable of powering and receiving data from other sensor sources such as a pH probes, pressure sensors, radiofrequency transmitters, ultrasound arrays, thermal sensors, chemical sensors, light sensors, oxygen sensors, etc. Multiple cable ports, of different varieties could connect to the control box. In such implementations, information other than video image data could be processed and graphically presented on the control box display. As such, in addition to devices having optical functionality, there are many other potential applications of the system described herein.

In one embodiment, an endoscope assembly comprises: an endoscope housing comprising first circuitry configured to receive one or more data signals, and second circuitry configured to supply power; and a rigid attachment segment distally extending from the endoscope housing, the rigid attachment segment comprising: third circuitry configured to electrically couple the rigid attachment segment to the first and second circuitry of the endoscope housing, and one or more surfaces configured to be removably, mechanically, and electrically coupled to an instrument, adapter, or cable, the instrument, adapter, or cable configured to receive power from the endoscope housing or transmit data signals to the endoscope housing when electrically coupled to the one or more surfaces.

In some implementations, the one or more surfaces of the rigid attachment segment comprise a first surface configured to mechanically couple the rigid attachment segment to the instrument, the adapter, or the cable.

In some implementations, the one or more surfaces of the rigid attachment segment further comprise a second surface configured to electrically couple the rigid attachment segment to the instrument, the adapter, or the cable, the second surface comprising one or more electrical contacts configured to electrically couple to one or more corresponding electrical contacts of the instrument, the adapter, or the cable.

In some implementations, the one or more surfaces of the rigid attachment segment further comprise a third surface, opposite the first surface, the third surface configured to mechanically couple the rigid attachment segment to the instrument, the adapter, or the cable.

In some implementations, the first surface comprises a first groove and a first section adjacent the first groove, the first section protruding relative to the first groove and comprising a first recessed indentation or protrusion.

In some implementations, the first surface of the rigid attachment segment comprises multiple grooves and multiple sections alternating along a longitudinal length of the rigid attachment segment; each of the sections protrudes relative to the grooves and comprises a recessed indentation or protrusion; and the multiple sections and the multiple grooves are configured such that the instrument or the cable can be coupled to the rigid attachment segment in a plurality of lengthwise positions.

In some implementations, the endoscope housing comprises a distal connector; and the rigid attachment segment comprises a proximal connector configured to removably and electrically couple to the distal connector, the proximal connector including the third circuitry.

In some implementations, the endoscope assembly further comprises an endoscope shaft.

In some implementations, the endoscope shaft is fixed to a distal end of the rigid attachment segment.

In some implementations, the endoscope shaft is configured to detachably, mechanically, and electrically couple to a distal end of the rigid attachment segment.

In some implementations, the endoscope shaft comprises one or more sensors on a distal end of the endoscope shaft, the one or more sensors configured to generate the one or more data signals; and the endoscope shaft is configured to be electrically and mechanically coupled to the distal end of the rigid attachment segment such that the endoscope shaft transmits the one or more data signals to the first circuitry.

In some implementations, the endoscope shaft comprises one or more light emitting devices, and the second circuitry is configured to supply power to the one or more light emitting devices when the endoscope shaft is coupled to the distal end of the rigid attachment segment.

In some implementations, the rigid attachment segment is configured to detachably, mechanically, and electrically couple to a distal end of the endoscope housing.

In some implementations, a proximal end of the endoscope housing comprises a connector configured to mechanically and electrically couple the endoscope housing to a cable connector.

In some implementations, the rigid attachment segment is configured to detachably, mechanically, and electrically couple to a distal end of the endoscope housing.

In some implementations, the rigid attachment segment is integrated with a distal end of the endoscope housing.

In one embodiment, a modular endoscope attachment assembly comprises: an endoscope housing comprising first circuitry configured to supply power; a rigid attachment segment distally extending from the endoscope housing, the rigid attachment segment comprising: second circuitry configured to electrically couple the rigid attachment segment to the first circuitry of the endoscope housing, and one or more surfaces configured to be removably, mechanically, and electrically coupled to an instrument, adapter, or cable connector; and the instrument, wherein the instrument comprises a tool portion and a handle portion, the handle portion comprising one or more surfaces that removably, mechanically, and electrically couple to the rigid attachment segment, and the instrument configured to receive power from the endoscope housing or transmit data to the endoscope housing when electrically coupled to the one or more surfaces.

In some implementations, the one or more surfaces of the rigid attachment segment comprise a first surface including one or more first electrical contacts; and the one or more surfaces of the handle portion include one more second electrical contacts configured to engage the one or more first electrical contacts such that the instrument receives power from the endoscope housing or transmits data to the endoscope housing.

In some implementations, the one or more surfaces of the rigid attachment segment further comprise a second surface including a first protrusion and a second protrusion; and the one or more surfaces of the handle portion further comprise a first groove configured to engage the first protrusion, and a recessed indentation configured to engage the second protrusion.

In some implementations, the modular endoscope attachment assembly further comprises the cable connector, the cable connector including: a first connector end configured to removably, mechanically, and electrically couple to the one or more surfaces of the rigid attachment segment, the first connector end configured to receive power from the endoscope housing or transmit image data to the endoscope housing when electrically coupled to the one or more surfaces; a second connector end; and a cable connecting the first connector end and the second connector end, the cable including a power line between the first connector end and the second connector end.

In some implementations, the cable further includes a data line between the first connector end and the second connector end; and the first connector end is configured to receive power from the endoscope housing and transmit image data to the endoscope housing when electrically coupled to the one or more surfaces.

In some implementations, a tool portion of the instrument comprises one or more light emitting devices; and the one or more light emitting devices are configured to be powered when the handle portion is electrically coupled to the rigid attachment segment.

In some implementations, a tool portion of the instrument comprises one or more sensors; and the one or more sensors are configured to be powered when the handle portion is electrically coupled to the rigid attachment segment.

In some implementations, the one or more sensors are configured to transmit data to the endoscope housing when the handle portion is electrically coupled to the rigid attachment segment.

In some implementations, the one or more sensors comprise an image sensor configured to transmit image data to the endoscope housing when the handle portion is electrically coupled to the rigid attachment segment.

In some implementations, a distal end of the tool portion of the instrument comprises a tool configured to operate on or with an anatomical cavity; and the tool is configured to be powered when the handle portion is electrically coupled to the rigid attachment segment.

In some implementations, the modular endoscope attachment assembly further comprises an adapter that includes: a first portion configured to removably, mechanically, and electrically couple to the rigid attachment segment; and one or more other portions configured to removably, mechanically, and electrically couple to a connector end of the cable connector, an instrument connector, or to an outer surface of the handle portion.

In some implementations, the first portion of the adapter includes an open channel longitudinally extending along a length of the adapter; an interior surface of the open channel comprises one or more protrusions, and one or more first electrical contacts; the one or more surfaces of the rigid attachment segment comprise one or more grooves or recessed indentations, and one or more second electrical contacts; and the open channel is configured to removably, mechanically, and electrically couple to the rigid attachment segment by engaging the one or more protrusions with the one or more grooves or recessed indentations, and by engaging the one or more first electrical contacts with the one or second electrical contacts.

In some implementations, the one or more protrusions comprise a first protrusion that is spring-loaded and a second protrusion; the one or more grooves or recessed indentations comprise a first groove and a first recessed indentation; and the first protrusion is configured to engage the first recessed indentation, and the second protrusion is configured to engage the first groove.

In some implementations, the one or more other portions of the adapter comprise: a first surface configured to removably and mechanically couple the one or more other portions to the connector end of the cable connector, or to the outer surface of the handle portion, the first surface includes a first groove and a first section adjacent the first groove, the first section protruding relative to the first groove and comprising a first recessed indentation or protrusion; and a second surface configured to electrically couple the one or more other portions to the connector end of the cable connector, or to the outer surface of the handle portion, the second surface including one or more first electrical contacts configured to engage one or more second electrical contacts of the connector end of the cable connector, or a surface of the handle portion.

In some implementations, the modular endoscope attachment assembly further comprises a portable control box.

In some implementations, a proximal end of the endoscope housing comprises a first connector configured to receive a first end of a cable connector; the portable control box comprises a second connector configured to receive a second end of the cable connector; and when the cable connector is coupled to the portable control box and the endoscope housing, the portable control box is configured to supply power via the cable connector to the first circuitry of the endoscope housing.

In some implementations, the portable control box comprises one or more first ports configured to receive one or more data signals from the endoscope housing and to supply power to the endoscope housing.

In some implementations, the portable control box further comprises one or more second ports configured to receive a second end of a cable connector coupled to a second endoscope housing; and the one or more second ports are configured to receive one or more data signals from the second endoscope housing and to supply power to the second endoscope housing.

In some implementations, the portable control box is configured to output one or more display signals corresponding to first image data received via the one or more first ports and second image data received via the one or more second ports.

In some implementations, the one or more display signals comprise a split screen display signal including the first image data and the second image data.

In one embodiment, a system comprises: an endoscope housing comprising first circuitry configured to receive data signals from an instrument; and the instrument, wherein the instrument comprises a tool portion and a handle portion, the handle portion comprising one or more surfaces that removably, mechanically, and electrically couple to the endoscope housing, and the tool portion comprises one or more sensors electrically coupled to the handle portion and configured to transmit data to the endoscope housing.

In some implementations, the one or more sensors comprise an image sensor configured to transmit image data to the endoscope housing.

In some implementations, the instrument is a forceps instrument, the tool portion of the forceps instrument comprises a shaft, a distal part of the shaft is curved, and the image sensor is positioned on a backside of the distal part of the shaft.

In some implementations, the tool portion further comprises one or more light emitting devices electrically coupled to the handle portion; and the endoscope housing is configured to supply power to the one or more light emitting devices via the handle portion.

In some implementations, the endoscope housing comprises a distal connector segment comprising one or more first electrical contacts; and the handle portion comprises an instrument connector configured to removably, mechanically, and electrically couple to the distal connector segment, the instrument connector comprising one or more second electrical contacts configured to contact the one or more first electrical contacts to establish a data connection between the instrument and endoscope housing.

In one embodiment, a system comprises: an instrument configured to operate on or within an anatomical cavity, the instrument comprising: an image sensor configured to image the anatomical cavity; and a wire electrically coupling the image sensor to a first end of a cable connector; and the cable connector comprising the first end and a second end opposite the first end, the second end comprising a first connector configured to receive image data generated by the image sensor.

In some implementations, the instrument is a balloon dilator, a laryngeal mask, a microdebrider, an endotracheal tube, or an ear speculum.

In some implementations, the instrument is the microdebrider; the microdebrider comprises a shaft; and the image sensor is integrated in a distal portion of the shaft.

In some implementations, the distal portion of the shaft further comprises a radio frequency (RF) image guidance sensor located on an undersurface of the shaft, the RF image guidance sensor configured to electrically couple to the cable connector; and the second end of the cable connector is a split end further comprising a second connector configured to communicate data with the RF image guidance sensor.

In some implementations, the instrument further comprises one or more light emitting devices configured to illuminate the anatomical cavity; the one or more light emitting devices are electrically coupled to the cable connector; and the cable connector is configured to supply power to the one or more light emitting devices.

In some implementations, the second end of the cable connector is a split end comprising the first connector and a second connector, the second connector configured to communicate additional data with the instrument or transmit power to the instrument.

In some implementations, the system further comprises a portable control box, the portable control box comprising a first port configured to couple to the first connector to receive the image data, and the portable control box configured to generate a display signal corresponding to the image data.

In some implementations, the portable control box is configured to supply power via the cable connector to the instrument.

In one embodiment, a modular endoscopic system comprises: a portable control box; a first medical device comprising a first image sensor configured to generate first image data corresponding to an anatomical site, the first medical device configured to be electrically coupled to a portable control box and transmit the first image data to the portable control box; and a second medical device comprising a second image sensor configured to generate second image data corresponding to the anatomical site, the second medical device configured to be electrically coupled to the first medical device such that the first medical device is configured to transmit the second image data to the portable control box.

In some implementations, the first medical device is a first endoscope; and the second medical device is a second endoscope.

In some implementations, the first medical device is a first instrument integrating the first image sensor in a first shaft of the first instrument; or the second medical device is a second instrument integrating the second image sensor in a second shaft of the second instrument.

In some implementations, the first medical device is configured to couple to the portable control box via a first cable connector; and the second medical device is configured to directly couple to the first medical device or couple to the first medical device via a second cable connector or adapter.

In some implementations, the portable control box is configured to supply power to the first medical device, and the first medical device is configured to supply power to the second medical device.

BRIEF DESCRIPTION OF THE DRAWINGS

The present disclosure, in accordance with one or more implementations, is described in detail with reference to the following figures. The figures are provided for purposes of illustration only and merely depict example implementations. Furthermore, it should be noted that for clarity and ease of illustration, the elements in the figures have not necessarily been drawn to scale.

Some of the figures included herein illustrate various implementations of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

FIG. 4A shows a side perspective view of an assembly including a rigid attachment coupler and endoscope shaft coupled together, in accordance with some implementations of the disclosure.

FIG. 10B shows a bottom view of the cable connector of FIG. 10A.

FIG. 10C shows a side view of the cable connector of FIG. 10A.

FIG. 10D shows a top view of the cable connector of FIG. 10A.

FIG. 11B shows a side view of the cable connector of FIG. 11A.

FIG. 11C shows a bottom view of the cable connector of FIG. 11A.

FIG. 11D shows a top view of the cable connector of FIG. 11A.

FIG. 12A shows a perspective view of another cable connector for a modular endoscope system, in accordance with some implementations of the disclosure.

FIG. 12B shows a bottom view of the cable connector of FIG. 12A.

The figures are not exhaustive and do not limit the present disclosure to the precise form disclosed.

DETAILED DESCRIPTION

Figure 1:
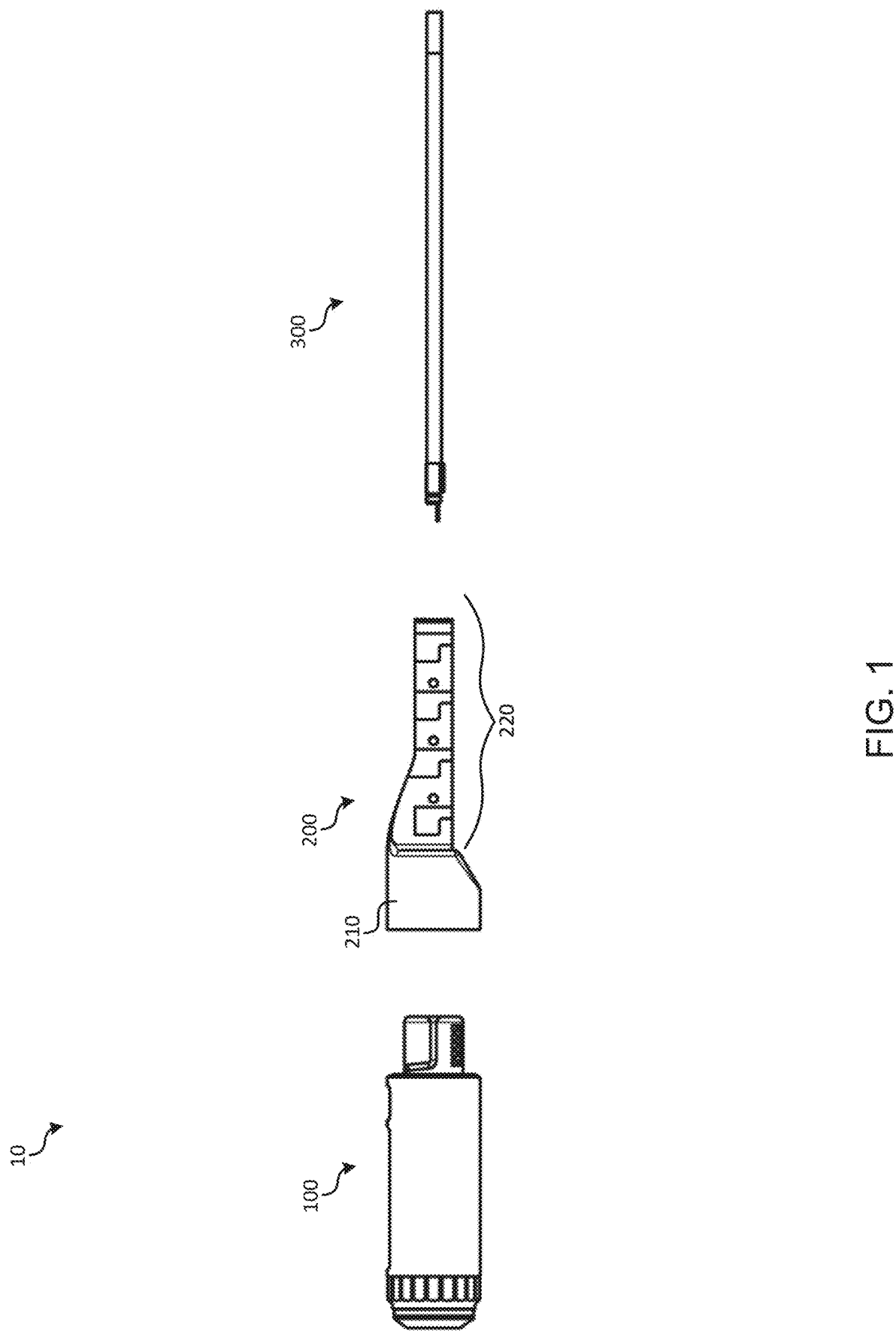
FIG. 1 shows a modular endoscope, in accordance with some implementations of the disclosure.
Figure 2A:
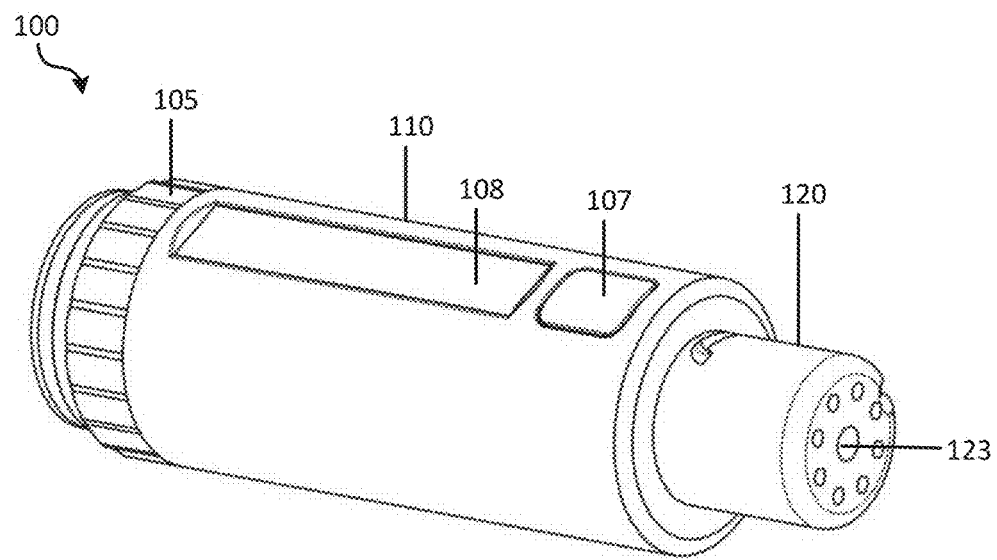
FIG. 2A shows a side perspective view of an endoscope housing, in accordance with some implementations of the disclosure.
Figure 2B:
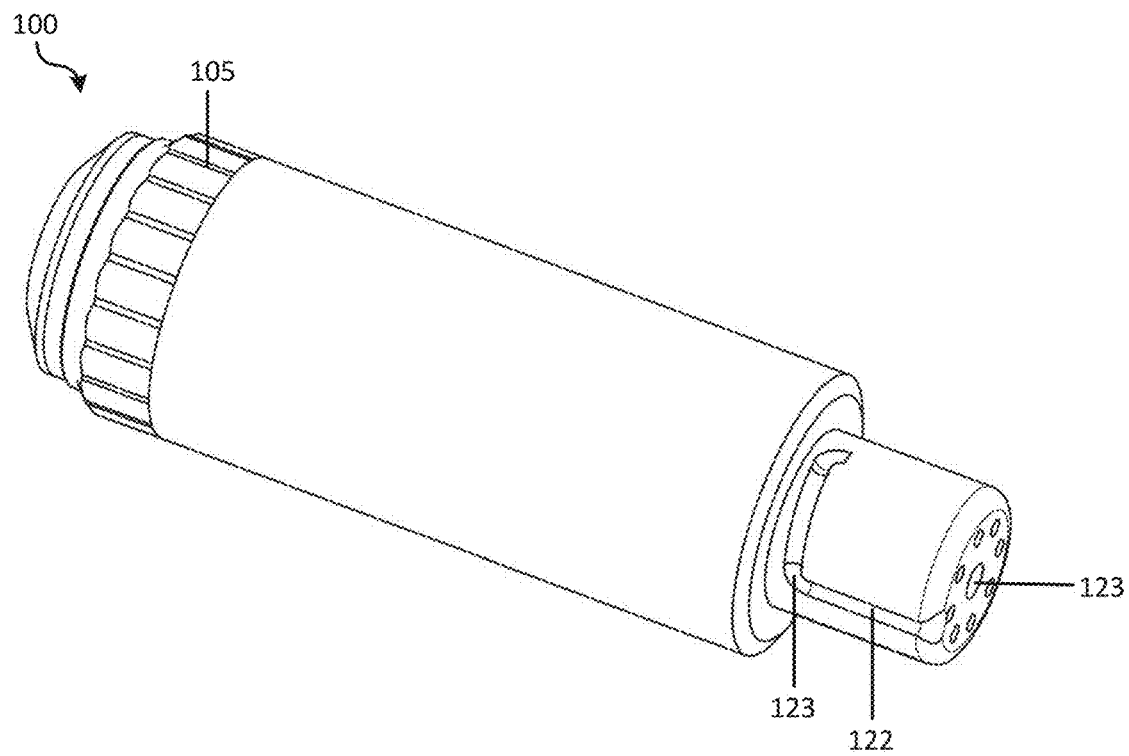
FIG. 2B shows another side perspective view of the endoscope housing of FIG. 2A.
Figure 2C:
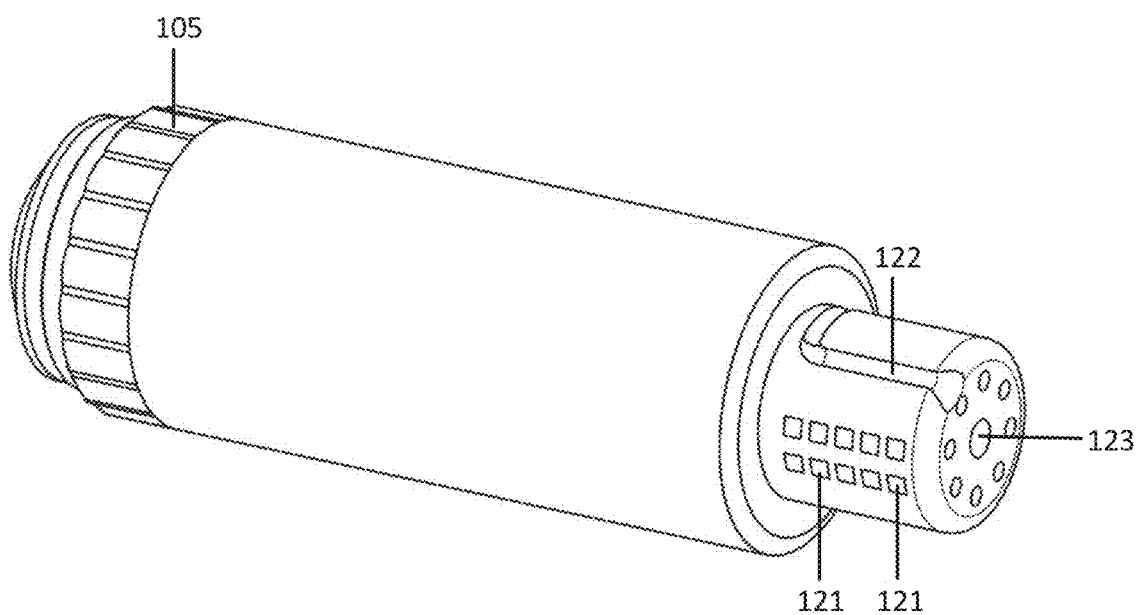
FIG. 2C shows another side perspective view of the endoscope housing of FIG. 2A.
Figure 2D:
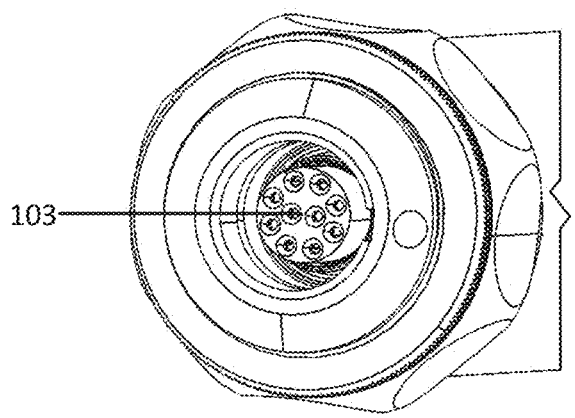
FIG. 2D shows a rear perspective view of the endoscope housing of FIG. 2A, including a connector located in the back end of the endoscope housing.
Figure 3A:
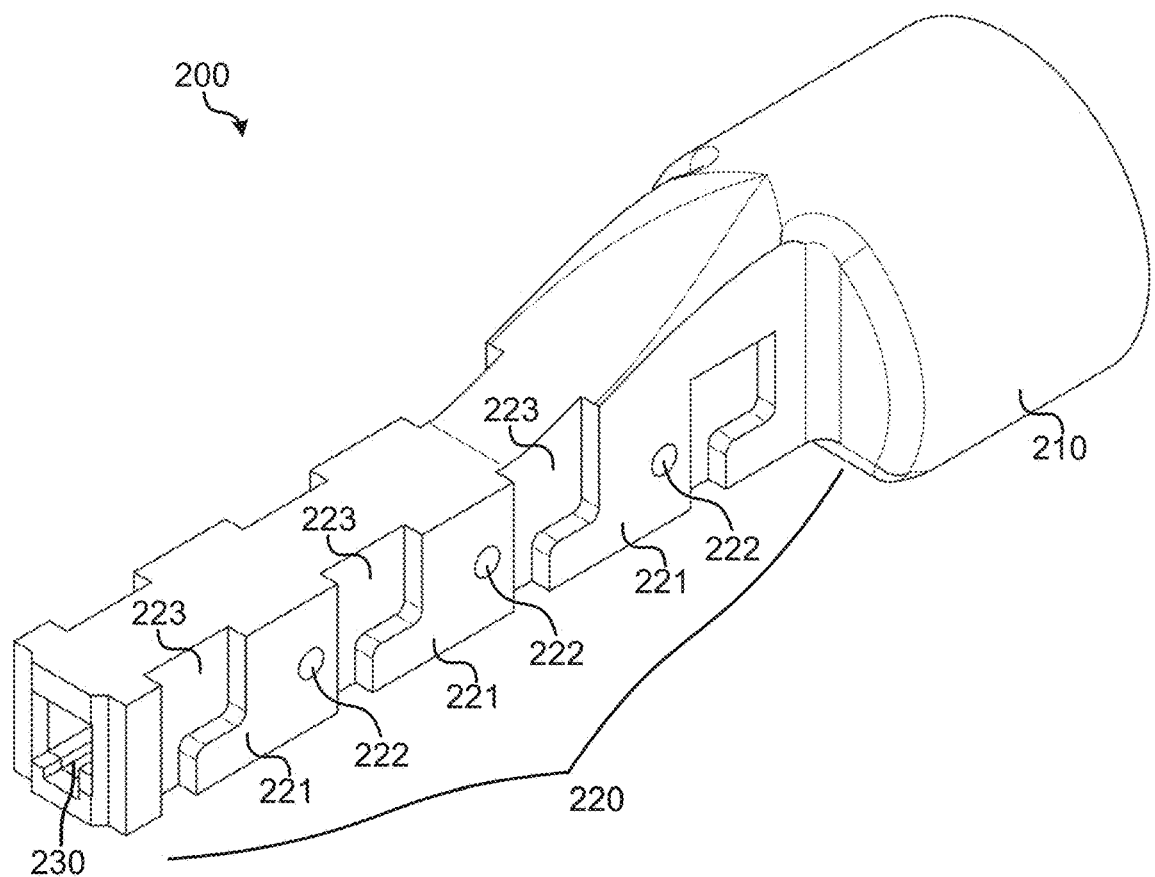
FIG. 3A shows a perspective view of a rigid attachment coupler, in accordance with some implementations of the disclose.
Figure 3B:
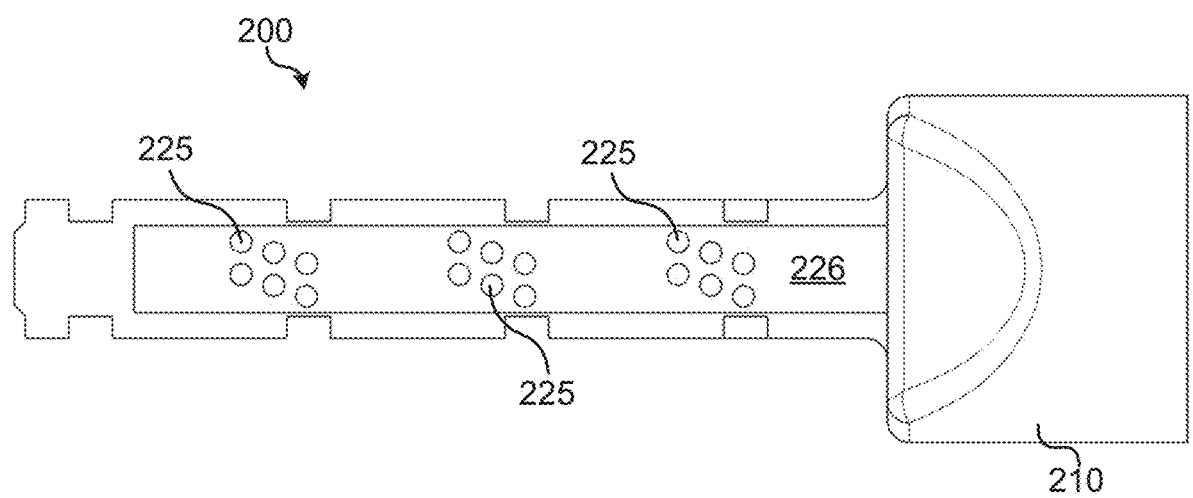
FIG. 3B shows a side elevation view of the rigid attachment coupler of FIG. 3A.
Figure 4B:
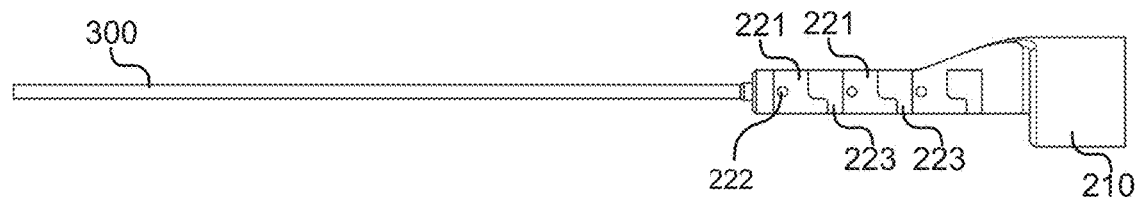
FIG. 4B shows a side elevation view of the assembly of FIG. 4A.
Figure 4C:
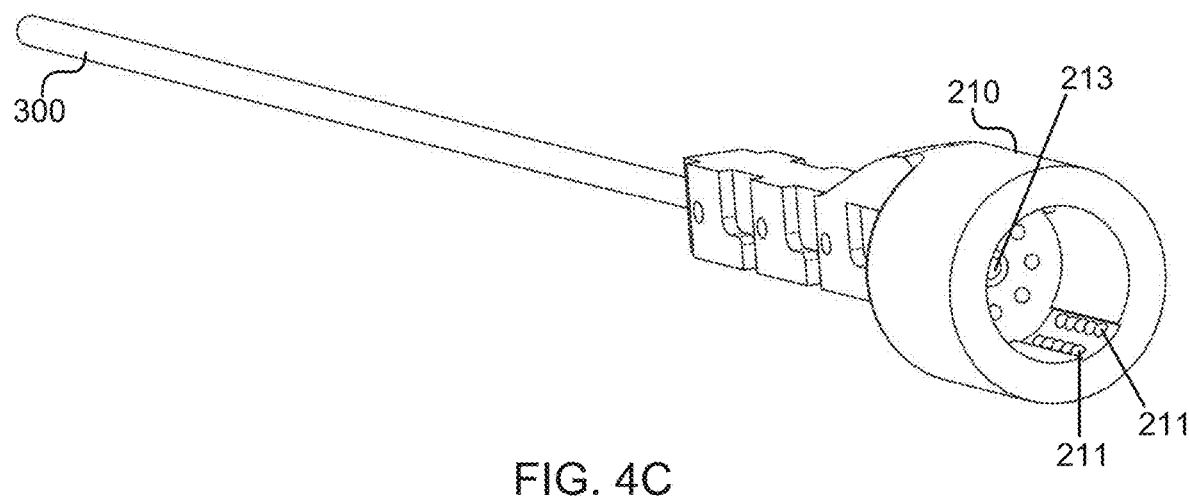
FIG. 4C shows another side perspective view of the assembly of FIG. 4A.
Figure 4D:
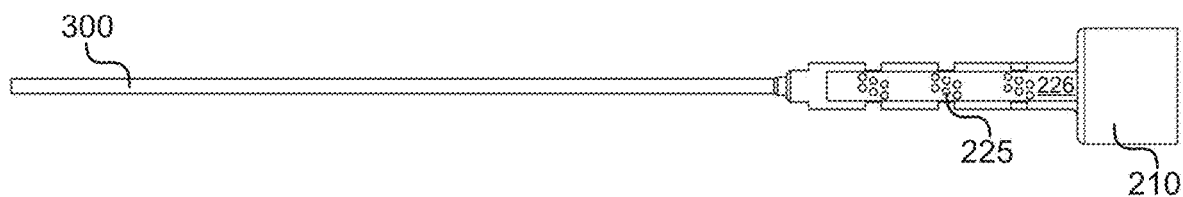
FIG. 4D shows another side elevation view of the assembly of FIG. 4A.

FIG. 1 depicts a modular endoscope 10, in accordance with some implementations of the disclosure. The modular endoscope 10 includes an endoscope housing 100, a rigid attachment coupler 200, and an endoscope shaft 300. FIGS. 2A-2D further illustrate the endoscope housing 200. FIGS. 3A-3B further illustrate the rigid attachment coupler 200. FIGS. 4A-4D further illustrate the rigid attachment coupler 200 and endoscope shaft 300 coupled together. FIGS. 5A-5G further illustrate the endoscope shaft 300 and its various configurations.

As depicted, a distal end of housing 100 is removably coupled to a proximal end of rigid attachment coupler 200, and a distal end of rigid attachment coupler 200 is removably coupled to a proximal end of endoscope shaft 300. As further described below, these removable connections can be mechanical, electrical, and/or optical (photonic). In addition to enabling transmission of electrical signals containing image data or other data, the electrical connection(s) can establish power transfer between the components.

Figure 5A:
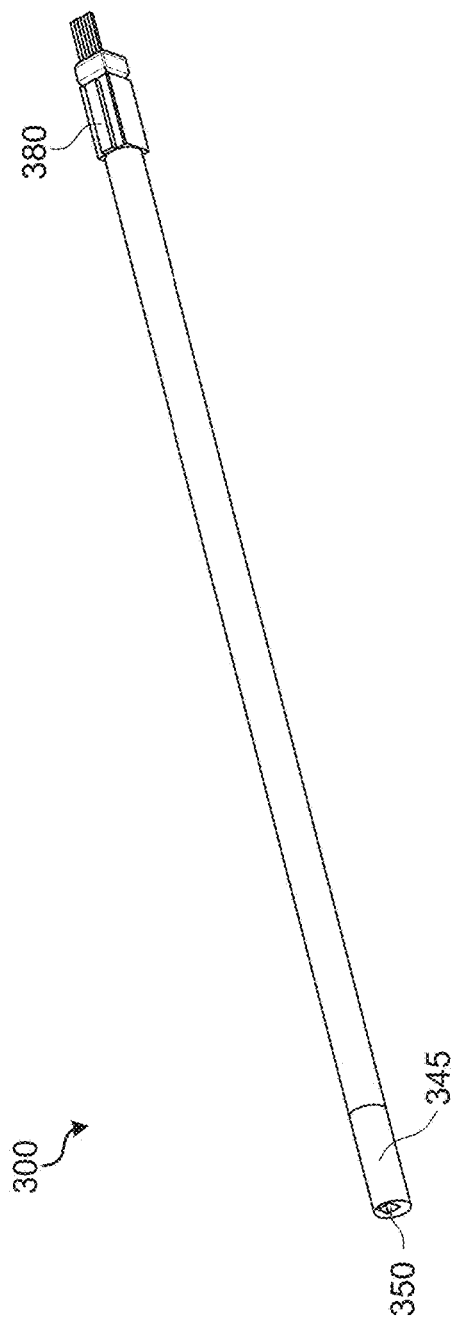
FIG. 5A shows a perspective view of a detachable endoscope shaft, in accordance with some implementations of the disclosure.
Figure 5B:
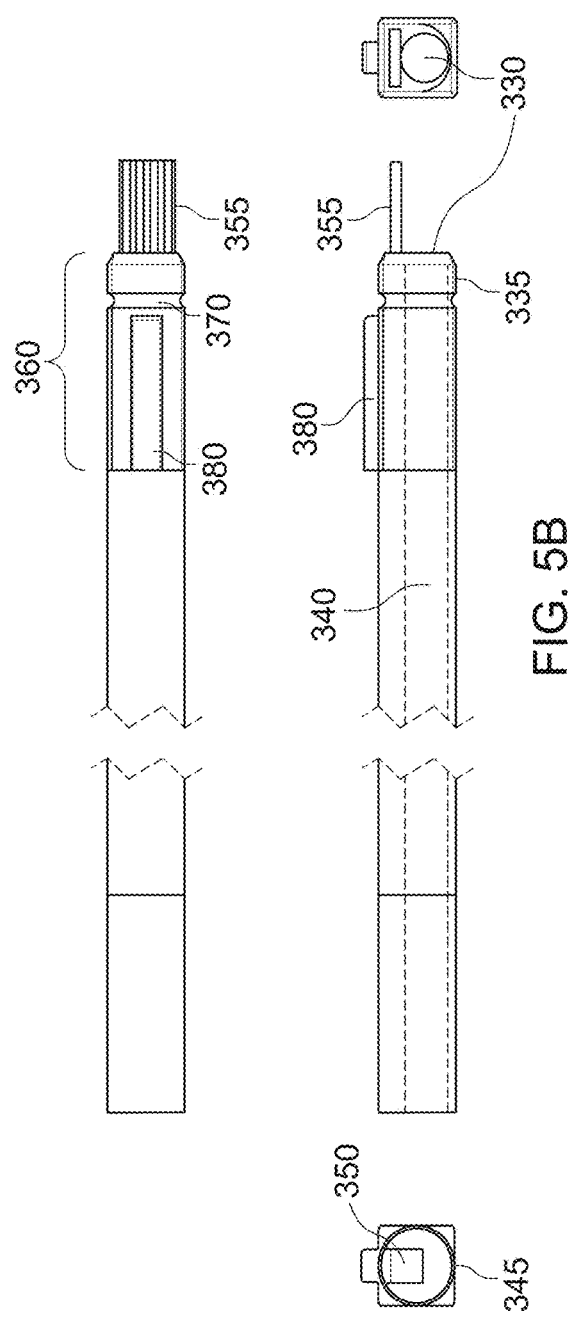
FIG. 5B shows side views of components of the detachable endoscope shaft of FIG. 5A.
Figure 5C:
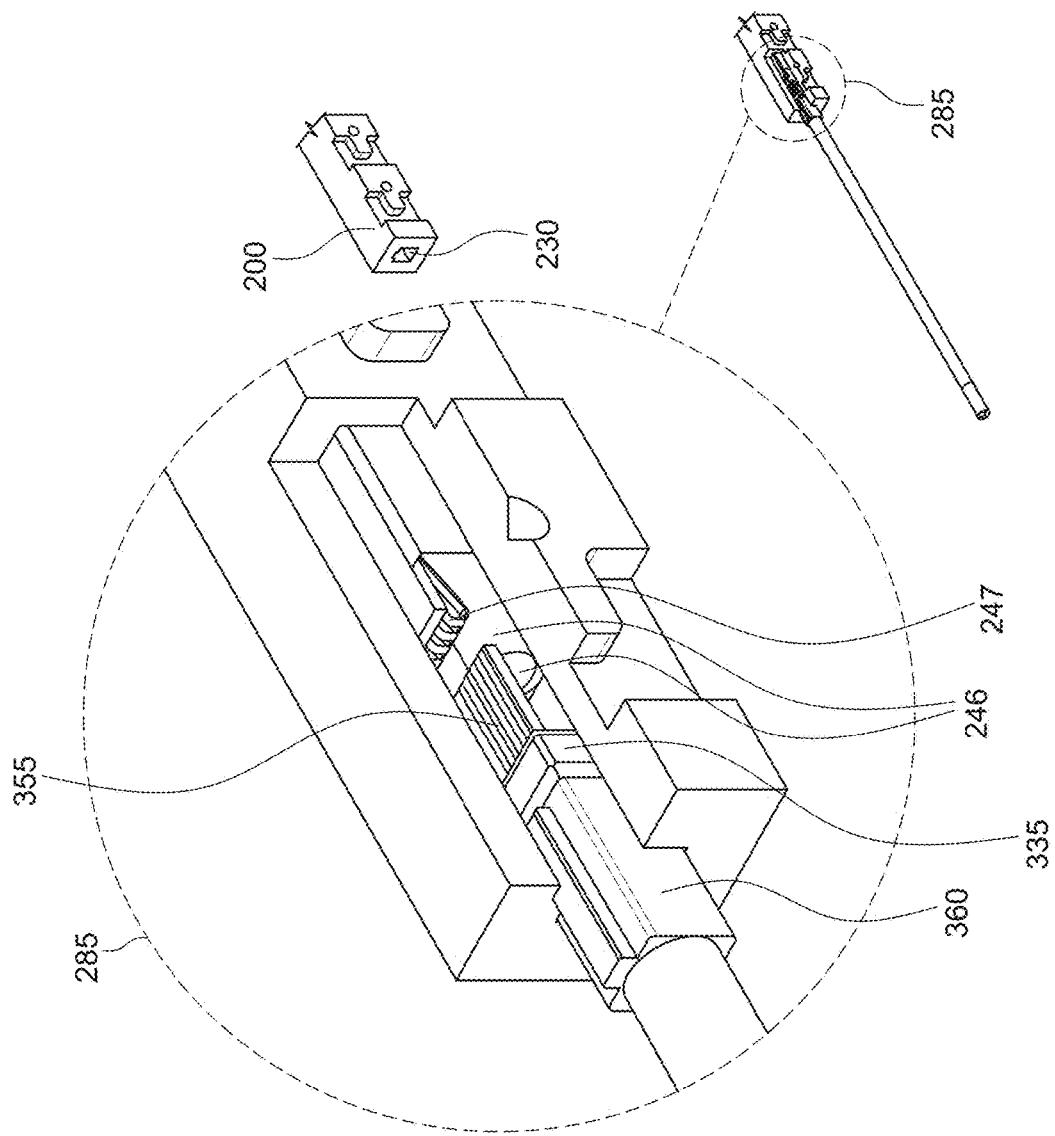
FIG. 5C shows an expanded, cross-sectional view of a mating connection between a scope connector segment and the distal connector of a rigid attachment coupler, in accordance with some implementations of the disclosure.
Figure 5D:
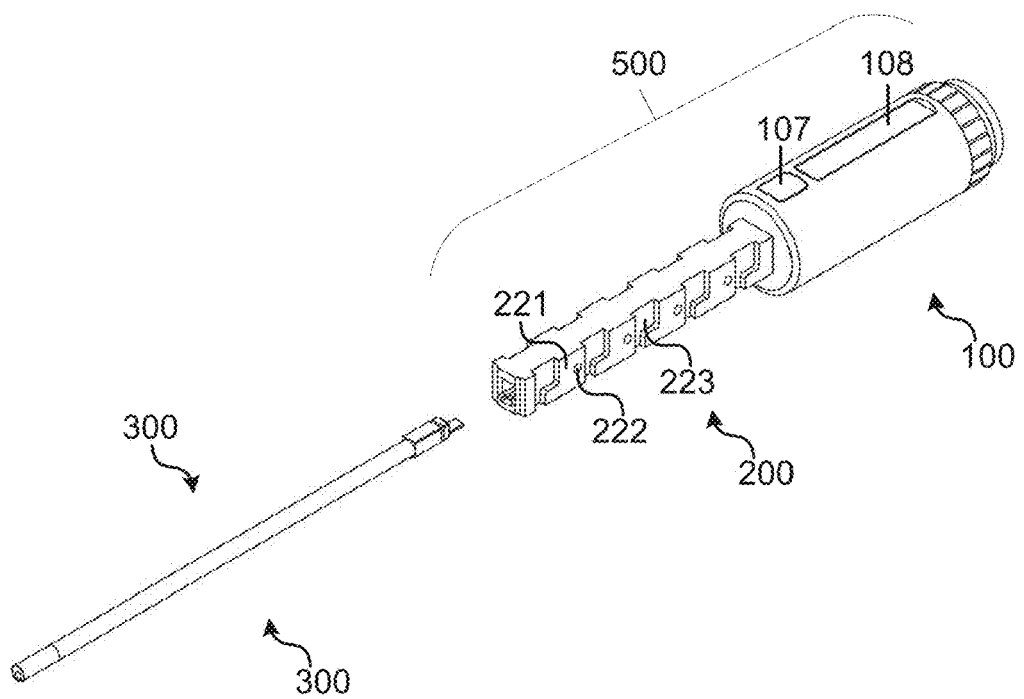
FIG. 5D shows a perspective view of an endoscope assembly including a detachable endoscope shaft coupling to an integrated endoscope housing assembly, in accordance with some implementations of the disclosure.
Figure 5E:
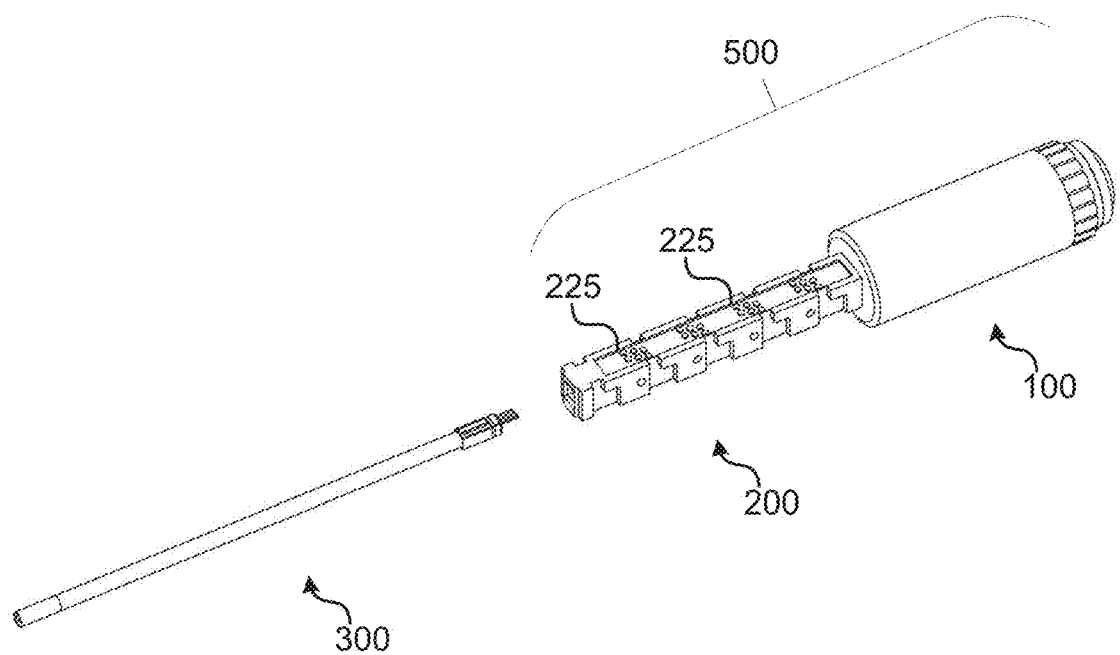
FIG. 5E shows another perspective view of the endoscope assembly of FIG. 5D.

In other implementations, illustrated by FIGS. 5D-5E, housing 100 and rigid attachment coupler 200 can be fixed to one another. For example, a proximal end of rigid attachment coupler 200 can be fixed to a distal end of housing 100. In other implementations, illustrated by FIGS. 5F-5G, rigid attachment coupler 200 and endoscope shaft 300 can be fixed to one another. For example, a proximal end of endoscope shaft 300 can be fixed to a distal end of rigid attachment coupler 200.

Figure 18A:
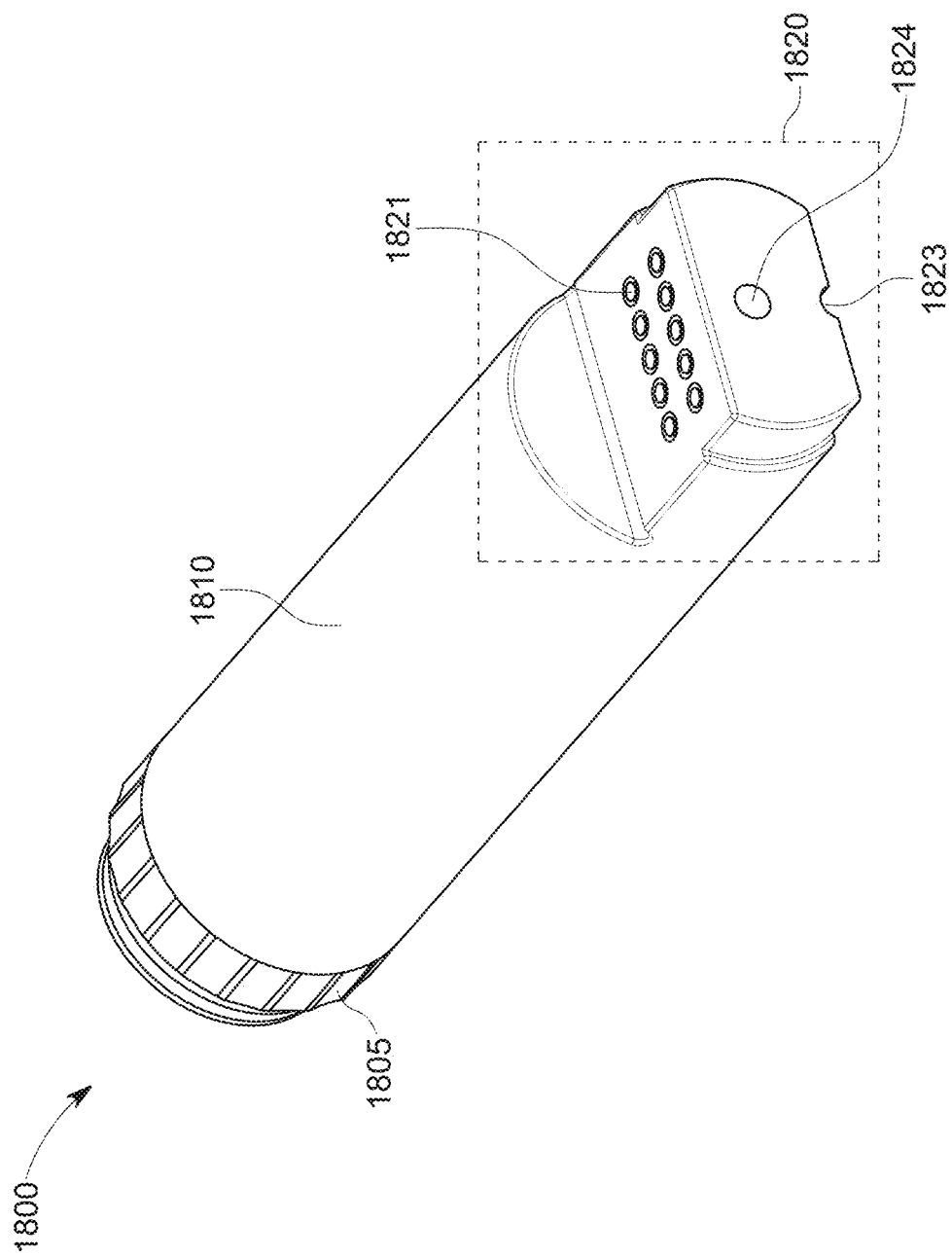
FIG. 18A shows a perspective view of another endoscope housing that can be used with the modular endoscope systems described herein, in accordance with some implementations of the disclosure.
Figure 18B:
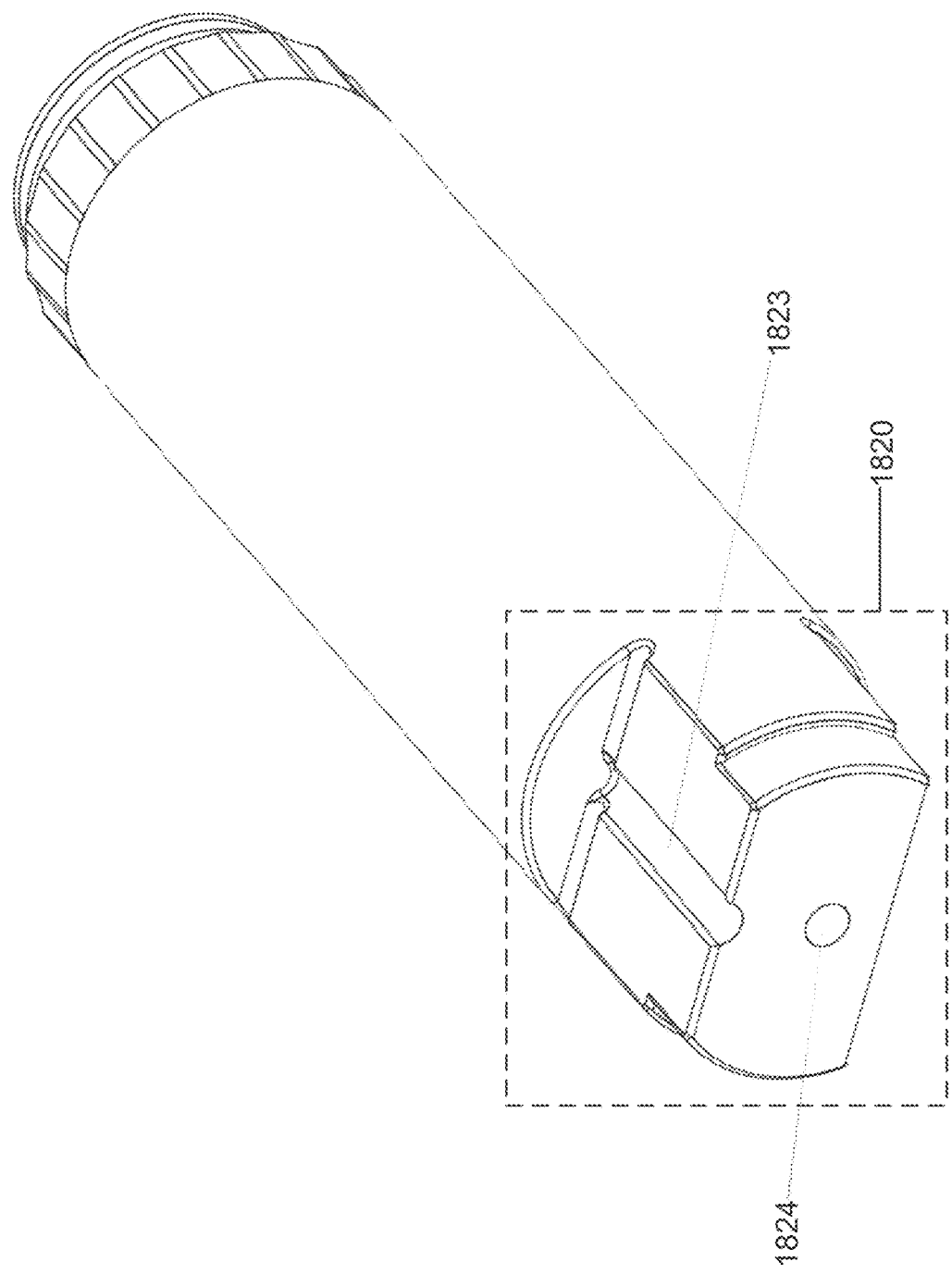
FIG. 18B shows another perspective view of the endoscope housing of FIG. 18A.

Some of the illustrated embodiments of endoscope housing 100 show a cylindrical barrel 110 that transitions into an endoscope housing connector segment 120. Although the endoscope housing connector segment 120 pictured in FIGS. 2A-C is circular in profile, a flattened, rectangular profile as depicted by FIGS. 18A-18B is also envisioned. One such example of an endoscope housing connector segment is described with reference to FIGS. 21A-21D of U.S. Pat. No. 11,771,312, incorporated herein by reference in its entirety. Along the proximal aspect of the endoscope housing 100 is a circular image rotation dial 105 that when rotated causes the endoscopic image to digitally rotate on the video monitor. In other implementations, the image rotation dial 105 can be omitted. In some implementations, there may be button(s) 107 and/or slide control(s) 108 integrated into barrel 110 to allow for user control of various functions, including, but not limited to, image rotation, image capture, zoom, or toggle between multiple optical or electrical inputs. As illustrated by FIG. 2D, located along the back end of the endoscope housing 100 and proximal to the rotation dial 105 is a coupler 103 that can connect to a detachable cable (not pictured). Although illustrated as a female coupler, in other implementations coupler 103 can be a male coupler or magnetic coupler. In adaptations further described herein, the endoscope housing 100 can contain electrical circuitry (e.g., within barrel 110) that is configured to process electrical and/or image data from proximal and distal circuit connections occurring between the external, battery powered control box and numerous attached image CMOS sensors, cables, adapters, electrically powered LEDs, and connected instrumentation sensors.

In the illustrated configuration, the endoscope housing 100 and rigid attachment coupler 200 are configured to be mechanically, electrically, and optically coupled. During coupling, an endoscope housing connector segment 120 distally located in endoscope housing 100 is inserted into an opening of a proximal connector 210 of rigid attachment coupler 200. The endoscope housing connector segment 120 includes a groove 122 that receives a protrusion in an interior of proximal connector segment 210, which secures the mechanical connection between the rigid attachment coupler 200 and endoscope housing 100. The mechanical connection can be secured by sliding the protrusion in the interior of proximal connector segment 120 to junction 123 of groove 122, and then rotating connector segments 120 and 210 relative to one another. In other implementations, alternative suitable mechanical attachment mechanisms can be incorporated into endoscope housing connector segment 120 and/or proximal connector 210 (e.g., screw, magnetic, twist-on, snap-on, spring tension, compression fitting, etc.) to lock the rigid attachment coupler 200 to the endoscope housing 100.

During insertion, one or more electrical contacts 121 on a surface of endoscope housing connector segment 120 electrically couple to one or more electrical contacts 211 in proximal connector 210 of rigid attachment coupler 200. The electrical connection can establish a data and/or power connection between endoscope housing 100 and rigid attachment coupler 200. In some implementations, once the electrical connection is established, and rigid attachment coupler 200 is electrically coupled to one or more other components (e.g., endoscope shaft 300 via distal connector 230 and/or another instrument via rigid attachment segment 220), data can be transferred between the endoscope housing 100 and the one or more other components electrically coupled to rigid attachment coupler 200 via electrical contacts 225. For example, data corresponding to image signals collected using an image sensor of endoscope shaft 300 and/or an image sensor of some other instrument coupled to rigid attachment coupler 200 could be transferred to endoscope housing 100 via contacts 355, 247, 225 and 211 for further processing as further described below. In some implementations, an electrical power connection can be established between endoscope housing 100 and rigid attachment coupler 200 such that power could be transferred to or from other components electrically coupled to rigid attachment coupler 200. For example, endoscope housing 100 could act as a power supply (e.g., using an internal battery or external power source) that supplies power via rigid attachment coupler 200 to one or more other components that are electrically coupled to rigid attachment coupler 200. In some implementations, when the one or more electrical contacts 121 electrically couple to the one or more electrical contacts 211, both power and data (e.g., image data) can be transferred between the components.

Also illustrated in FIGS. 2B-2C is an illumination coupling 123 of endoscope housing connector segment 120 that optically couples to an illumination coupling 213 of proximal connector 210 of rigid attachment coupler 200. After the optical connection, light emitted from a light source (e.g., LED light source) contained within the endoscope housing 100 can transmit through rigid attachment 200 and then through detachable endoscope shaft 300 (e.g., via light fibers or an illumination channel that terminates at the distal end of shaft 300). In other implementations, the illumination couplings between the endoscope housing connector segment 120 and rigid attachment coupler 200 can be omitted, and instead of housing the light source(s) in endoscope housing 100, the light source(s) for imaging can be housed within the rigid attachment coupler 200 and/or endoscope shaft 300. In such implementations, power can be supplied to the light source(s) by establishing an electrical connection with endoscope housing 100. For example, an LED located at a distal tip of endoscope shaft 300 could be supplied power via a wired connection.

The profile of the depicted endoscope housing connector segment 120 of the endoscope housing 100 provides a relatively easy surface to clean post operation, thereby improving the utility and ergonomics of the modular endoscope assembly.

As depicted by FIGS. 3A-4D, rigid attachment coupler 200 includes a proximal connector 210 for coupling rigid attachment coupler 200 to an endoscope housing 100, a distal connector 230 for coupling rigid attachment coupler to an endoscope shaft 300, and a rigid attachment segment 220. The rigid attachment segment 220 is configured to detachably, mechanically, and electrically couple rigid attachment coupler 200 to another instrument, an adapter, or a cable connector. To this end, the rigid attachment segment 220 includes one or more surfaces to enable the mechanical connection, and one or more surfaces to enable the electrical connection.

On the surface of the rigid attachment segment 220 are formed a plurality of grooves/slots 223 and a plurality of sections 221 that protrude relative to the grooves 223, each of the sections 221 having a recessed indentation or hole 222. In this example, the plurality of grooves 223 and the plurality of sections 221 alternate along the longitudinal length of rigid attachment segment 220. As further described below, at least one groove 223 and at least one section 221 (e.g., a groove 223 adjacent a section 221) can be used to mechanically couple the rigid attachment segment 220 to a channel of an instrument, adapter, or cable connector in a specific lengthwise position. The number of grooves 223 and the number of sections 221 may depend on the desired number of lengthwise adjustments for coupling rigid attachment segment 220 to an instrument or adapter, and the increment of each lengthwise adjustment. The number of grooves 223 and number of sections 221 may also depend on the width of each groove 223 and the width of each section 221. In some implementations, rigid attachment segment 220 can have between 1 and 30 grooves 223, and between 1 and 30 sections 221. In some implementations, to provide a more secure connection, multiple grooves 223 and multiple sections 221 may be used to connect to the instrument, adapter, or cable connector. Although grooves 223 and sections 221 are formed on two opposing sides/surfaces of rigid attachment segment 220 in this example, in other implementations they may be formed on one, three, or all four sides. Moreover, although in this example rigid attachment segment 220 is four-sided with a square cross section. In other implementations, rigid attachment segment 220 may have a different rectangular, circular, or other geometric cross section.

In alternative implementations, rigid attachment segment 220 may utilize some other suitable rigid attachment mechanism that enables a mechanical attachment with an instrument, adapter, or cable connector. For example, the rigid attachment segment 220 may utilize a magnetic attachment mechanism, a snap on attachment mechanism, a top-down ratchet mechanism, an insert ratchet mechanism, and/or an insert twist mechanism as further described in U.S. Pat. No. 10,512,391, incorporated herein by reference in its entirety. As such, other mechanisms for removably and mechanically coupling the rigid attachment segment 220 to an instrument or adapter are contemplated.

Rigid attachment segment 220 also includes a surface 226 including one or more electrical contacts 225 for electrically coupling rigid attachment segment 220 to an instrument, adapter, or cable connector. By virtue of incorporating this additional electrical coupling mechanism on one of its surfaces, the rigid attachment segment 220 enables an electrical connection between the endoscope housing 100 and a secondary instrument (either directly or via an adapter or cable connector) in addition to the connection to detachable endoscope shaft 300. The electrical connection established via electrical contacts 225 can enable image data transfer and/or power transfer between endoscope housing 100 and the secondary instrument. As further described herein, this additional flexibility can increase the ergonomics and usability of the modular endoscope systems described herein. Although illustrated in this example as being on separate surfaces, in some implementations, the electrical and mechanical connections of rigid attachment segment 220 can be incorporated in the same surfaces. For example, in some implementations electrical contacts 226 could be incorporated on grooves 223 or sections 221 (e.g., in recessed indentations 222). In some implementations, the electrical contacts could enable data transmission from sources other than image data, such as sound data, user input data, or system control data.

FIGS. 5A-5B depict components of a detachable endoscope shaft 300, in accordance with some implementations form the disclosure. During operation of the endoscope 10, light emitted from a light source (e.g., LED light source) contained within endoscope housing 300 or rigid attachment coupler 200 transmits through a proximal illumination coupling 330 within the proximal end 335 of the endoscope shaft 300. The light travels through endoscope shaft 300 via an illumination channel 340 that terminates at the distal segment 345 of the endoscope shaft 300. The illumination channel 340 may be a molded illumination pipe or optical fibers. Alternatively, in other implementations (not illustrated) the light source may be integrated, internally and/or externally, into the detachable endoscope shaft 300. In such implementations, the light source may be an LED alone or in combination with optical fibers positioned within or near the distal end of endoscope 300 (e.g., near the camera sensor 350, in a different channel such that the light emitted by the light source does not interfere with the operation of the camera sensor), or in some other segment of the endoscope shaft 300. Depending on the position of the light source in the detachable endoscope shaft 300, such implementations may shorten or remove the illumination channel 340. In order to supply power to the light source to make it operational in such implementations, the endoscope housing 100 and/or the rigid attachment connector 200 may provide power to the light source (and the image sensor) via a separate power line or via power-line communications.

A camera sensor 350 located at the distal tip of the endoscope shaft 300 electrically connects to a camera module connector 355 located at the proximal end of the endoscope shaft. Just distal to the camera module connector 355 is a scope connector segment 360 that, along with the camera module connector 355 inserts into the distal connector 230 of rigid attachment coupler 200, via an internal channel, to mechanically and electrically couple the endoscope shaft 300 to rigid attachment connector 200 and endoscope housing 100.

FIG. 5C shows an expanded, cross-sectional view of a mating connection 285 between the scope connector segment 360 and the distal connector 230 of rigid attachment coupler 200. Within the proximal aspect of the scope connector segment 360, just behind the camera module connector 355, is a circumferential groove 370 that allows for a snap-in connection to a female receptacle located in distal connector 230. An elongated rectangular protrusion 380 rests along the top surface of the scope connector segment 360 and acts to facilitate a keyed, one-way installation of the proximal endoscope shaft 300. In other implementations, other protrusion(s) resting along a surface of the scope connector segment 360 may facilitate installation. In still other implementations, the location of the elongated rectangular protrusion 380 may be reversed and contained within the female receptacle.

During connection, one or more electrical contacts 247 within a camera module interface within the distal connector 230 compress against one or more electrical contacts along the top surface of the inserted camera module connector 355. Once the electrical connection is secured, camera signals (e.g., image data) collected via the camera sensor 350 may travel to a processor located within the endoscope housing 100. Additionally, proximal illumination coupling 330 within the proximal end 335 is optically coupled to an illumination coupling 246 in the interior of the connector 240. As such, after the optical connection, light emitted from a light source (e.g., LED light source) contained within the endoscope housing 300 or rigid attachment coupler 200 transmits through illumination coupling 246 and then through proximal illumination coupling 330. Further, elongated rectangular protrusion 380 mechanically couples into the proximal rigid segment. A spring-loaded ball or other protrusion (not seen) within the female receptacle could reversibly engage the circumferential groove 370 to further secure the mechanical connection. As such, after the removable connection, the endoscope shaft 300 may be electrically, optically, and mechanically coupled to the rigid attachment coupler 300.

It should be appreciated that other suitable electrical connections other than what is illustrated in FIG. 5C can be utilized to electrically couple a detachable endoscope shaft 300 to a distal connector 230 of a rigid attachment coupler 200. For example, an internal, sliding contact can be used such that one or more electrical contacts located at a proximal end of the endoscope shaft 300 can slide between two sets of electrical contacts, one above and one below, within distal connector 230. In this manner, multiple camera sensors arranged within or along shaft 300 could be powered and signals transmitted simultaneously to the endoscope housing 100. As another example, an internal pogo compression contact can be utilized. In such implementations, one or more electrical contacts within distal connector 230 can compressed against one or more electrical contacts located at a proximal end of the detachable endoscope shaft 300, or vice versa. Various configurations for electrical connections are envisioned. Such configurations can be circular, oval, cross-shaped, T-shaped, etc., and could allow for two, three, or more than three camera modules connected simultaneously.

In configurations where a light source is integrated into the detachable endoscope shaft 300 (e.g., at the distal tip as one or more LEDs), the illumination couplings (e.g., illumination couplings 330, 246) may be omitted, and there is no need to optically couple the detachable endoscope shaft 300 to the rigid attachment coupler 200. In such cases, the endoscope housing 100 may provide power to the light source of the endoscope shaft 300 when, for example, the endoscope shaft is electrically connected to rigid attachment coupler 200, and rigid attachment coupler 200 is electrically connected to endoscope housing 100. In some cases, an additional connection may be used to supply power. The endoscope housing 100 may supply power via an integrated battery, an AC/DC power supply, or some other suitable power source.

In configurations where the endoscope shaft 300 and rigid attachment coupler 200 are integrated as one component, it should be appreciated that optical and electrical connections between endoscope shaft 300 and endoscope housing 100 can be established using the connection between endoscope housing connector segment 120 and proximal connector 210 of rigid attachment coupler 200, in which case distal connector 230, scope connector segment 360, and their associated connection components, can be omitted.

In some implementations, multiple different detachable endoscope shaft configurations of different sizes, shapes, profiles, rigidity, pixel resolution and attachment segment lengths could be attached to the rigid attachment coupler 200 or endoscope housing 100 when shaft 300 is integrated with the rigid attachment coupler 200. This could permit single use, disposable sterilized shafts and custom configurations for instrument attachment depending on the surgical application.

In implementations where one or more image sensors are within detachable endoscope shaft 300, image signals collected via the image sensor(s) can travel to endoscope housing 100 via rigid attachment segment 200 for further processing. In a similar manner, electrical power can be transmitted distally to power any LEDs within the endoscope shaft. In implementations where detachable endoscope shaft 300 includes multiple image sensors, separate sets of electrical contacts located on each segment can be used to respectively couple the signal(s) from each image sensor.

In alternative implementations, endoscope shaft 300 can contain optical fibers for image delivery from endoscope shaft 300 to one or more image sensors contained within endoscope housing 100 or rigid attachment coupler 200. In such implementations, endoscope shaft 300 and rigid attachment coupler 200 can include a fiber optical connection. In addition, another fiber optical connection can be established between the rigid attachment coupler 200 and endoscope shaft 300 such that optical signals can travel along a completed fiber optical connection between endoscope shaft 300 and endoscope housing 100.

Figure 5F:
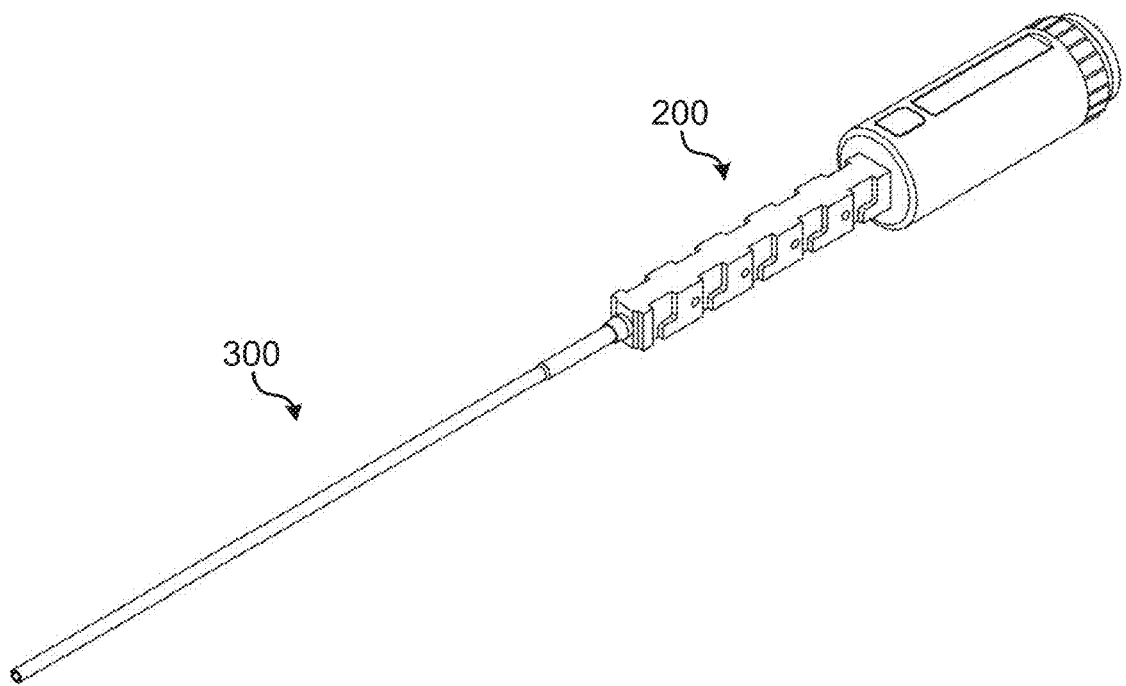
FIG. 5F shows a perspective view of an endoscope assembly including an integrated endoscope housing, rigid attachment coupler, and endoscope shaft.
Figure 5G:
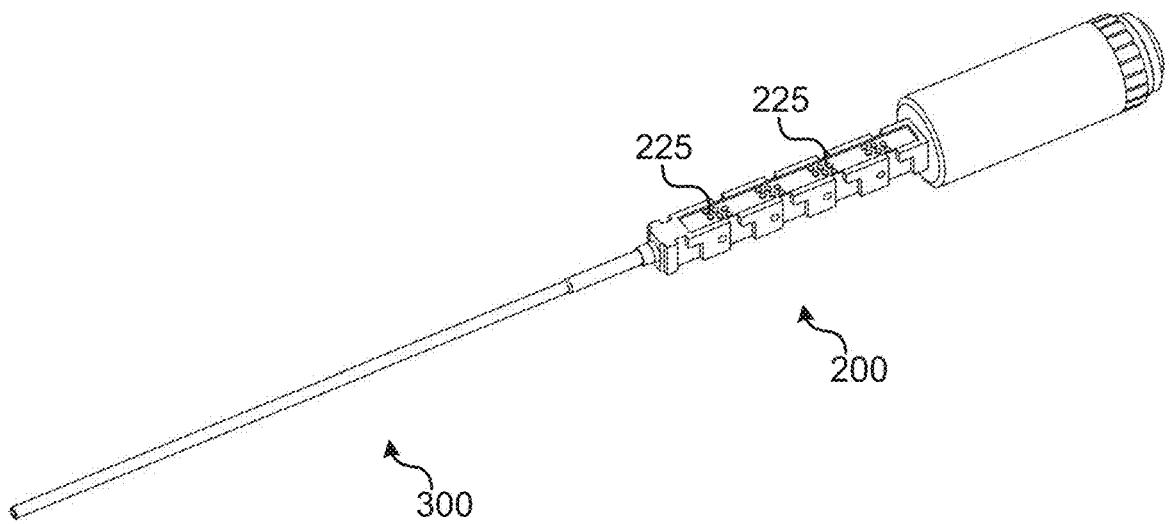
FIG. 5G shows another perspective view of the endoscope assembly of FIG. 5F.

Integrated endoscope housing assembly 500, depicted in FIGS. 5D-5E, shows rigid attachment coupler 200 integrated and connected to endoscope housing 100. In this implementation, as the two components are integrated, connections between an endoscope housing coupler connector segment 120 and electrical couplers 121 and 211 are not needed. FIGS. 5F-5G show an implementation where the endoscope shaft 300 is permanently attached to the rigid attachment segment 200. In this implementation, all of components 100, 200, and 300 are integrated together. As such, the connection 285 is also not needed in this implementation.

Figure 6B:
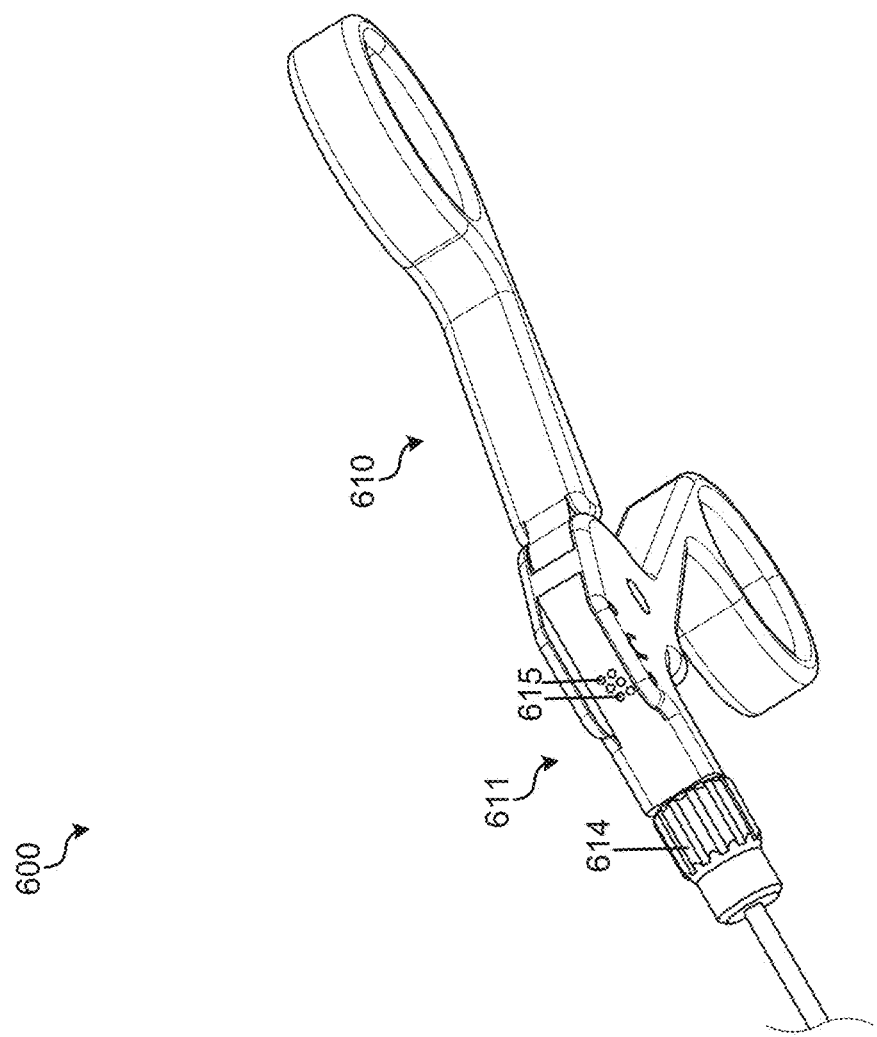
FIG. 6B shows a top perspective view of the handle portion of the forceps instrument of FIG. 6A.
Figure 6A:
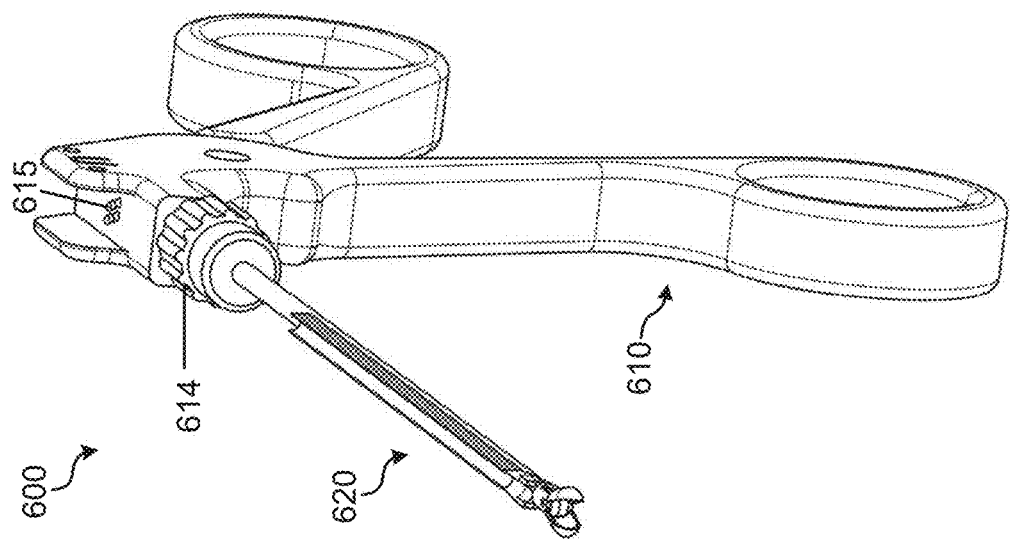
FIG. 6A shows a front perspective view of a forceps instrument that can be used with modular endoscope systems, in accordance with some implementations of the disclosure.
Figure 6C:
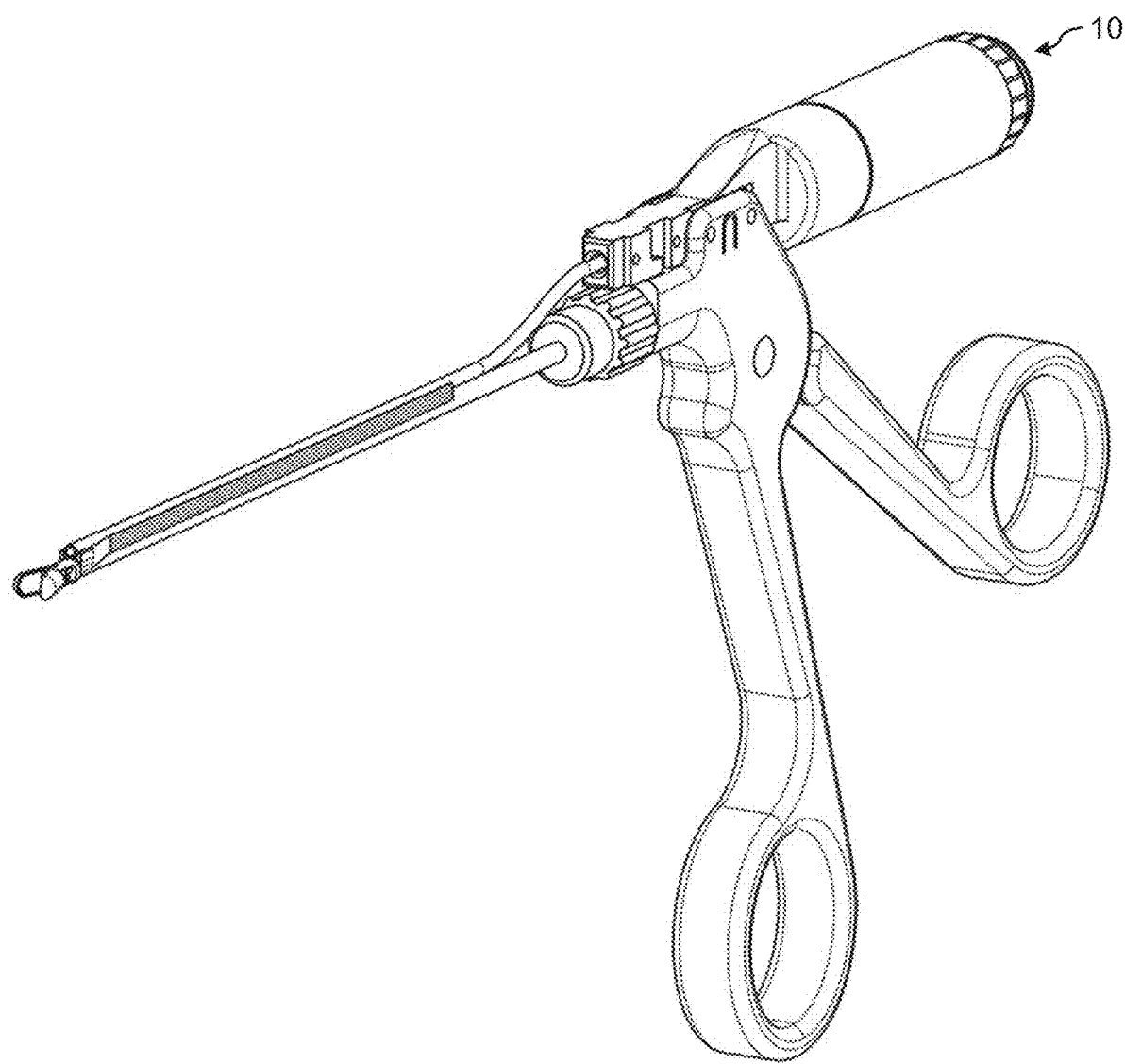
FIG. 6C shows a perspective view of the forceps instrument of FIG. 6A with an endoscope removably coupled thereto.
Figure 6D:
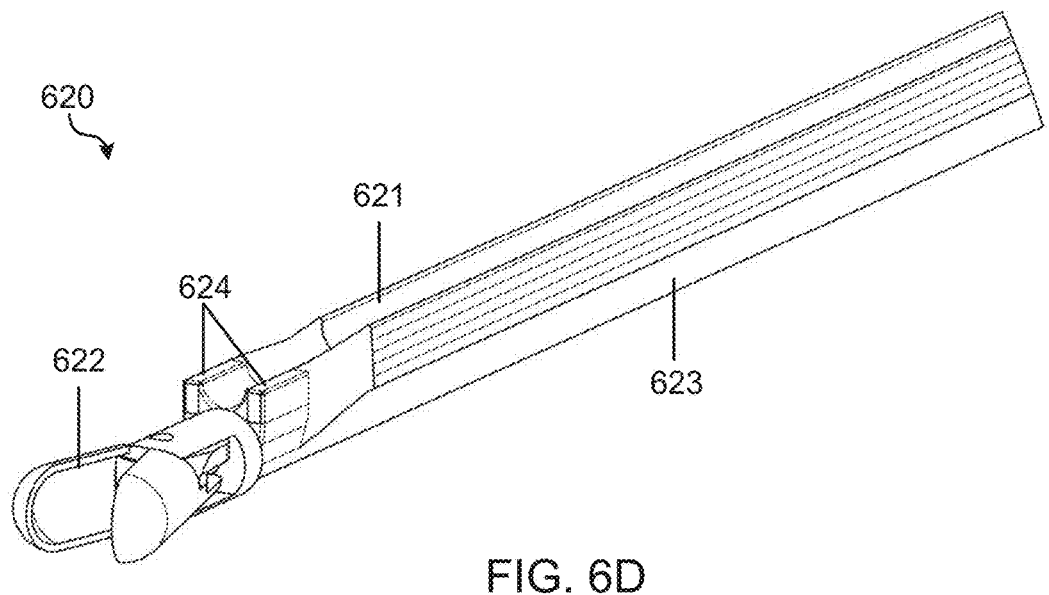
FIG. 6D shows a perspective view of a tool portion of the forceps instrument of FIG. 6A.
Figure 6E:
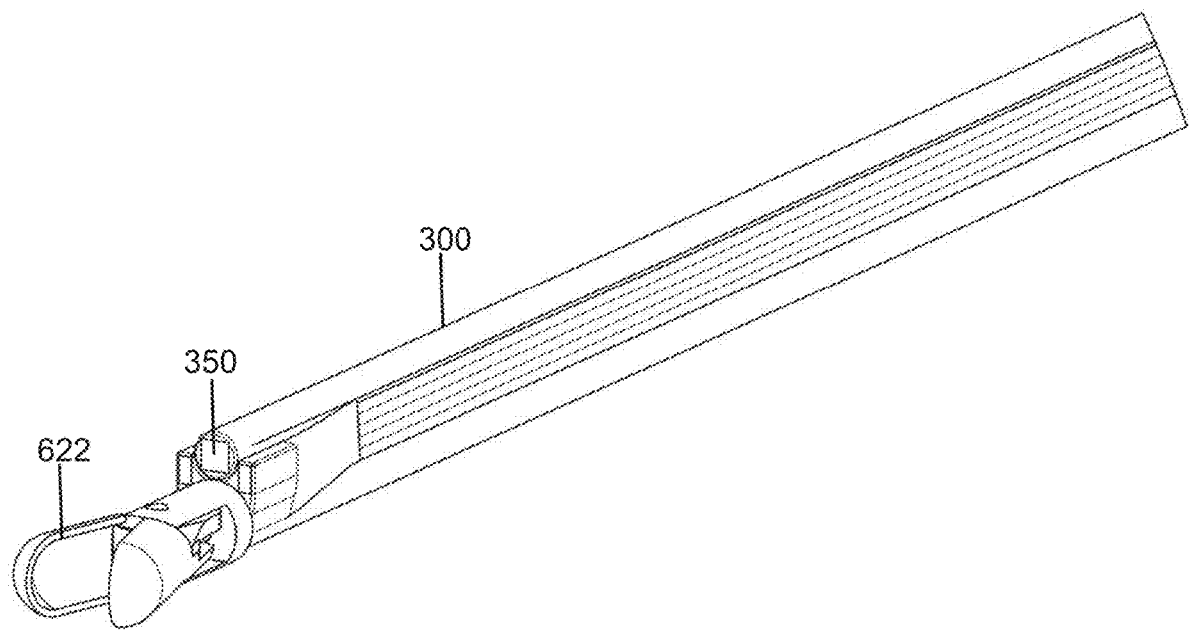
FIG. 6E shows a perspective view of a tool portion of the forceps instrument of FIG. 6A with an endoscope shaft removably coupled thereto.

FIGS. 6A-6E show different views of a forceps instrument 600 that can be used with the modular endoscope systems described herein. In this example, the instrument shaft, including tool portion 620, is detachable from the instrument handle via coupler 614. As depicted, forceps instrument 600 includes a proximal handle portion 610 and a distal tool portion 620. FIG. 6A shows a front perspective view of forceps instrument 600. FIG. 6B shows a top perspective view of the handle portion 610 of forceps instrument 600. FIG. 6C shows a perspective view of the forceps instrument 600 with an endoscope 10 removably coupled thereto. FIG. 6D shows a perspective view of tool portion 620. FIG. 6E shows a perspective view of tool portion 620 with an endoscope shaft 300 of endoscope 10 removably coupled thereto. Forceps instrument 600 may be a laryngeal forceps instrument, a sinus forceps instrument, or other suitable medical forceps instrument used to remove or alter tissue. For example, during use, a tool portion 620 or shaft may be inserted in a patient's nose, mouth, or throat anatomy where distal tool tips 622 are positioned near tissue that needs to be removed.

On the topside of handle portion 610 is an open channel 611 via which a rigid attachment coupler 200 of endoscope 10 can be removably, mechanically, and electrically coupled to handle portion 610. The rigid attachment coupler 200 can be secured in a top-down manner by pushing and sliding rigid attachment coupler 200 in the open channel 611. To secure the mechanical connection, an interior surface of the open channel 611 can include ridges and/or spring-loaded protrusions (not directly shown in these figures). Rigid attachment coupler 200 can be secured in place by i) pushing it down into open channel 621 along openings of two adjacent grooves 223; and ii) sliding rigid attachment coupler 200 relative to open channel 611 to position one or more ridges of open channel 611 within a respective groove 223 of the adjacent grooves 223 such that a distal portion of sections 221 adjacent the grooves 233 prevent lifting of the rigid attachment coupler 200 (i.e., they block the ridges). Additionally, when the assembly is slid, an additional protrusion within open channel 611 (e.g., a spring-loaded protrusion) can be secured within recessed indentation 222 of the section 221 positioned next to the two grooves 223. In the illustrated example, a protrusion that locks into a recessed indentation 222 can be positioned on the inner surface of the illustrated upside down "U" that is on the sidewall of the open channel 611. The "U" can allow the protrusion to bend outward and away from the indent when the endoscope is removed. The circles on each end of the "U" can correspond to pins the jut out into the channel and engage the grooves 223. Other examples of open channels including ridges and/or spring-loaded protrusions that can be incorporated into an instrument handle and adapted to mechanically couple to a rigid attachment coupler 200 are illustrated with respect to FIGS. 11A, 12A-12B, 13A, and 16A of U.S. Pat. No. 11,529,040, which is incorporated herein by reference in its entirety.

Rigid attachment coupler 200 and open channel 611 are also electrically coupled by engaging one or more electrical contacts 225 of rigid attachment coupler 200 with one or more electrical contacts 615 positioned on a surface of open channel 611. This electrical connection can enable data transfer and/or power transfer between endoscope 10 and forceps instrument 600. In some implementations, endoscope 10 can supply power to forceps instrument 600 via this connection. By virtue of powering instrument 600 using mounted endoscope 10, the requirement of a separate power source to power the instrument is eliminated, and the overall footprint of the modular endoscopic system can be reduced. As such, the ergonomics of the system can be greatly improved by this configuration. In some implementations, described below, one or more light emitting devices 624 of tool portion 620 can be powered by endoscope 10 (e.g., via a battery contained in endoscope housing 100). In such implementations, depending on the orientation and positioning of the light emitting device(s) along tool portion 620, it may not be necessary to incorporate any light emitting device in endoscope 10, thereby enabling a simpler and more compact endoscope design. In some implementations, distal blades 622 of tool portion 620 can be powered by endoscope housing 100. In some implementations, forceps instrument 600 can instead supply power to endoscope 10 (e.g., via a battery housed in handle portion 610) via this electrical connection.

As depicted, tool portion 620 includes an open channel 621 for guiding and/or removably coupling to endoscope shaft 300. The open channel 621 can run parallel to a shaft 623 that couples blades 622 to handle portion 610. Other implementations for guiding and securing endoscope shaft 300 to instrument shaft 623 are envisioned. Such attachment mechanisms might include magnetic, adhesive, suction, "zip-lock", or guide channels indented within instrument shaft 623. In addition, at the distal end of open channel 621, proximal to blades 622 and on each side of camera sensor 350 are positioned light emitting devices 624 (e.g., LEDs) to illuminate the anatomical cavity being operated on. The light emitting devices 624 can be powered via the electrical connection between handle portion 610 and rigid attachment coupler 200, using one or more wires running through open channel 621 to light emitting devices 624. The positioning of the blades 622 of the forceps 600 instrument directly in front of a camera sensor 350 of endoscope 10 with light emitting devices 624 activated can enable the physician to properly visualize the blades 622 and anatomical cavity as they contact the tissue. The physician may then actuate the handles of the forceps instrument 600 while viewing blades 622 as they grasp or cut tissue.

In certain urologic, orthopedic, and neurosurgical applications where a fluid filled body cavity is entered by instrument shaft 623, multiple LEDs spaced along the length of instrument shaft 623 may be sufficient to illuminate the anatomic space. In such applications, the LEDs could be offset from the instrument tip thereby limiting the vertical and horizontal size of the instrument tip while still providing adequate light for visualization.

Figure 6F:
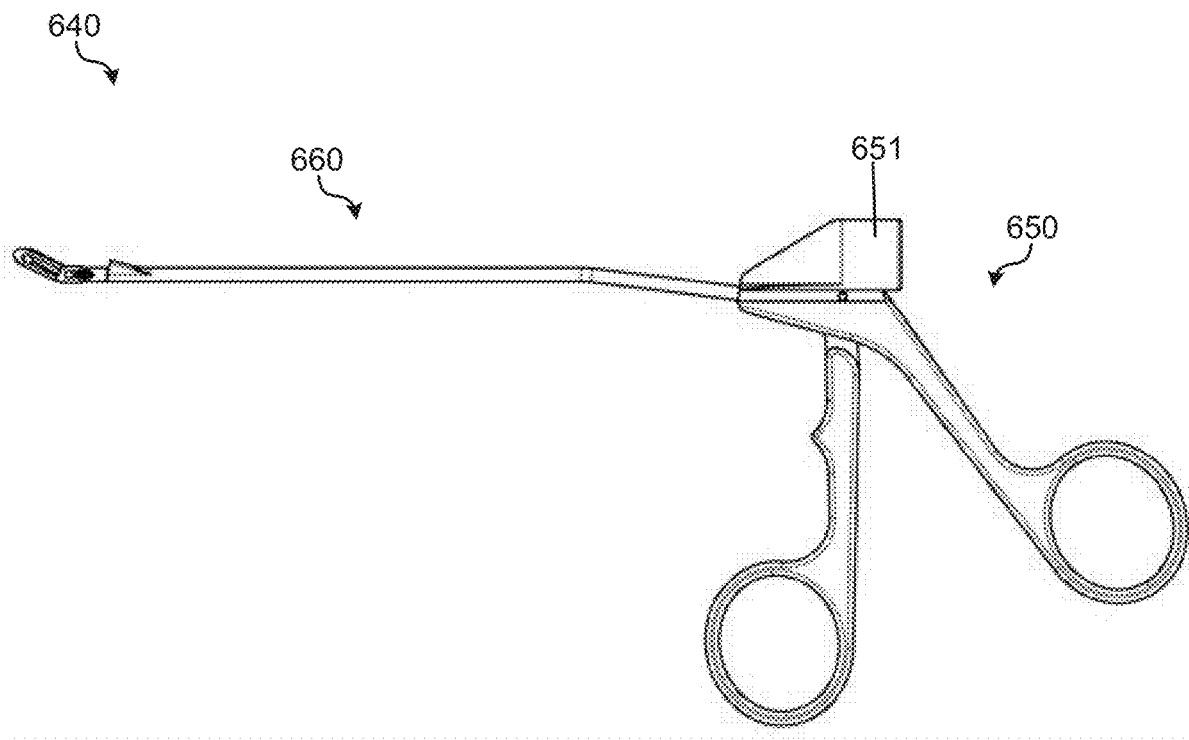
FIG. 6F shows a side elevation view of a forceps instrument that does not require an endoscope shaft for imaging, in accordance with some implementations of the disclosure.
Figure 6G:
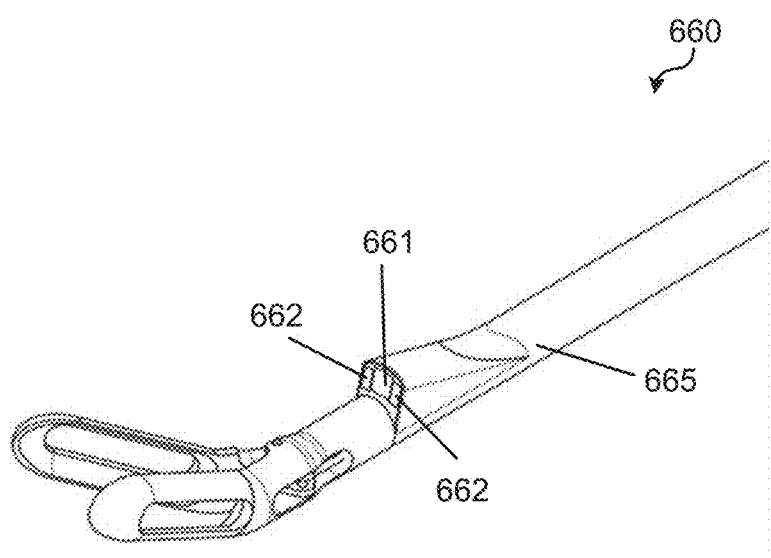
FIG. 6G shows a front perspective view of a tool portion of the forceps instruments of FIG. 6F.

FIGS. 6F-6G show an implementation of a forceps instrument 640 that does not require an endoscope shaft, in accordance with some implementations of the disclosure. FIG. 6F shows a side view of forceps instrument 640. FIG. 6G shows a front perspective view of a tool portion 660 of forceps instruments 640. As depicted, an image sensor 661 (e.g., optical CMOS chip) and adjacent light emitting devices 662 (e.g., LEDs) are built into the distal instrument shaft 665 of tool portion 660, eliminating the need for an endoscope shaft or open channel for guiding and/or removably coupling the instrument to the endoscope shaft 300. In this implementation, endoscope housing connector segment 120 as shown in FIG. 2A can insert into an opening of proximal connector 651 (similar to proximal connector 210), which is fully integrated into the proximal instrument handle portion 650 of forceps instrument 640.

Figure 6H:
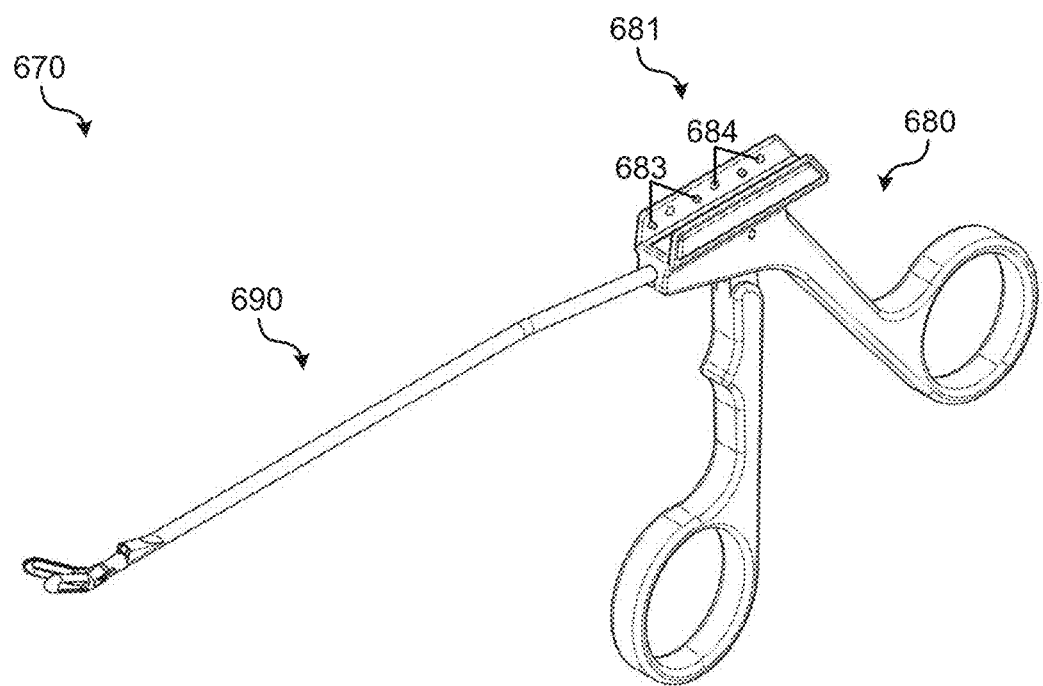
FIG. 6H shows a side perspective view of another forceps instrument that does not require an endoscope shaft for imaging, in accordance with some implementations of the disclosure.
Figure 6I:
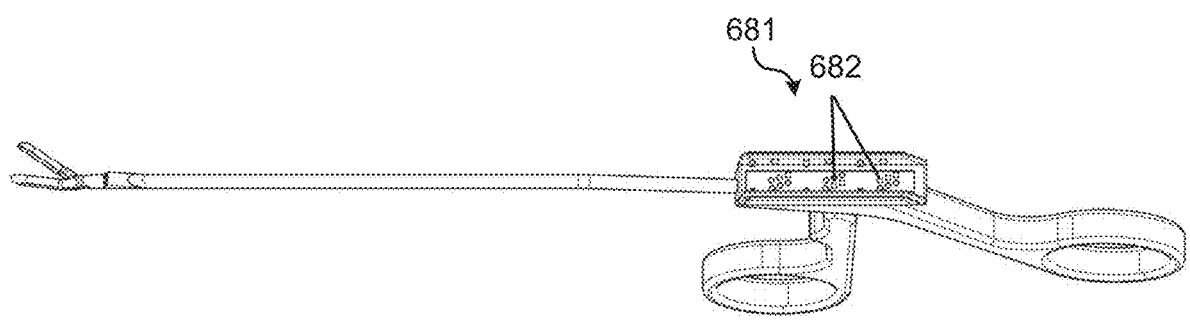
FIG. 6I shows a top view of the forceps instrument of FIG. 6H.
Figure 6J:
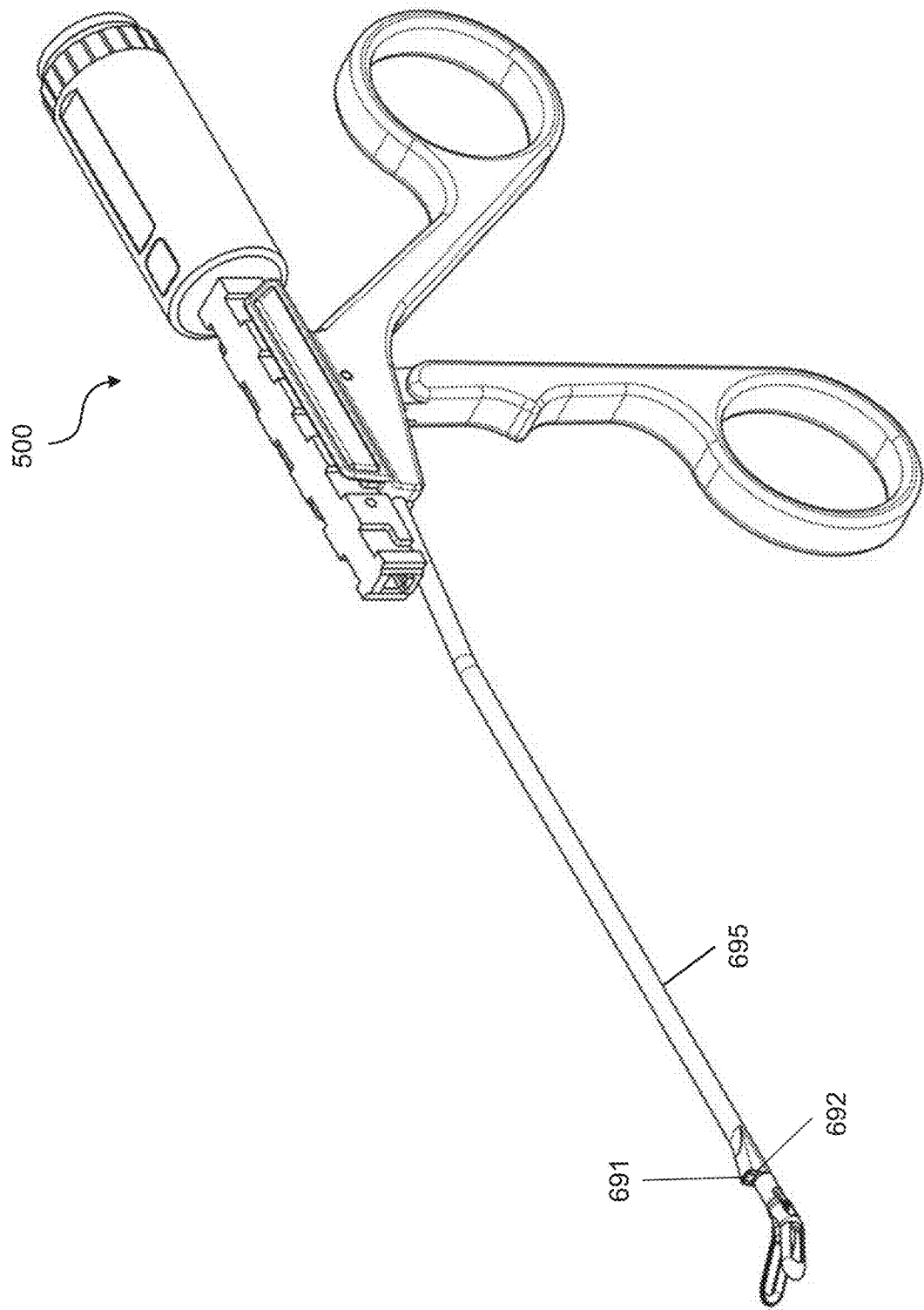
FIG. 6J shows a side perspective view of the forceps instrument of FIG. 6H with the integrated endoscope housing assembly depicted in FIG. 5D mounted thereto.

FIGS. 6H-6J show another implementation of a forceps instrument 670 that does not require an endoscope shaft, in accordance with some implementations of the disclosure. FIG. 6H shows a side perspective view of forceps instrument 670. FIG. 6I shows a top view of forceps instrument 670. FIG. 6J shows a side perspective view of forceps instrument 670 with the integrated endoscope housing assembly 500 depicted in FIGS. 5D-5E mounted thereto. As shown, the forceps instrument 670 includes a handle portion 680 and a tool portion 690. Similar to the prior example, an image sensor 691 (e.g., optical CMOS chip) and adjacent light emitting devices 692 (e.g., LEDs) are built into the distal instrument shaft 695 of tool portion 690, eliminating the need for an endoscope shaft or open channel for guiding and/or removably coupling the instrument 670 to the endoscope shaft. In this implementation, electrical circuit connectivity to power the image sensor 691 and light emitting devices 692 of distal instrument shaft 695 occurs by coupling integrated endoscope housing assembly 500 and open channel 681 located along the superior aspect of instrument handle portion 680. One or more electrical contacts 225 of rigid attachment coupler 200 pairs with one or more electrical contacts 682 positioned on the surface of open channel 681 to complete the circuit. The rigid attachment coupler 200 can be secured in a top-down manner by pushing and sliding rigid attachment coupler 200 in the open channel 681. To secure the mechanical connection, an interior surface of the open channel 681 can include ridges 683 and/or spring-loaded protrusions 683.

Figure 7A:
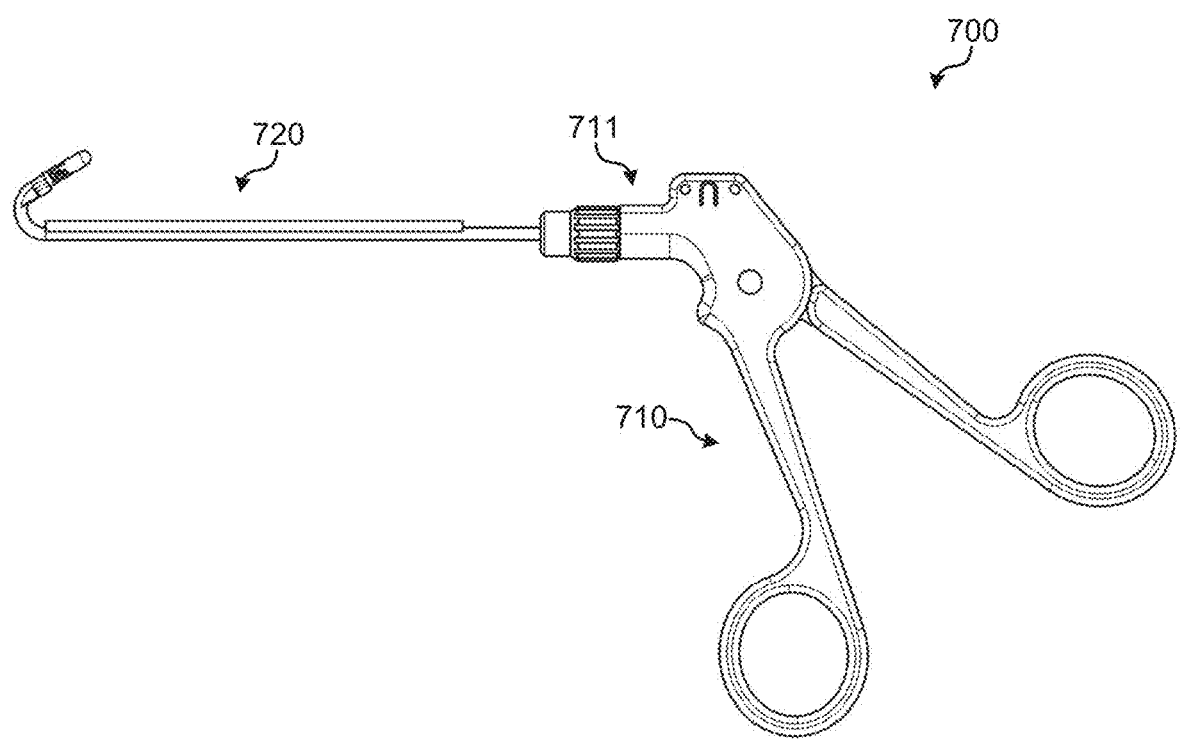
FIG. 7A shows a side view of a forceps instrument with a curved distal end that can be used with a modular endoscope system, in accordance with some implementations of the disclosure.
Figure 7B:
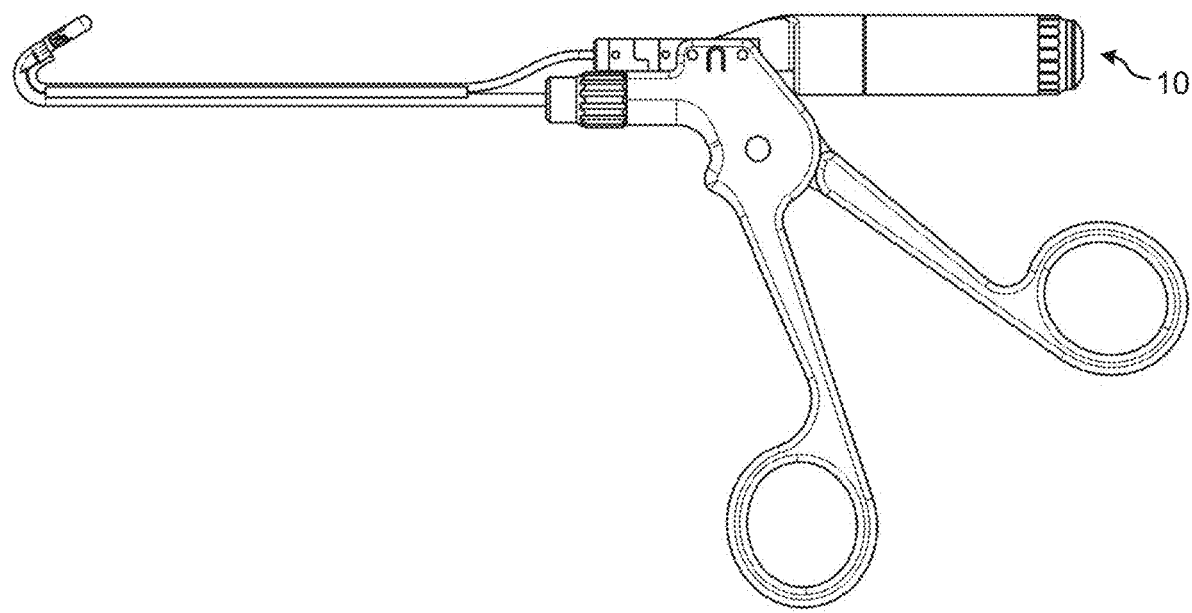
FIG. 7B shows a side view of the forceps instrument of FIG. 7A with an endoscope removably coupled thereto.
Figure 7C:
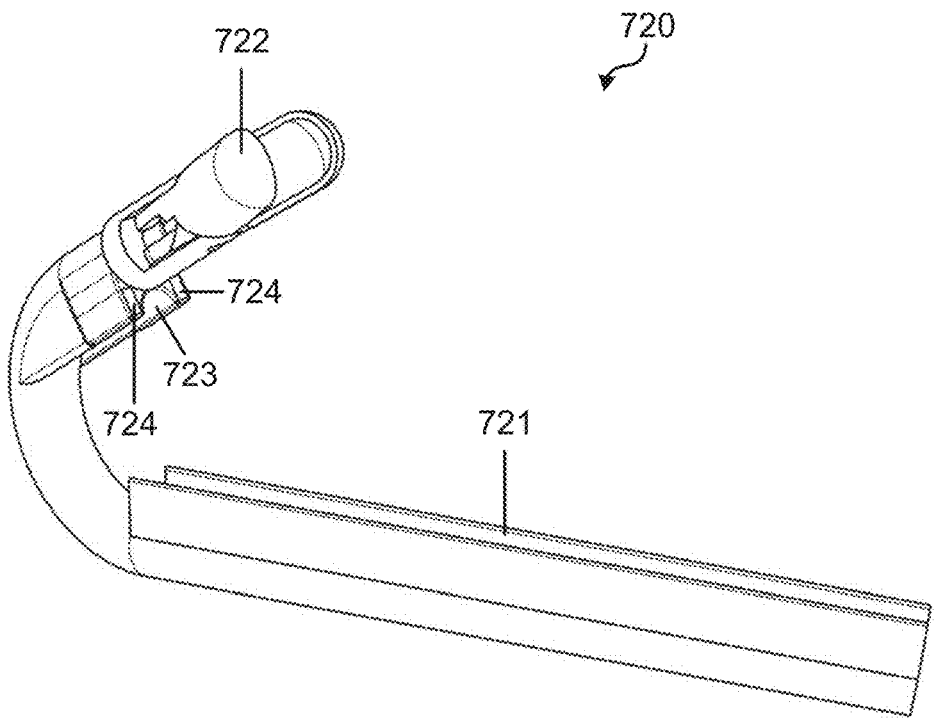
FIG. 7C shows a perspective view of a part of a tool portion of the forceps instrument of FIG. 7A.
Figure 7D:
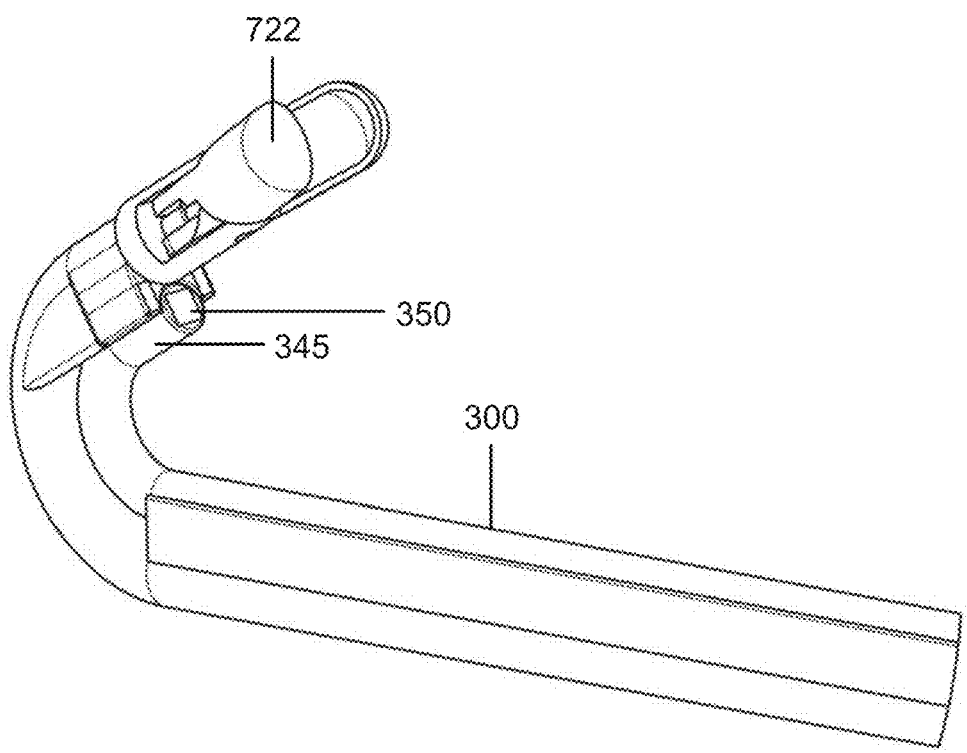
FIG. 7D shows a perspective view of a part of tool portion of the forceps instrument of FIG. 7A, with an endoscope shaft coupled thereto.

FIGS. 7A-7D show different views of another forceps instrument 700 that can be used with the modular endoscope systems described herein. As depicted, forceps instrument 700 includes a proximal handle portion 710 and a distal tool portion 720. FIG. 7A shows a side view of forceps instrument 700. FIG. 7B shows a side view of the forceps instrument 600 with an endoscope 10 removably coupled thereto. FIG. 7C shows a perspective view of a part of tool portion 720. FIG. 7D shows a perspective view of a part of tool portion 720 with endoscope shaft 300 coupled thereto.

In this example, the tool portion 720 curves at a distal end. The forceps instrument 700 can be particularly suited as a sinus forceps instrument. For example, tool portion 720 can be inserted through a nasal passage and into a sinus cavity of a patient, and blades 722 of tool portion 700 may be positioned near tissue within a maxillary or frontal sinus that needs to be removed. On a topside of handle portion 710 is an open channel 711 via which a rigid attachment coupler 200 of endoscope 10 can be removably, mechanically, and electrically coupled to handle portion 710. The connection between the open channel 711 and rigid attachment coupler 200 can be secured in a similar manner to that described above with reference to the connection between open channel 611 of forceps instrument 600 and rigid attachment coupler 200.

Tool portion 720 also includes an open channel 721 for guiding and/or removably coupling to portion of endoscope shaft 300. At the curved distal end of tool portion 720 are blades 722 and an additional coupler 723 for securing distal segment 345 of the endoscope shaft 300. In addition, the curved distal end of tool portion 720 can incorporate light emitting devices 724 (e.g., LEDs) to illuminate the anatomical cavity being operated on. The light emitting devices 724 can be positioned on each side of coupler 723 such that they are on each side of the camera sensor 350 of the coupled endoscope 10 and proximal to blades 722. The light emitting devices 724 can be powered via the electrical connection between handle portion 710 and rigid attachment coupler 200, using one or more wires running through tool portion 720 to light emitting devices 724. The positioning of the blades 722 of the forceps instrument 700 directly in front of a camera sensor 350 of an endoscope 10 with light emitting devices 724 activated can enable the physician to properly visualize the blades 722 and sinus cavity as they contact the tissue. The physician can then actuate the handles of the forceps instrument 700 while viewing blades 722 as they grasp or cut tissue.

Figure 7E:
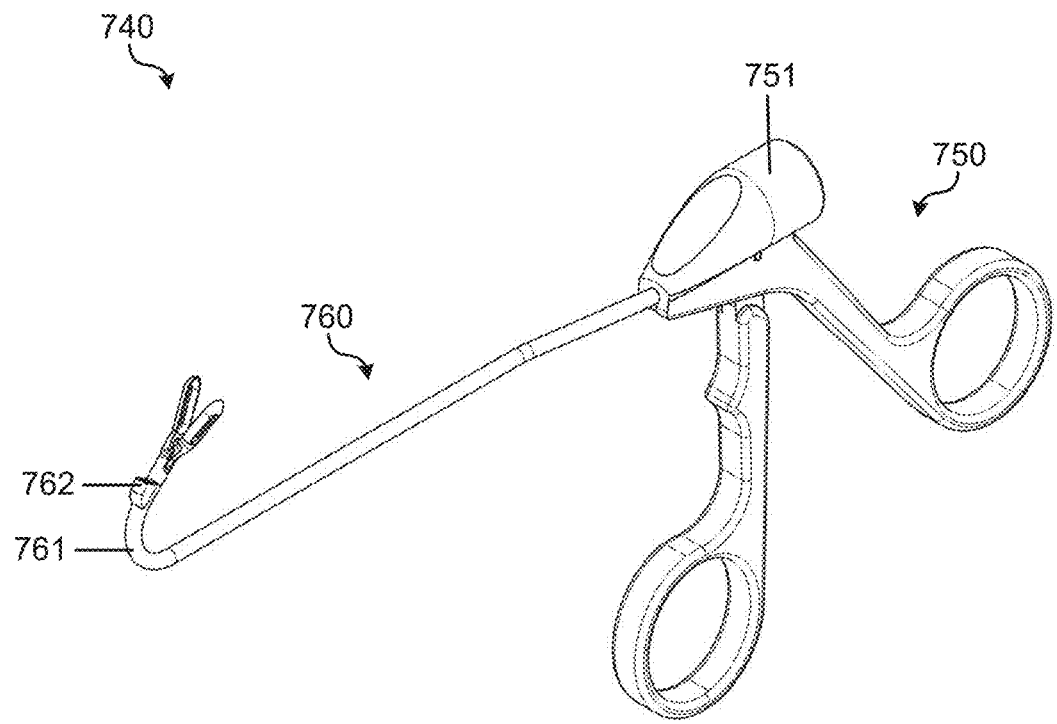
FIG. 7E shows a side perspective view of a forceps instrument with a curved distal end that does not require an endoscope shaft for imaging, in accordance with some implementations of the disclosure.
Figure 7F:
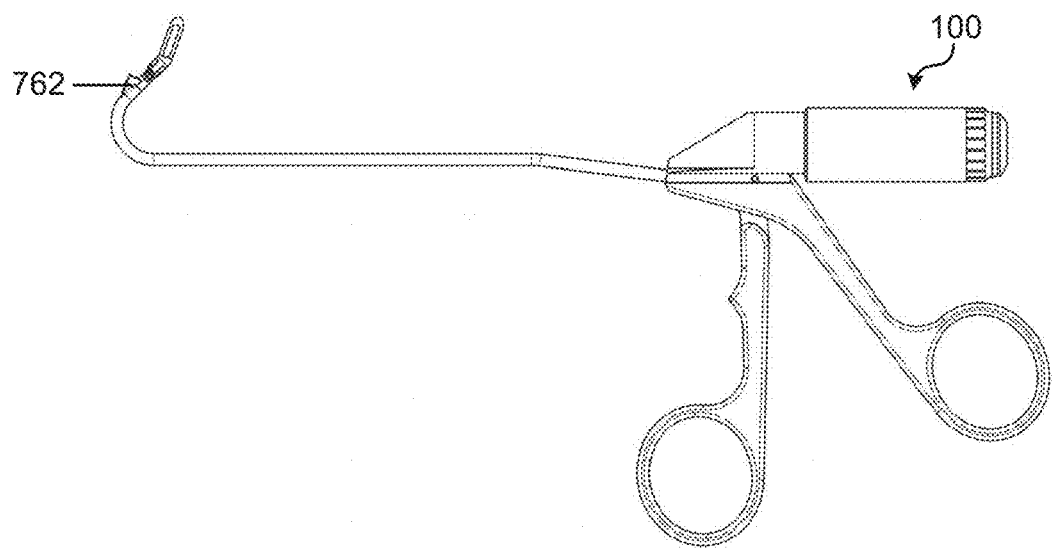
FIG. 7F shows a side elevation view of the forceps instrument of FIG. 7E with an endoscope housing 100 attached thereto.

FIGS. 7E-7F show an implementation of a forceps instrument 740 with a curved distal end that does not require an endoscope shaft, in accordance with some implementations of the disclosure. FIG. 7E shows a side perspective view of forceps instrument 740. FIG. 7F shows a side elevation view of forceps instrument 740 with an endoscope housing 100 attached thereto. As depicted, an assembly 762 including image sensor(s) (e.g., optical CMOS chip) and/or light emitting device(s) can be built into the curved distal instrument shaft 761 of tool portion 760, eliminating the need for an endoscope shaft or open channel for guiding and/or removably coupling the instrument to the endoscope shaft 300. Endoscope housing connector segment 120 of endoscope housing 100 can insert into an opening of proximal connector 751, which is fully integrated into the proximal instrument handle portion 750 of forceps instrument 740.

Figure 7G:
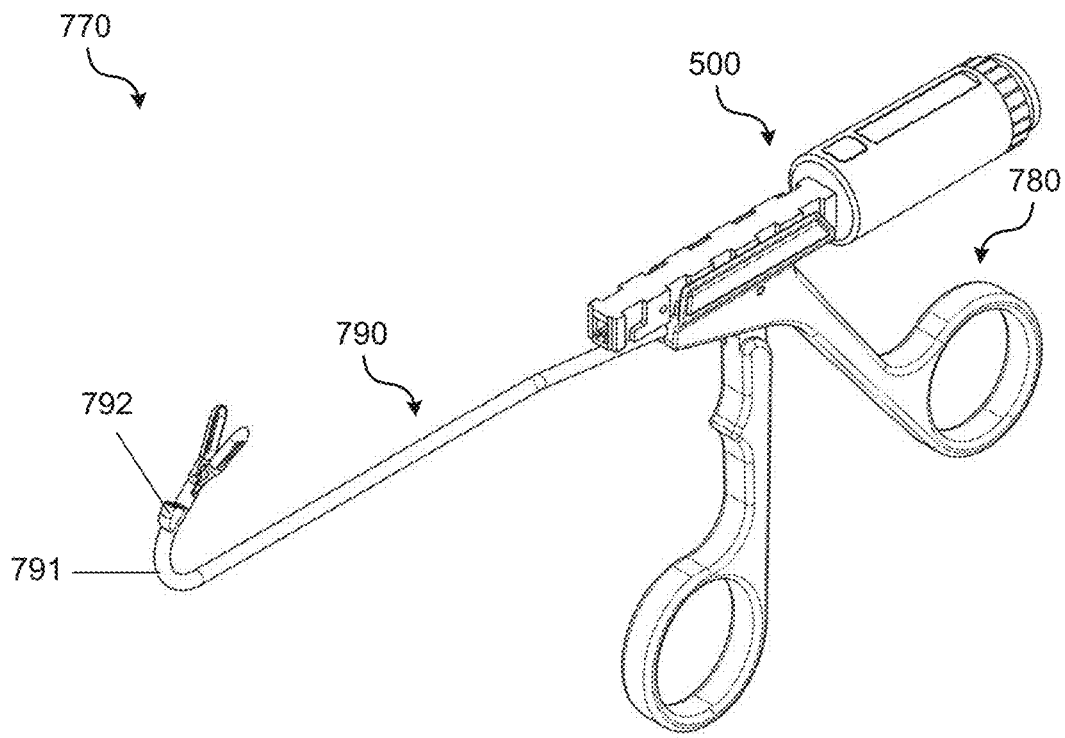
FIG. 7G shows a side perspective view of another forceps instrument with a curved distal end that does not require an endoscope shaft for imaging, with an integrated endoscope housing assembly attached thereto, in accordance with some implementations of the disclosure.
Figure 7H:
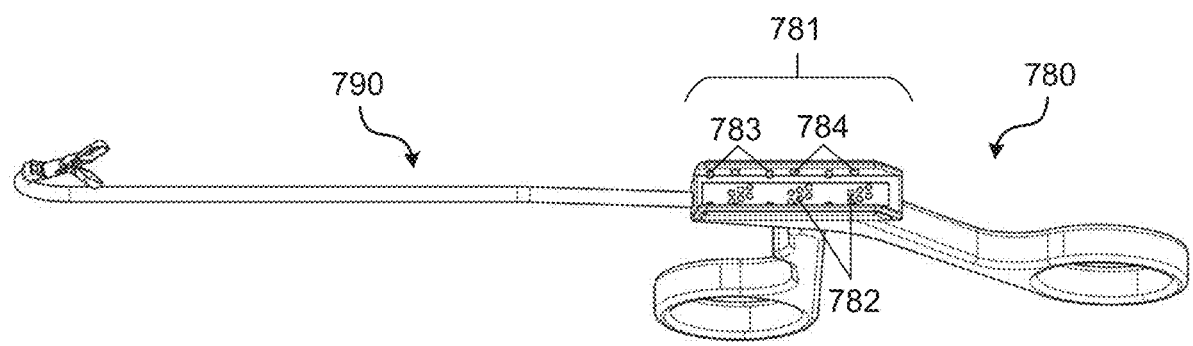
FIG. 7H shows a top view of the forceps instrument of FIG. 7G.

FIGS. 7G-7H show another implementation of a forceps instrument 770 with a curved distal end that does not require an endoscope shaft, in accordance with some implementations of the disclosure. FIG. 7G shows a side perspective view of forceps instrument 770 with an integrated endoscope housing assembly 500 attached thereto. FIG. 7H shows a top view of forceps instrument 770. As shown, the curved forceps instrument 770 includes a handle portion 780 and a tool portion 790. An assembly 792 including an image sensor and/or light emitting devices (e.g., LEDs) can be built into the curved distal instrument shaft 791 of tool portion 790. Electrical circuit connectivity to power the image sensor and/or light emitting devices occurs by coupling integrated endoscope housing assembly 500 and open channel 781 of instrument handle portion 780. One or more electrical contacts 225 of rigid attachment coupler 200 pairs with one or more electrical contacts 782 positioned on the surface of open channel 781 to complete the circuit. The rigid attachment coupler 200 can be secured in a top-down manner by pushing and sliding rigid attachment coupler 200 in the open channel 781. To secure the mechanical connection, an interior surface of the open channel 781 can include ridges 783 and/or spring-loaded protrusions 784.

Figure 8:
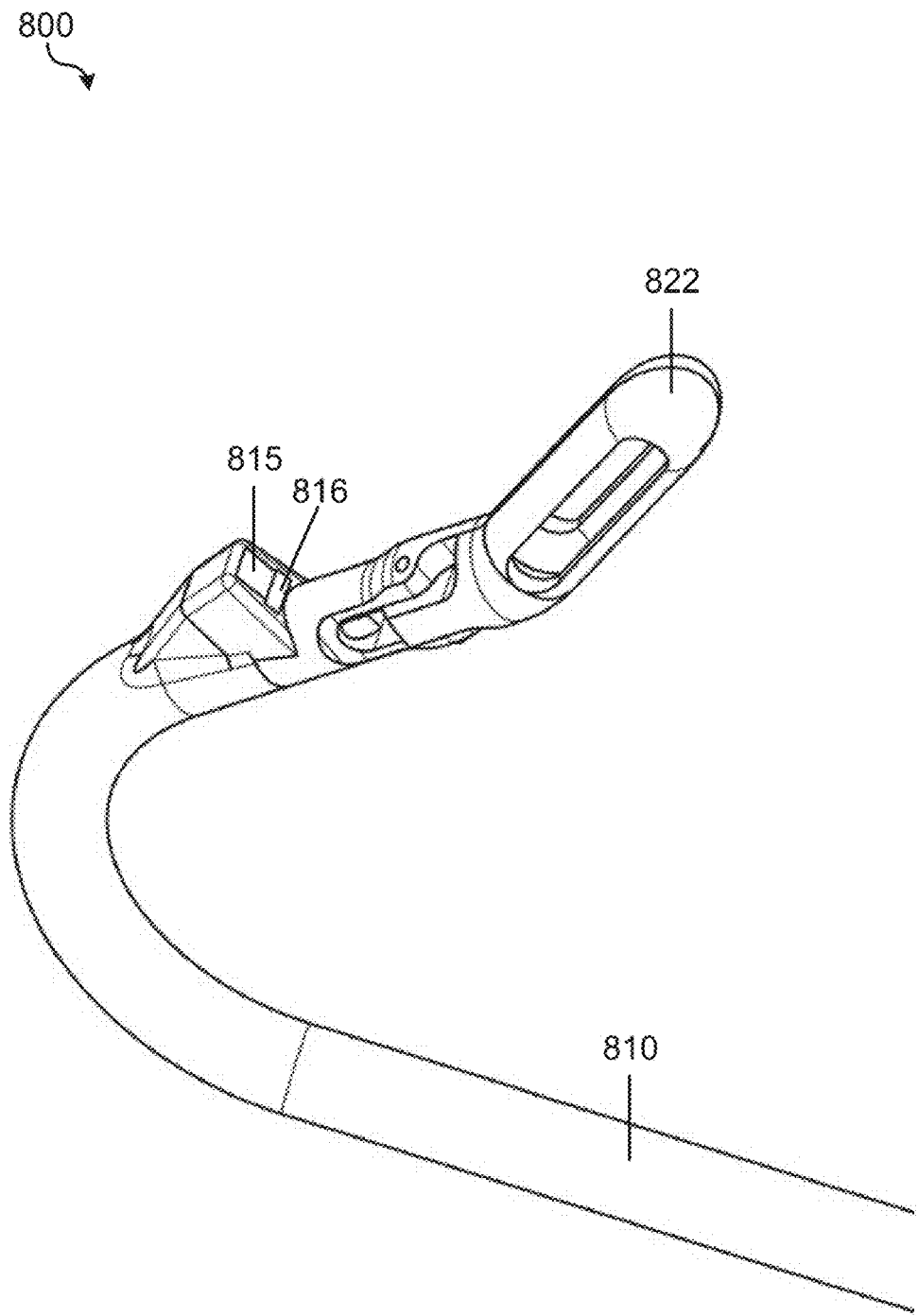
FIG. 8 shows a close-up perspective view of a tool portion that can be used with a forceps instrument, in accordance with some implementations of the disclosure.

FIG. 8 shows a close-up perspective view of a tool portion 800 that can be used with the forceps instruments described with reference to FIGS. 7E-7H (i.e., as tool portion 760 or 790). In this example, the tool portion 800 includes a shaft 810 that can distally extend from a handle portion (not shown) into a distal segment that curves at a distal end of the tool portion 800. The distal end includes blades 822, camera/image sensor 815, and light emitting device 816. The camera/image sensor 815 can be configured to transmit collected image signals to an endoscope or endoscope housing. The electrical connection to the endoscope or endoscope housing can be established via a handle portion of the instrument as described above. In the examples of FIGS. 7E-7H and FIG. 8, the image sensor(s)/light emitting device(s) can be placed on the back side of the curved instrument shaft, thereby minimizing the need for a separate endoscope shaft to have to wrap around the tool shaft to gain the same perspective. In other anticipated implementations, depending on the angle of visualization required, assembly 792 could be positioned in any linear or circumferential orientation related to tool tip 722 or instrument shaft 790.

Although FIGS. 6A-8 illustrate examples of medical instruments or tool portions that can be used with modular endoscope systems described herein, it should be appreciated that a variety of other instruments having a handle portion and tool portion could be similarly removably, mechanically, and electrically coupled to an endoscope or endoscope housing. It should be appreciated that depending on the needs of the medical application the number and/or positioning of light emitting devices and/or image sensors on the tool portion of the instrument can be varied.

FIGS. 9A-9D show different views of an adapter 900 that can be used with the modular endoscope systems described herein, in accordance with some implementations of the disclosure. The adapter 900 includes an upper open channel 910 for removably, mechanically, and electrically coupling adapter 900 to a first component, and a lower rigid attachment coupler 920 opposite the upper open channel 910, for removably, mechanically, and electrically coupling adapter 900 to a second component. The first component or the second component can be a medical instrument, an endoscope component, or a cable connector. As further described below, the adapter 900 can function as a connector gender adapter. It should be noted that the first and second components may not be directly opposed, but instead could be offset 90 degrees instead of 180 degrees. Additionally, more than two components could be configured into the same adapter such that more than one coupling adapter, cable or instrument could be attached simultaneously to a modified coupling adapter (not shown) that in turn couples to the rigid attachment segment 220. In this manner the number of connectable devices to a single endoscope housing could be amplified.

Figure 9A:
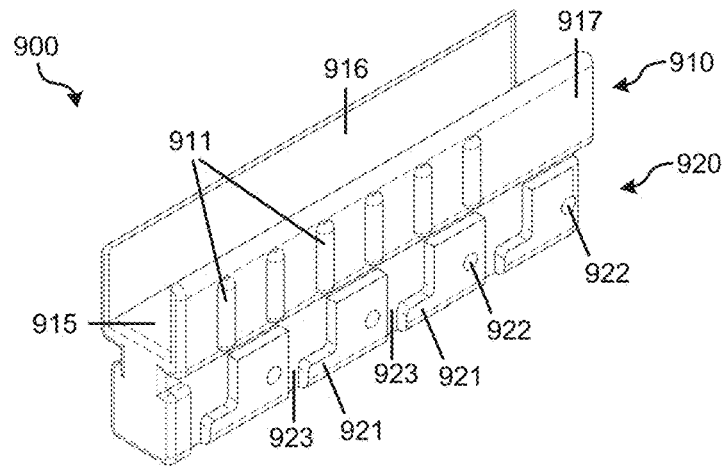
FIG. 9A shows a top, side, and perspective view of an adapter that can be used with a modular endoscope system, in accordance with some implementations of the disclosure.
Figure 9B:
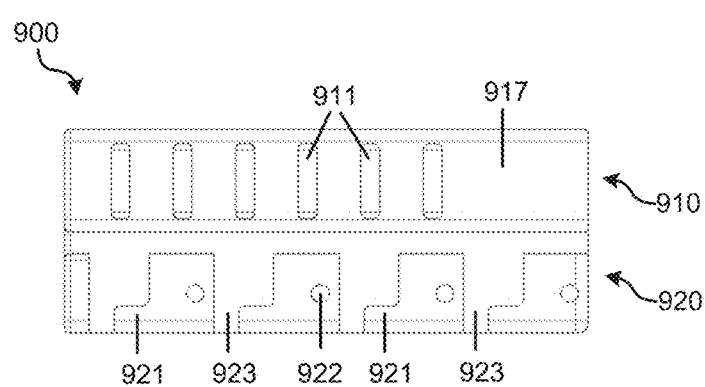
FIG. 9B shows a side view of the adapter of FIG. 9A.
Figure 9C:
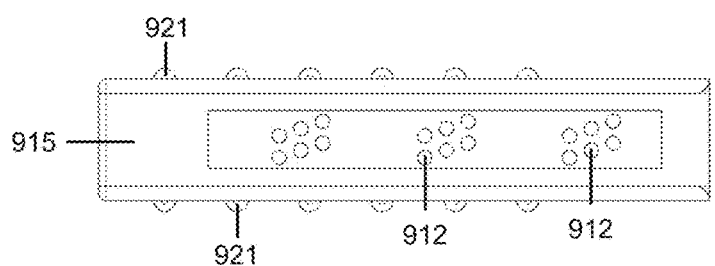
FIG. 9C shows a top plan view of the adapter of FIG. 9A.
Figure 9D:
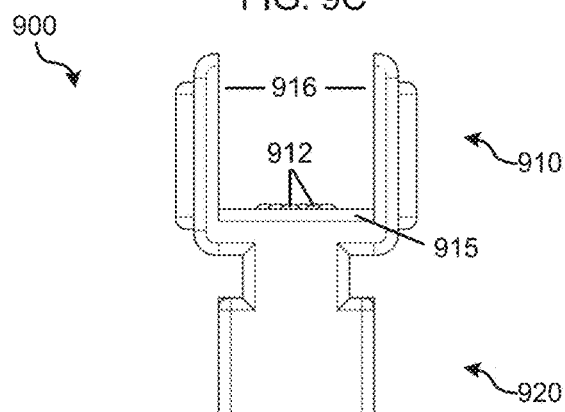
FIG. 9D shows a front view of the adapter of FIG. 9A.
Figure 9E:
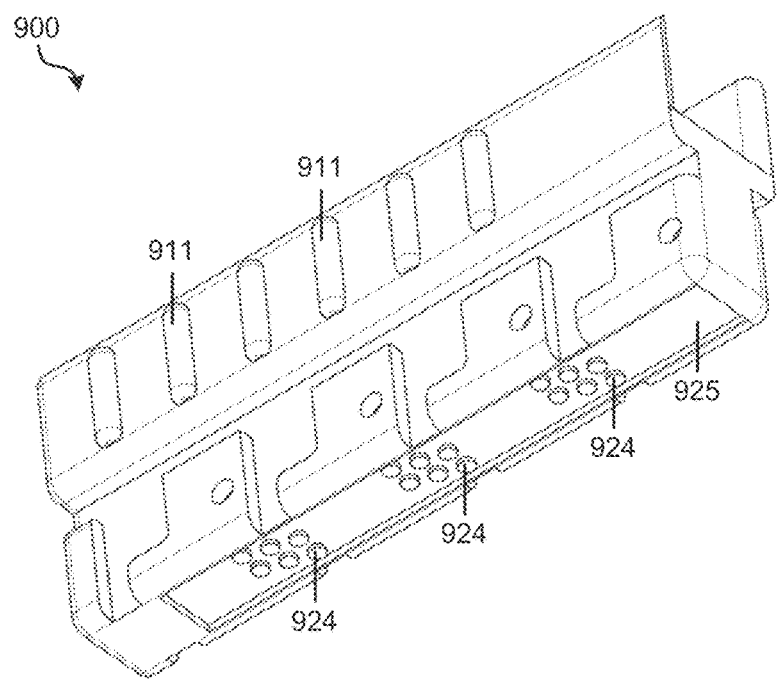
FIG. 9E shows a bottom, side, and perspective view of the adapter of FIG. 9A.
Figure 9F:
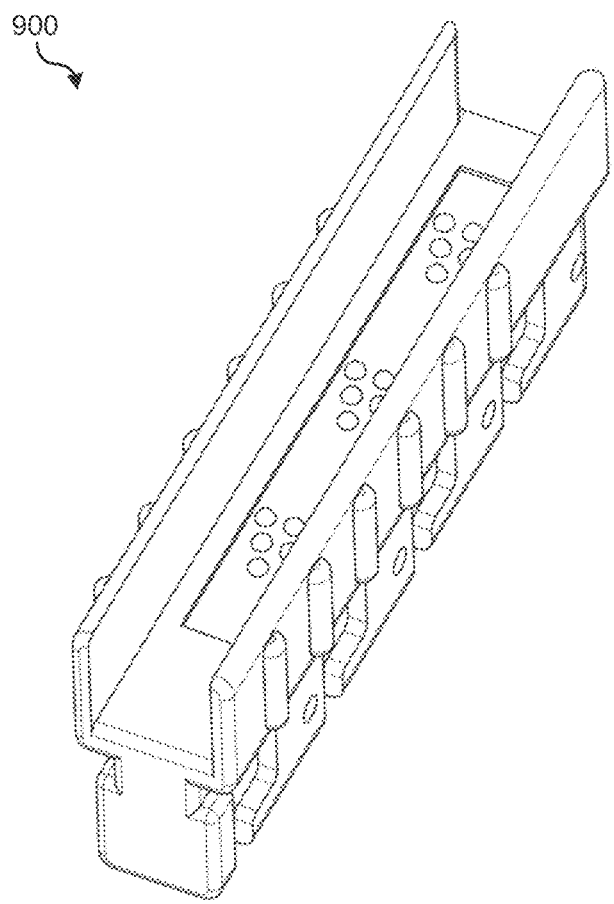
FIG. 9F shows a top perspective view of the adapter of FIG. 9A.

FIG. 9A shows a top, side, and perspective view of adapter 900. FIG. 9B shows a side view of adapter 900. FIG. 9C shows a top plan view of adapter 900. FIG. 9D shows a front view of adapter 900. FIG. 9E shows a bottom, side, and perspective view of adapter 900. FIG. 9F shows a top perspective view of adapter 900.

The upper open channel 910 includes inner sidewalls 916, inner floor 915, and outer sidewalls 917. Positioned on outer sidewalls are ridges 911 that can help a user grip the sides of the adapter 900 when coupling it to another component. In other implementations, ridges 911 can be omitted. Positioned on inner floor 915 are one or more electrical contacts 912 configured to electrically couple adapter 900 to a first component. The upper open channel 910 can be configured to removably couple to a rigid attachment segment 220 of a rigid attachment coupler 200, a rigid attachment connector as further described below, or other component having a corresponding mating structure. To that end, an interior surface of upper open channel 910 can include ridges and/or spring-loaded protrusions (not shown in the figures) on inner sidewalls 916 that enable a mechanical connection to a rigid attachment segment 220 or other similar structure. Examples of open channels including ridges and/or spring-loaded protrusions that can be incorporated into adapter 900 and adapted to mechanically couple to a rigid attachment coupler 200 or other similar structure are illustrated with respect to FIGS. 11A, 12A-12B, 13A, and 16A of U.S. Pat. No. 11,529,040. In alternative implementations, upper open channel 910 can utilize some other suitable rigid attachment mechanism (e.g., snap on, magnetic etc.) as described above that enables a mechanical attachment with another component.

The lower rigid attachment coupler 920 can be similarly structured as rigid attachment segment 220 of rigid attachment coupler 200. On its surface are formed a plurality of grooves/slots 923 and a plurality of sections 921 that protrude relative to the grooves 923, each of the sections 921 having a recessed indentation or hole 922. In this example, the plurality of grooves 923 and the plurality of sections 921 alternate along the longitudinal length of lower rigid attachment coupler 920. At least one groove 923 and at least one section 921 (e.g., a groove 923 adjacent to section 921) can be used to mechanically couple the lower rigid attachment coupler 920 to a component. Although this example shows grooves 923 and sections 921 formed on two opposing sides/surfaces of rigid attachment coupler 920, in other implementations they may be formed on just one side. In alternative implementations, lower rigid attachment coupler 920 can utilize some other suitable rigid attachment mechanism (e.g., magnetic, snap on, etc.) as described above that enables a mechanical attachment with another component. As such, other mechanisms for removably and mechanically coupling the lower rigid attachment coupler 920 to another component are contemplated.

Lower rigid attachment coupler 920 also includes a surface 925 including one or more electrical contacts 924 for electrically coupling lower rigid attachment coupler 920 to a second component or cable configuration described herein. The electrical connections established via electrical contacts 924 of lower rigid attachment coupler 920 and electrical contacts 912 of upper open channel 910 can enable data transfer and/or power transfer between the first and second components that are coupled to adapter 900. For example, in some implementations video signal data can be passed via adapter 900 from a first component (e.g., instrument with an integrated camera) to a second component (e.g., endoscope housing or control box including circuitry that processes video signal data).

As such, by virtue of the illustrated adapter 900, power and/or data signals can be directly transferred between medical devices in a serial manner without having to connect each component individually to a central control unit/box or separate power supply. This can reduce the overall profile of the medical equipment used for a procedure, improving the ergonomics for the physician. Furthermore, this configuration may provide for additional adaptability in the manner instruments are arranged for procedures. For example, a detachable component (e.g., rigid attachment coupler 200) of an endoscope 10 could potentially be used to supply power to a secondary instrument via adapter 900.

Figure 10A:
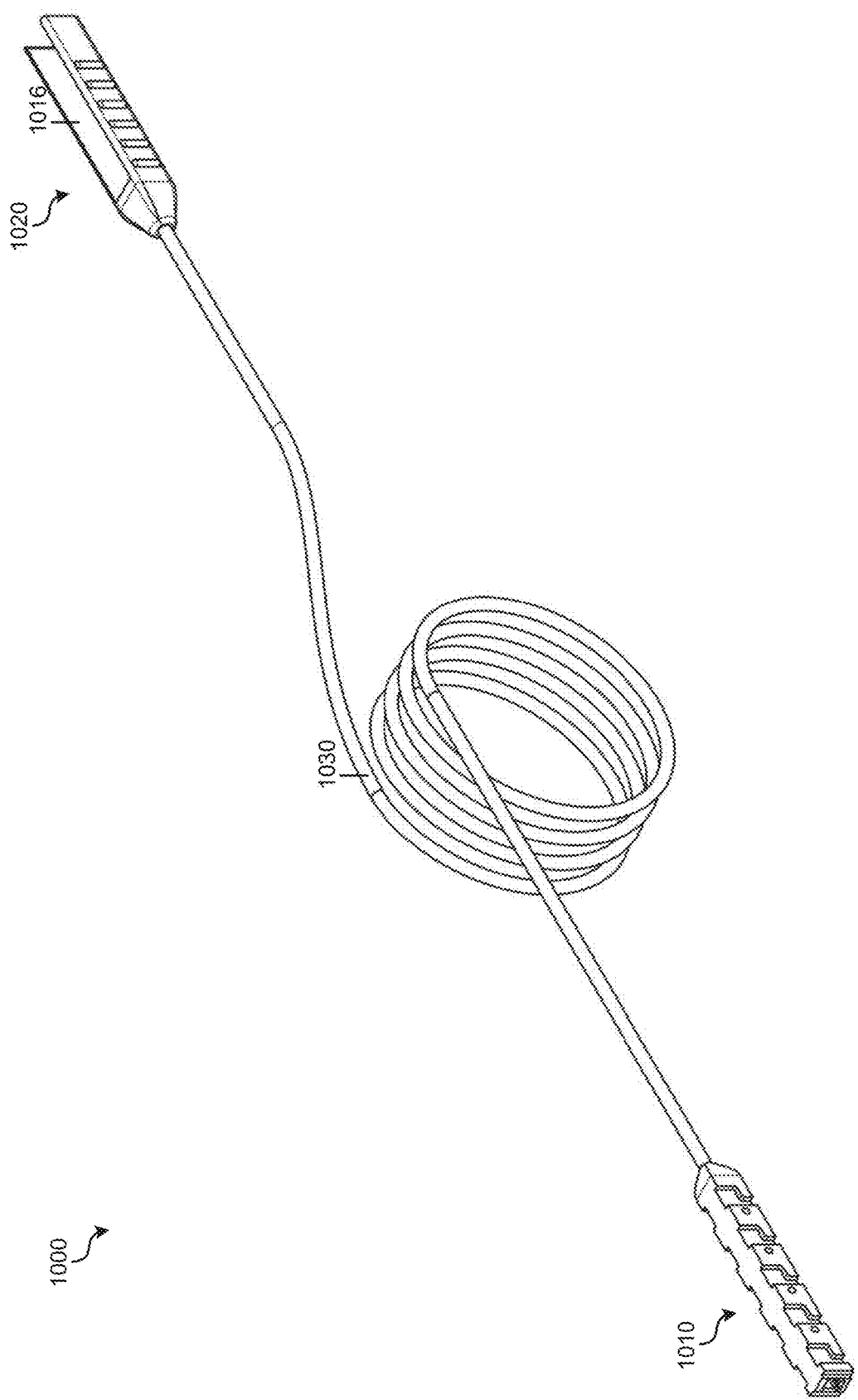
FIG. 10A shows a perspective view of a cable connector for a modular endoscope system, in accordance with some implementations of the disclosure.

In some implementations, the modular endoscope systems described herein can leverage flexible cable connectors that utilize connection mechanisms compatible with rigid attachment segment 220 of endoscope 10, endoscope housing 100, endoscope housing assembly 500, adapter 900, the connection mechanism on an instrument, and/or another cable connector (single or branched) to enable multiple medical instruments to be easily electrically coupled together for data and/or power transfer. For example, FIGS. 10A-10D illustrate a cable connector 1000 for a modular endoscope system, in accordance with some implementations of the disclosure. FIG. 10A shows a perspective view of the cable connector 1000. FIG. 10B shows a bottom view of the cable connector 1000. FIG. 10C shows a side view of the cable connector. FIG. 10D shows a top view of the cable connector 1000. The cable connector 1000 includes a cable 1030 connecting two connectors 1010, 1020 on the opposite ends of cable connector 1000. One connector is a rigid attachment connector 1010, and the other connector is an open channel connector 1020.

Rigid attachment connector 1010 can be similarly structured as rigid attachment segment 220 of rigid attachment coupler 200. On its surface are formed a plurality of grooves/slots 1013 and a plurality of sections 1011 that protrude relative to the grooves 1013, each of the sections 1011 having a recessed indentation or hole 1012. As shown, the plurality of grooves 1013 and the plurality of sections 1011 can alternate along the longitudinal length of rigid attachment connector 1010. At least one groove 1013 and at least one section 1011 (e.g., a groove 1013 adjacent a section 1011) can be used to mechanically couple the rigid attachment connector to an instrument, adapter, connector, or other component. Rigid attachment connector 1010 also includes a surface 1015 including one or more electrical contacts 1014 for electrically coupling rigid attachment connector 1010 to an instrument, an adapter, or another connector.

Open channel connector 1020 can be similarly structured as upper open channel 910. The open channel connector 1020 includes inner sidewalls 1016, inner floor 1017, and outer sidewalls 1018. Positioned on outer sidewalls are ridges 1021 that can help a user grip the sides of open channel connector 1020 when coupling it to another component. In other implementations, ridges 1021 can be omitted. Positioned on inner floor 1017 are one or more electrical contacts 1022 configured to electrically couple open channel connector 1020 to another component such as an instrument, an adapter, or another connector. As such data and/or power transfer can occur via cable 1030 between a first component coupled to rigid attachment connector 1010 and a second component coupled to open channel connector 1020.

Figure 11A:
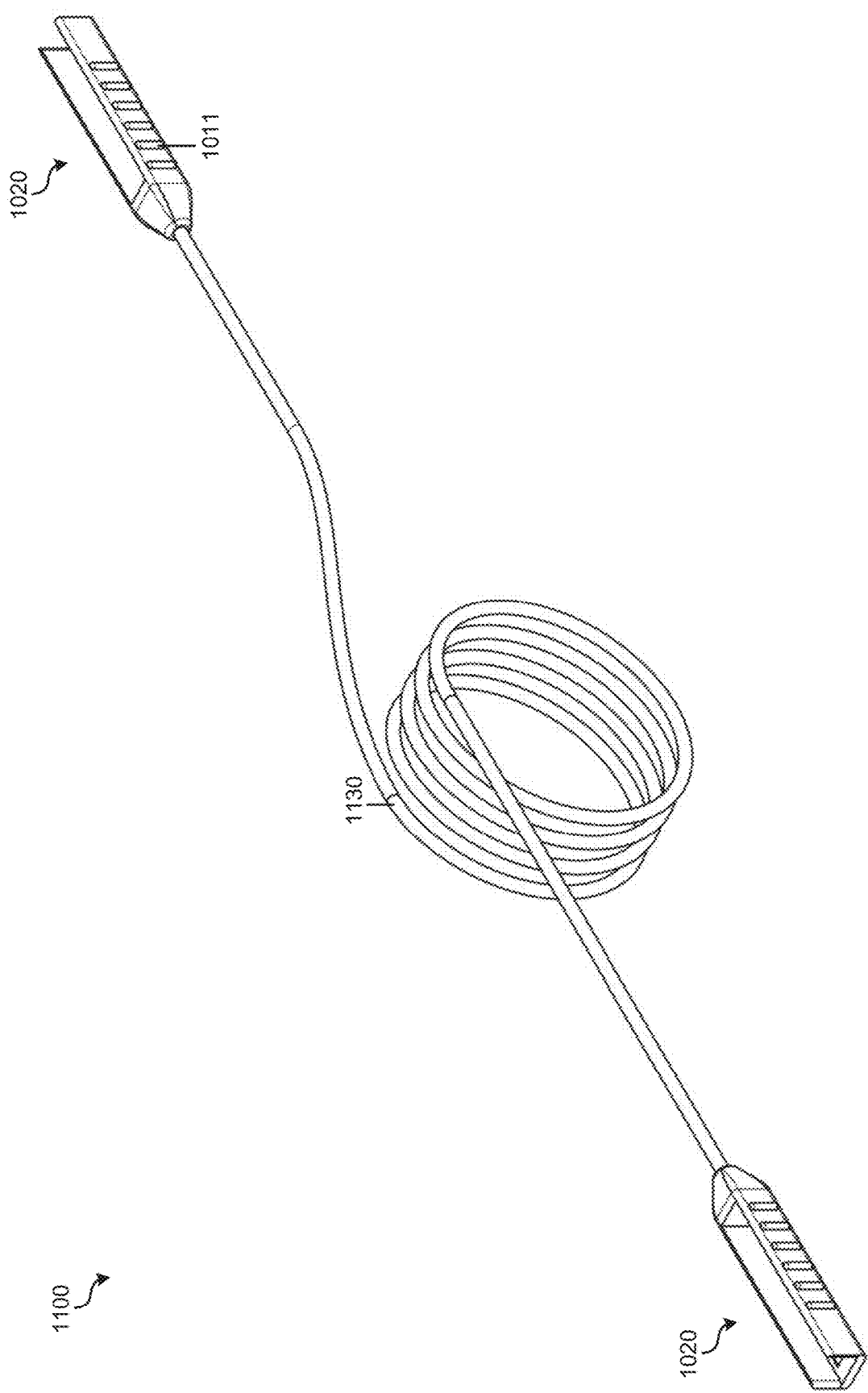
FIG. 11A shows a perspective view of another cable connector for a modular endoscope system, in accordance with some implementations of the disclosure.
Figure 13:
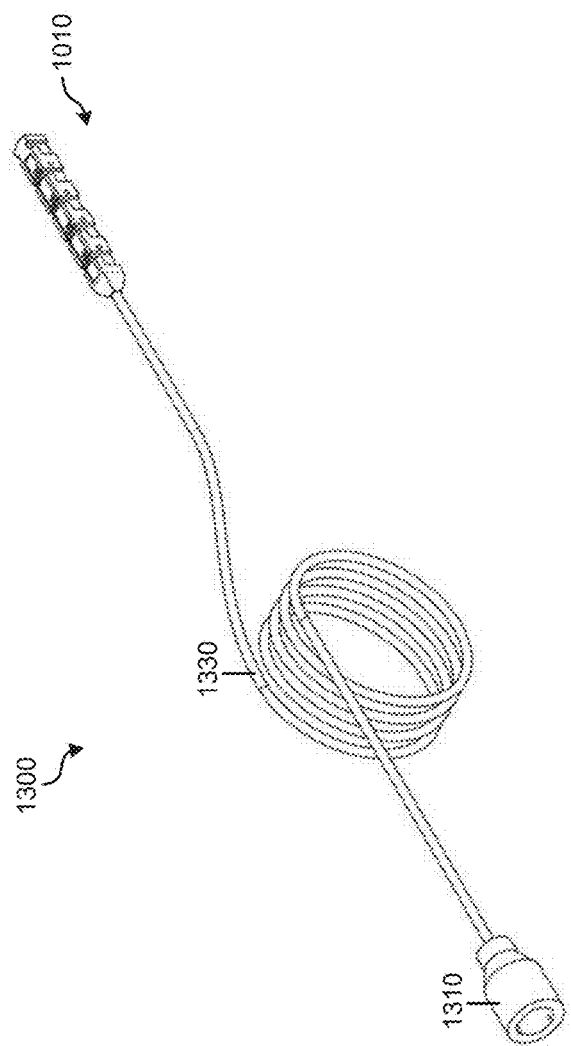
FIG. 13 shows a perspective view of another cable connector for a modular endoscope system, in accordance with some implementations of the disclosure.

FIGS. 11A-11D illustrate another example cable connector 1100 for a modular endoscope system, in accordance with some implementations of the disclosure. FIG. 11A shows a perspective view of the cable connector 1100. FIG. 11B shows a side view of the cable connector 1100. FIG. 11C shows a bottom view of the cable connector 1100. FIG. 11D shows a top view of the cable connector 1100. The cable connector 1100 includes a cable 1130 connecting two open channel connectors 1020 on opposite ends of cable connector 1100. Data and/or power transfer can occur via cable 1130 between a first component coupled to a first open channel connector 1020 and a second component coupled to a second open channel connector 1020.

FIGS. 12A-12B illustrate another example cable connector 1200 for a modular endoscope system, in accordance with some implementations of the disclosure. FIG. 12A shows a perspective view of the cable connector 1200. FIG. 12B shows a bottom view of the cable connector 1200. The cable connector 1200 includes a cable 1230 connecting two rigid attachment connectors 1010 on opposite ends of cable connector 1200. Data and/or power transfer can occur via cable 1230 between a first component coupled to a first rigid attachment connector 1010 and a second component coupled to a second rigid attachment connector 1010.

As further described below, in some implementations a rigid attachment connector 1010 is configured to removably couple to an open channel connector 1020.

In some implementations, cable connectors can be designed that can directly connect to endoscope housing 100 of endoscope 10. In such implementations, a mechanical and electrical connection can be directly established with endoscope housing 100 via the cable connector. To this end, FIG.

13 illustrates another example cable connector 1300 for a modular endoscope system, in accordance with some implementations of the disclosure. The cable connector 1300 includes a cable 1330 connecting a rigid attachment connector 1010 and an endoscope connector 1310 on the opposite ends of cable connector 1300. The endoscope connector 1310 can be similarly structured as proximal connector 210 of rigid attachment coupler 200. For example, a mechanical connection between endoscope connector 1310 and proximal connector segment 120 of endoscope housing 100 can be secured by sliding a protrusion contained in endoscope connector 1310 to junction 123 of groove 122 and rotating the endoscope connector 1320 and endoscope housing connector segment 120 relative to each other. Endoscope connector 1320 can also contain one or more electrical contacts that electrically couple to one or more electrical contacts 121 on a surface of endoscope housing connector segment 120.

Figure 14A:
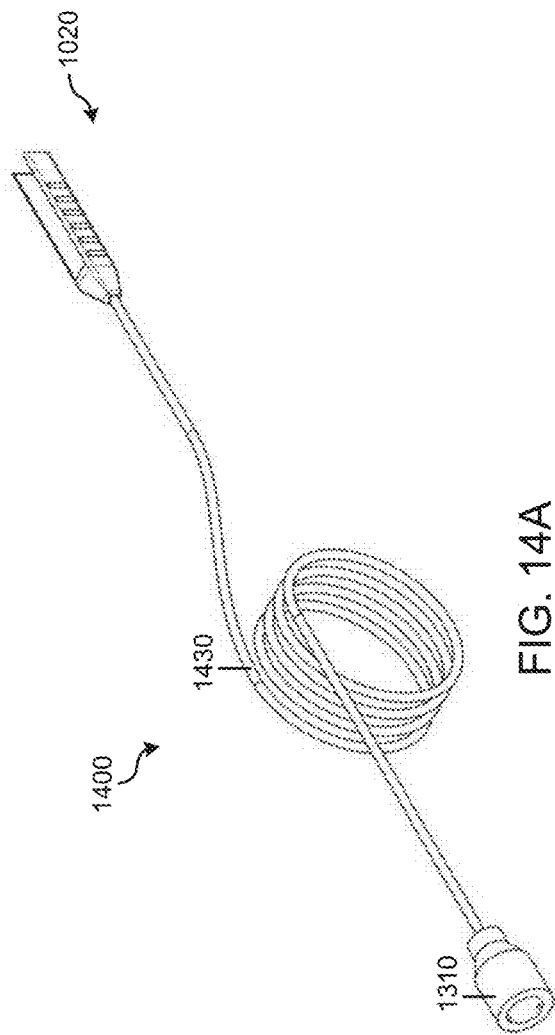
FIG. 14A shows a perspective view of another cable connector for a modular endoscope system, in accordance with some implementations of the disclosure.

FIG. 14A illustrates a further example of a cable connector 1400 that can directly couple to an endoscope housing 100. The cable connector 1400 includes a cable 1430 connecting an open channel connector 1020 and an endoscope connector 1310 on the opposite ends of cable connector 1400. In some implementations, endoscope connector 1320 can also establish an optical connection with endoscope housing 100 via housing connector segment 120. In such implementations, light can be transmitted along the length of the cable connector (e.g., along cable 1330 or 1430) to the second connector.

Figure 14B:
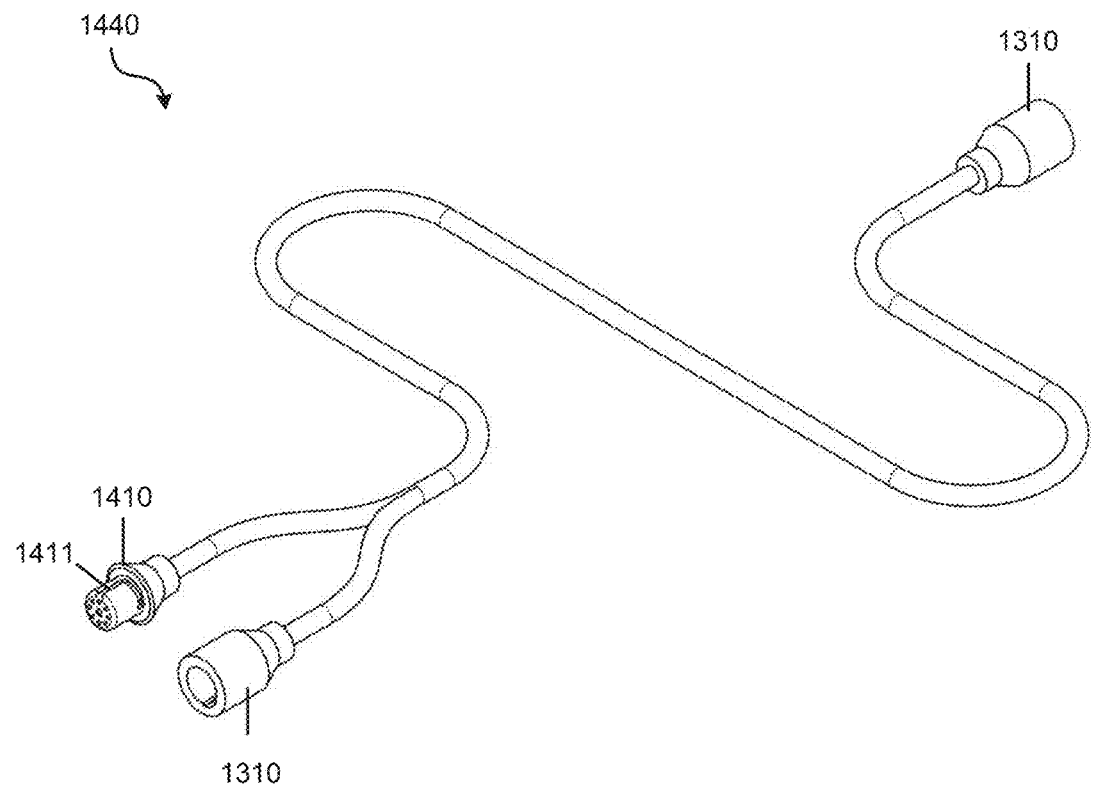
FIG. 14B shows a perspective of a branched cable connector for a modular endoscope system, in accordance with some implementations of the disclosure.
Figure 14C:
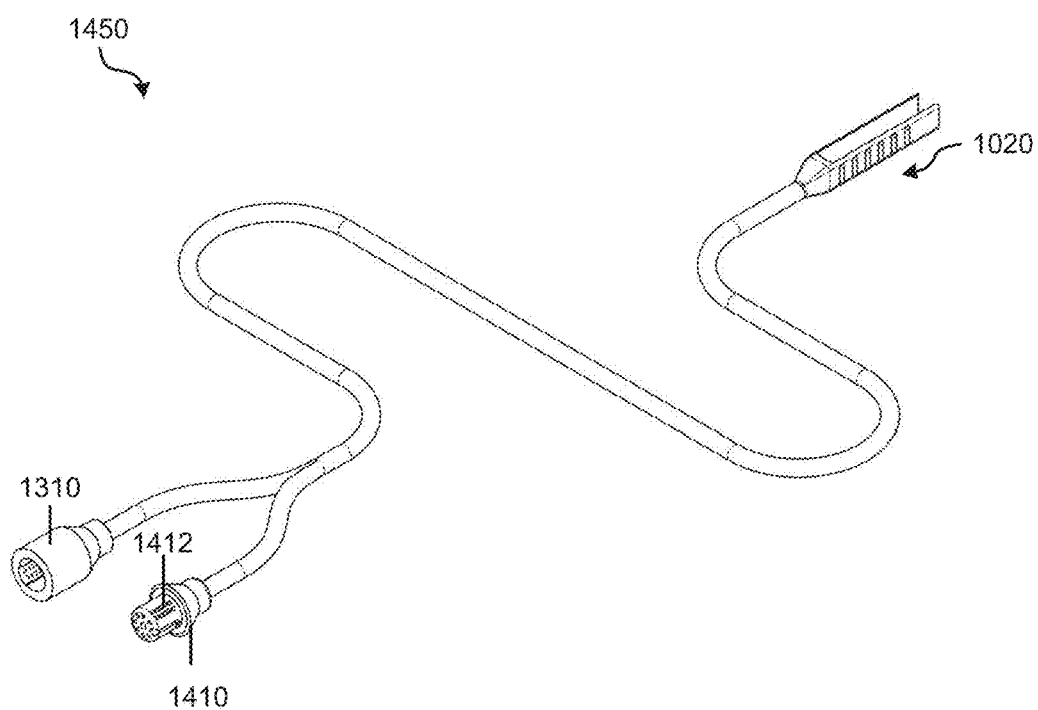
FIG. 14C shows a perspective of another branched cable connector for a modular endoscope system, in accordance with some implementations of the disclosure.
Figure 14D:
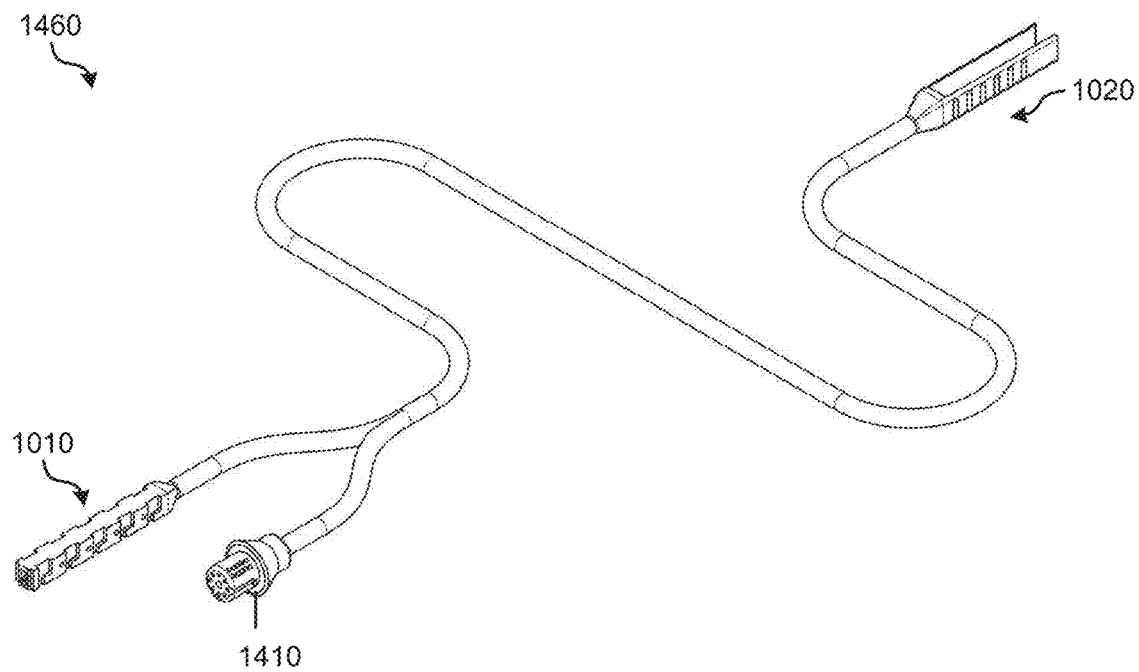
FIG. 14D shows a perspective of another branched cable connector for a modular endoscope system, in accordance with some implementations of the disclosure.
Figure 14E:
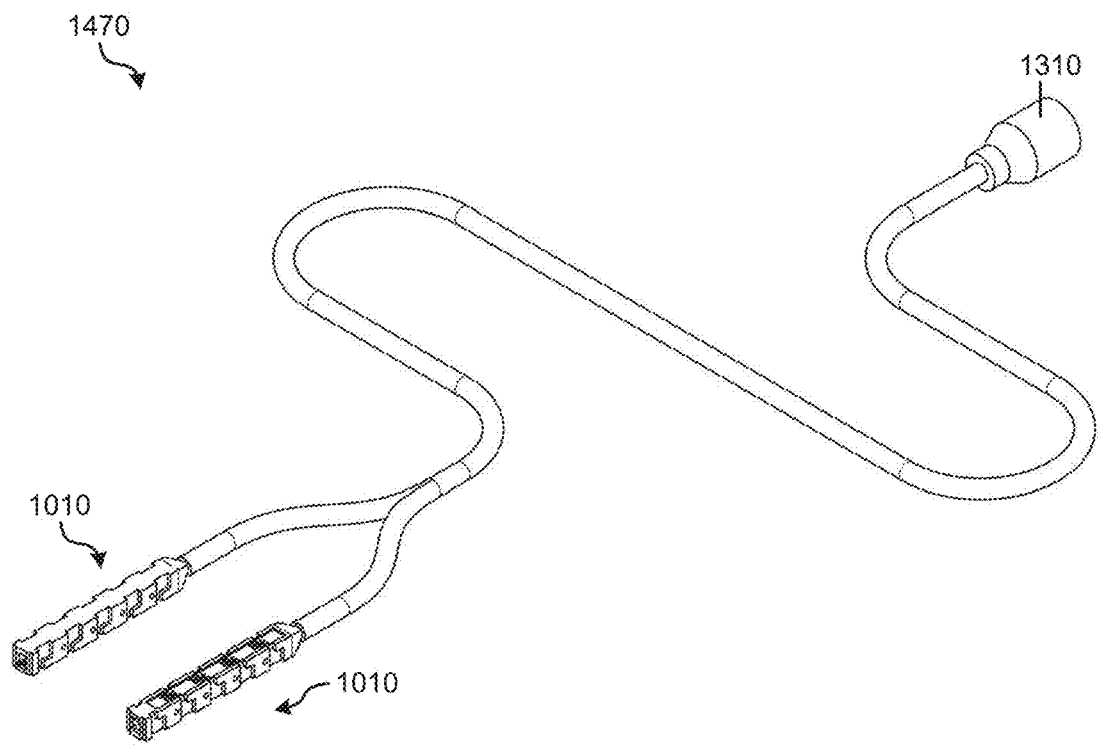
FIG. 14E shows a perspective of another branched cable connector for a modular endoscope system, in accordance with some implementations of the disclosure.

FIGS. 14B-14E show variations of a bifurcated (branched) cable connector that would enable multiple devices and endoscope components to attach together in a contiguous electrical circuit, in accordance with some implementations of the disclosure. FIG. 14B shows a branched cable connector 1440 that includes a cable connecting an endoscope connector 1310 on one end of cable connector 1440 to another endoscope connector 1310 and connector 1410 on the other, branched end of cable connector 1440. FIG. 14C shows a branched cable connector 1450 that includes a cable connecting an open channel connector 1020 on one end of cable connector 1450 to an endoscope connector 1310 and connector 1410 on the other, branched end of cable connector 1450. FIG. 14D shows a branched cable connector 1460 that includes a cable connecting an open channel connector 1020 on one end of cable connector 1460 to rigid attachment connector 1010 and connector 1410 on the other, branched end of cable connector 1460. FIG. 14E shows a branched cable connector 1470 that includes a cable connecting an endoscope connector 1310 on one end of cable connector 1470 to two rigid attachment connectors 1010 on the other, branched end of cable connector 1470.

The connector 1410 can be similarly structured as endoscope housing connector segment 120 of endoscope housing 100, and it can couple to the same instruments and/or endoscope components. For example, it can be configured to couple to a rigid attachment coupler 200 or an instrument connector (e.g., proximal connector 651 or proximal connector 751). To that end, it includes a groove 1411 that can receive a protrusion to secure a mechanical connection by sliding the protrusion in the interior, and then rotating the connector segments relative to one another. It can also include one or more electrical contacts 1412 to electrically couple to one or more electrical contacts of the connector it connects to.

In some implementations, cable connectors can be designed to directly connect to a control box. A cable connector can include a control box connector that is compatible with one or more connection ports of a control box. The control box connector, in some implementations, can be the same as endoscope connector 1310.

The cable connectors described herein can contain power line(s)/wire(s) and data line(s)/wire(s) for transferring power and/or data between devices.

Although primarily described in the context of enabling electrical connection(s) between devices that allows for data and/or power transfer between devices, the cable connectors described herein could also enable an optical connection between different devices, including the endoscope housing 100, such that one device could transfer light to another device. To that end, a cable connector could include one or more optical fibers running along its cable(s) such that light could be transferred between different devices.

Figure 15A:
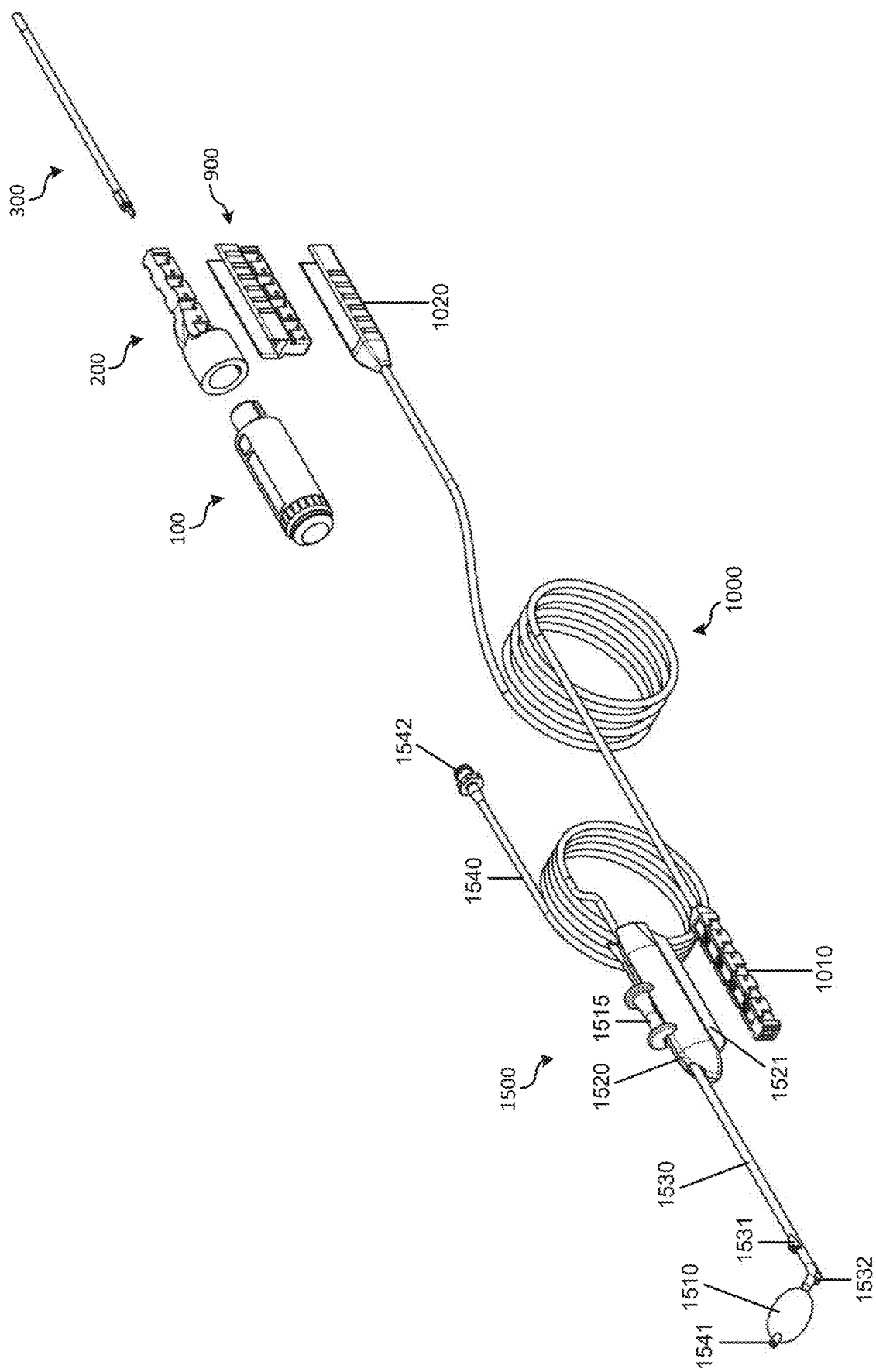
FIG. 15A shows a perspective view of a disassembled modular endoscope system including a balloon dilator instrument, in accordance with some implementations of the disclosure.
Figure 15B:
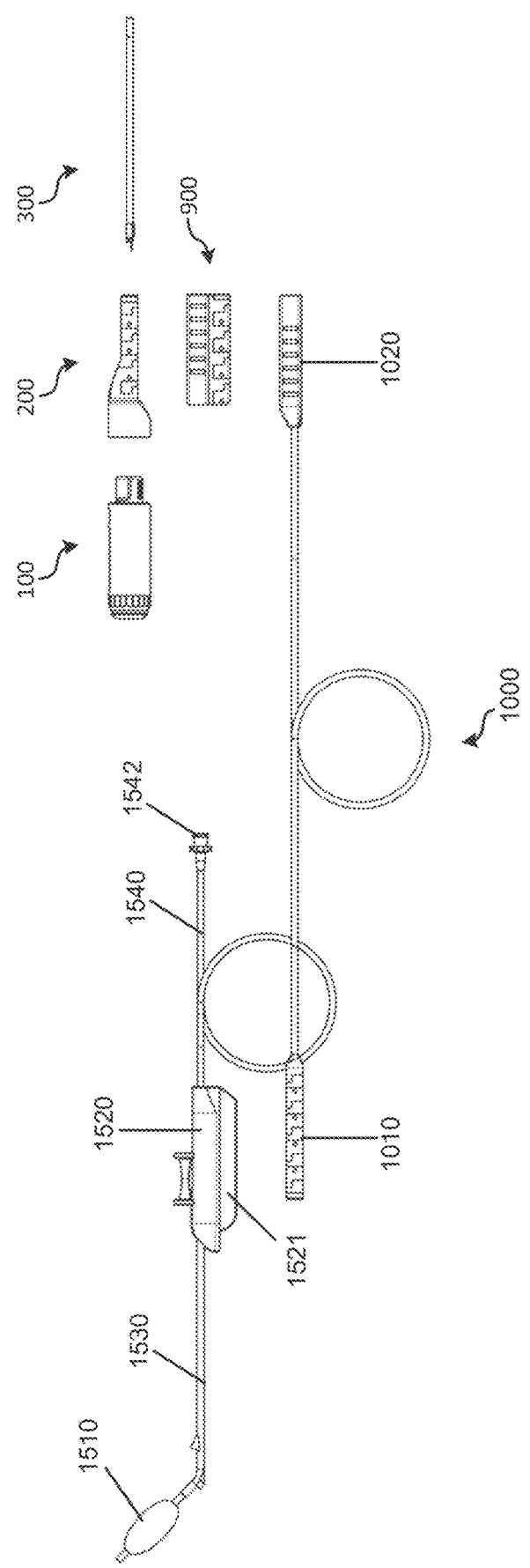
FIG. 15B shows a side view of the disassembled modular endoscope system of FIG. 15A.

FIGS. 15A-15B and FIGS. 19A-19F illustrate different implementations of a modular endoscope system, in accordance with some implementations of the disclosure. FIG. 15A shows a perspective view of the first system when disassembled, and FIG. 15B shows a side view of the first system when disassembled. The system includes a balloon dilator instrument 1500, a cable connector 1000, an adapter 900, and a disassembled endoscope 10. During assembly of the example system illustrated in FIGS. 15A-15B, a handle portion 1520 of balloon dilator instrument 1500 is removably coupled to rigid attachment connector 1010 of cable connector 1000. On the other end, cable connector 1010 includes an open channel connector 1020 that can removably couple to adapter 900, which couples to the rigid attachment coupler 200 of the endoscope 10. In the implementation illustrated in FIGS. 19A-B and 19F, rather than having a cable connector, an endoscope housing 1800 directly attaches to the undersurface of a handle 1910 of a balloon dilator instrument 1900.

The balloon dilator instrument 1500 contains a handle 1520. The undersurface of handle 1520 contains an open channel connector 1521 that attaches to rigid attachment connector 1010, and receives power from, and sends image data through detachable cable connector 1000. An elongated hollow cannula 1530 extends from the distal aspect of the handle 1520,1910. On the distal end of cannula 1530 are one or more CMOS/image sensors 1531, 1532 positioned to capture image data from different viewpoints as a removable balloon catheter 1540 is inserted through and exits the cannula. In some implementation the distal end of hollow cannula 1530 is straight, but in other embodiments the distal tip of the hollow cannula 1530 is curved as shown in FIGS. 15A-B and 19A-B. In still other implementations there may me suction, irrigation, or image guidance capabilities built into the hollow cannula 1530 and balloon handle.

Balloon catheter 1540 is stabilized and removably advanced within a groove 1914 along the top of the proximal balloon dilator handle 1520, 1910 and into the proximal end of hollow cannula 1530. Along the undersurface 1965 of thumb slide 1515, fixed to the balloon catheter 1540, are electrical connectors 1966 that make contact with a second set of electrical slide connectors 1915 fixed within the length of handle groove 1914.

Electrical power can thus transfer from cable connector 1000 into handle 1520 and into balloon catheter 1540 through a series of electrical contacts. Power to LED/s spaced along the distal tip of distal balloon catheter 1540 can be maintained when sliding the balloon catheter 1540 forward into hollow cannula 1530. The powered LEDs can then be used to light up an anatomic space. In this particular implementation, the balloon catheter 1540 contains no image sensors. Light emitted by the LEDs 1951 contained within the balloon catheter 1540 adequately illuminate the anatomic space for visualization so that CMOS sensors attached to distal hollow cannula 1530 can function adequately for image capture. As the balloon is advanced, the most distal LED moves farther away from the image sensors 1531, 1532 until another LED exits the tip of the hollow cannula 1530. In this manner, light is always provided close to the image sensor as the balloon 1510 is advanced. This implementation is unique in that the diameter of the hollow cannula 1540 remains small because no external endoscope shaft is required. Although LEDs can be included alongside of the CMOS sensor as shown in FIG. 19D, 1943, other implementations would utilize LEDs located on the balloon catheter 1540, which remains inside and not outside of the hollow cannula 1530. The described assembled device would be a useful tool for anatomic dilation procedures such as balloon sinuplasty and Eustachian tube dilation where anatomic access is narrow and patient tolerance is of highest priority.

An adapter 1542 on the proximal end of balloon catheter 1540 can couple to a balloon pump handpiece (not visualized) that serves to inflate the balloon 1510 at the tip 1541 of the balloon catheter 1540. The proximal open channel connector 1020 of cable connector 1000 attaches to endoscopic housing 100 and rigid attachment coupler 200 via methods previously described herein.

Figure 15C:
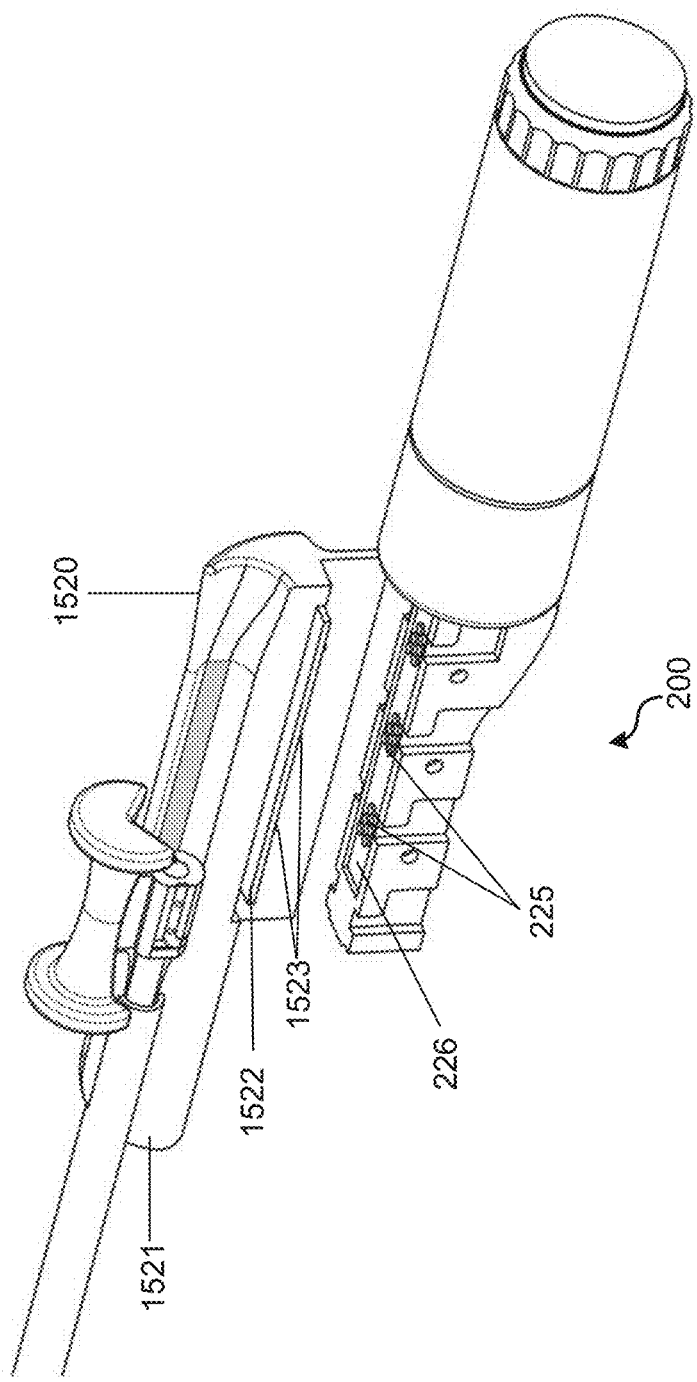
FIG. 15C shows a cut away view of an electrical contact strip along the upper surface of an open channel connector coupling to a rigid attachment coupler, in accordance with some implementations of the disclosure.

In some implementations, handle 1520 could directly couple to a rigid attachment coupler of an endoscope or integrated endoscope housing. For example, FIG. 15C shows a cut away view of an electrical contact strip 1522 along the upper surface of an open channel connector 1521 coupling to surface 226 of a rigid attachment coupler 200, in accordance with some implementations of the disclosure. The electrical contact strip 1522 includes electrical contacts 1523 that electrically couple to electrical contacts 225.

Figure 16A:
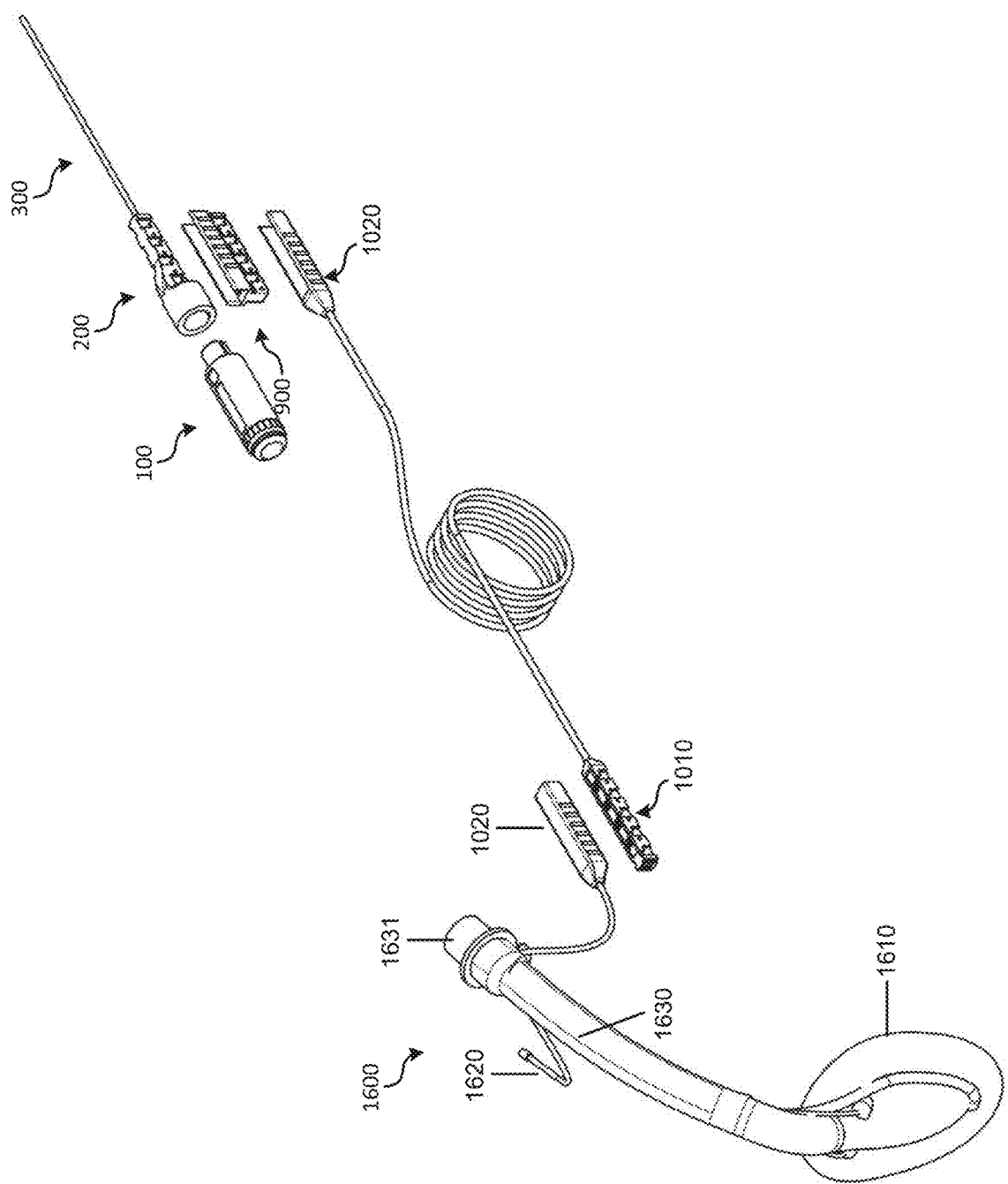
FIG. 16A shows a perspective view of a disassembled modular endoscope system including a laryngeal mask instrument, in accordance with some implementations of the disclosure.
Figure 16B:
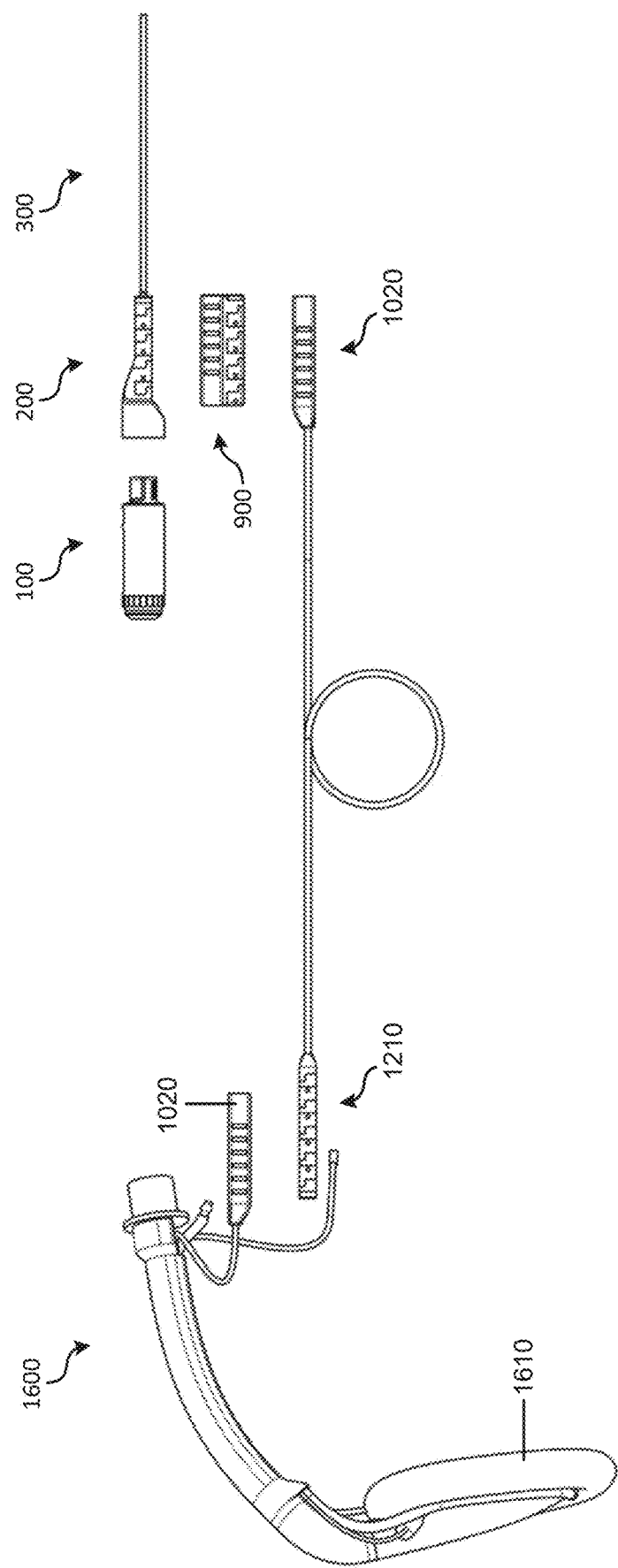
FIG. 16B shows a side view of the disassembled modular endoscope system of FIG. 16A.

FIGS. 16A-16B illustrate another implementation of a modular endoscope system, in accordance with some implementations of the disclosure. FIG. 16A shows a perspective view of the system when disassembled, and FIG. 16B shows a side view of the system when disassembled. The system includes a laryngeal mask instrument 1600, a cable connector 1000, an adapter 900, a first disassembled endoscope 10 including endoscope housing 100, rigid attachment coupler 200, and endoscope shaft 300, and a second disassembled endoscope 10 not including an endoscope shaft. The laryngeal mask instrument 1600 includes a mask 1610, an inflation line 1620, and an airway tube 1630 with airway connector 1631. It also includes an open channel connector 1020 for establishing an electrical and mechanical connection with a rigid attachment connector 1010. During assembly of this example system, open channel connector 1020 of laryngeal mask instrument 1600 is removably coupled to rigid attachment connector 1010 of cable connector 1000. On the other end, cable connector 1010 includes an open channel connector 1020 that can removably couple to adapter 900, which couples to the rigid attachment coupler 200 of the endoscope 10 pictured at the top. The endoscope 10, in this example, includes a coupled endoscope shaft 300 that can be inserted into an anatomical cavity of the patient.

Figure 16C:
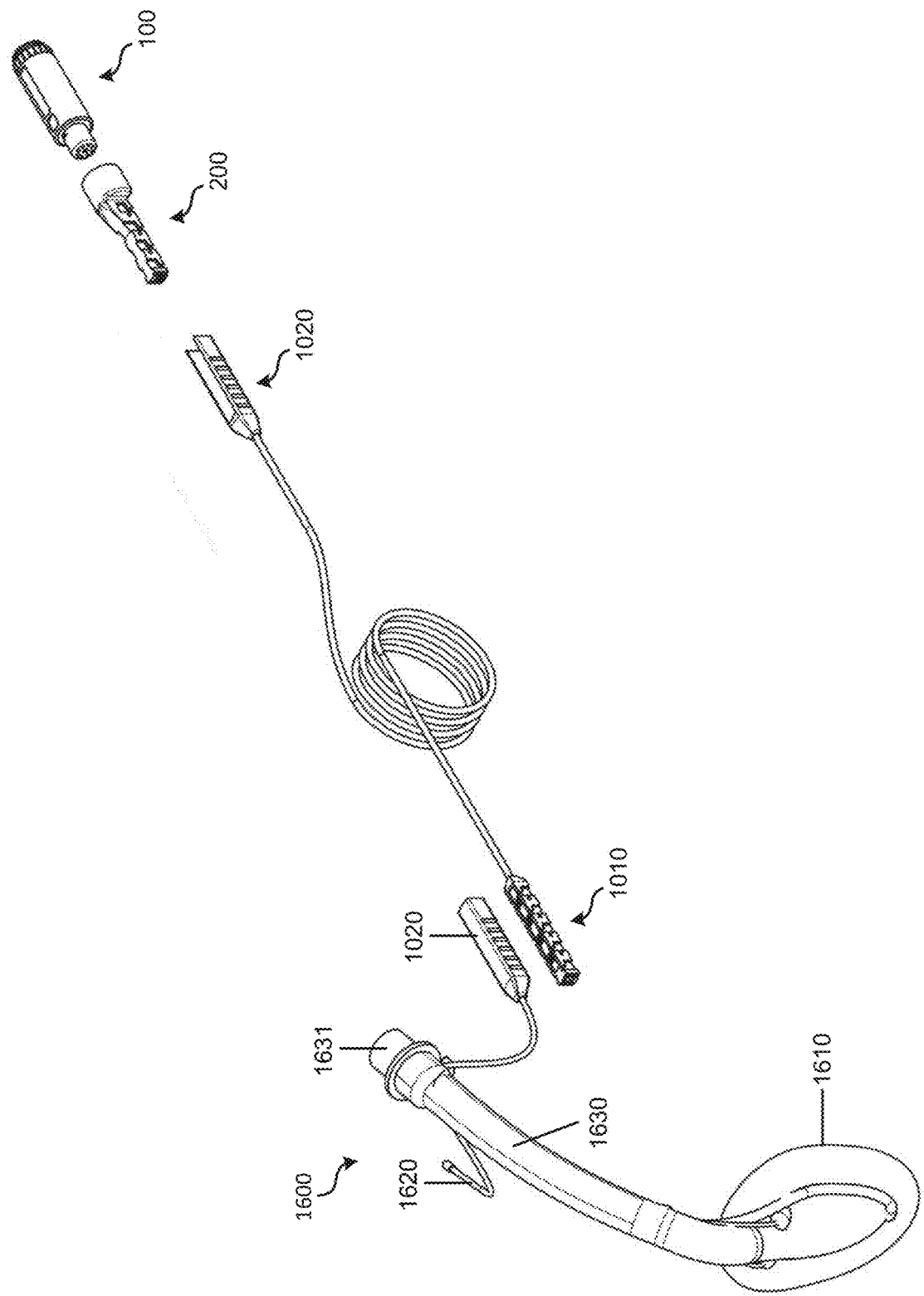
FIG. 16C shows a perspective view of another disassembled modular endoscope system including a laryngeal mask instrument, in accordance with some implementations of the disclosure.
Figure 16D:
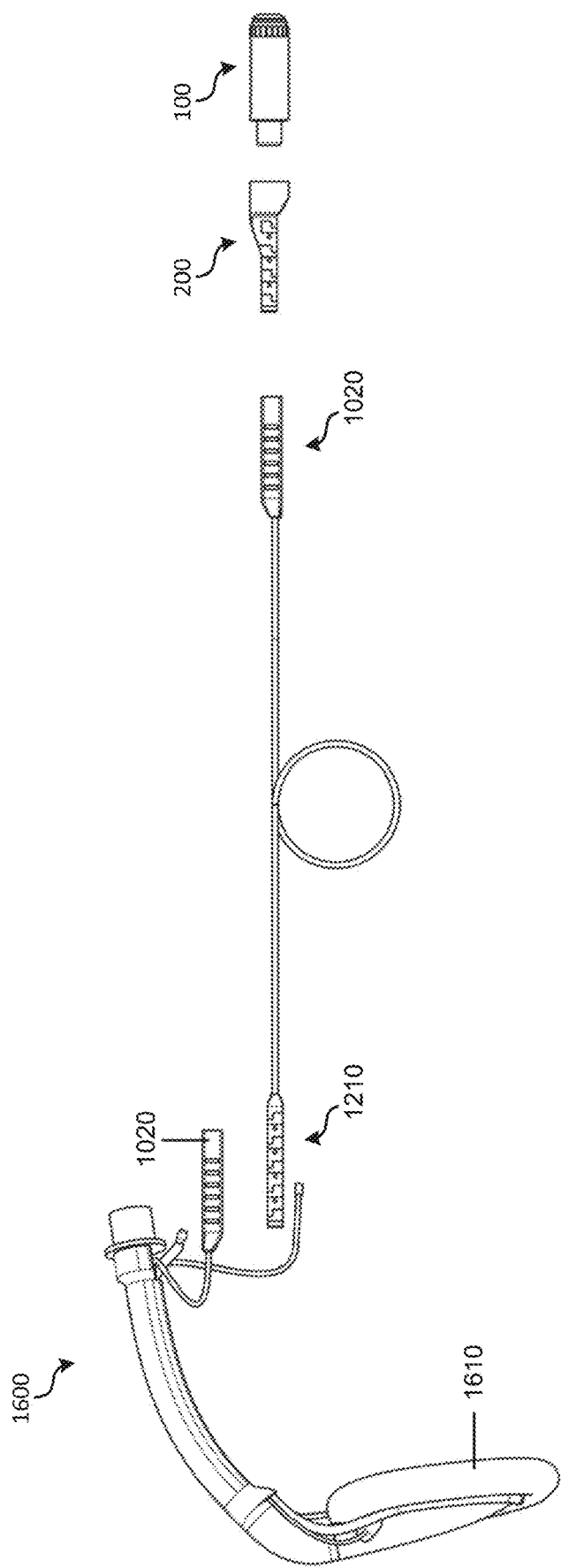
FIG. 16D shows a side view of the disassembled modular endoscope system of FIG. 16C.

FIGS. 16C-16D illustrate a variation of the modular endoscope system of FIGS. 16A-16B. In this variation, rather than couple an endoscope 10 with endoscope shaft 300, the endoscope shaft 300 is omitted. For example, the same endoscope 10 can be used, but endoscope shaft 300 can be decoupled (or not coupled). As the rigid attachment coupler 200 is positioned in a reversed orientation compatible with open channel connector 1020, adapter 900 can also be omitted.

The illustrated system configuration can help a physician/anesthesiologist realize ergonomic advantages during a medical procedure involving a laryngeal mask. By virtue of using a flexible cable connector 1000 to couple the laryngeal mask instrument 1600 to an endoscope 10, there would be no concerns about a camera head weighing down the airway tube 1630 during placement of the laryngeal mask. Rather, a cable connector 1000/cord extending from laryngeal mask instrument 1600 would connect to the endoscope housing, via adapter 900, which could be mounted to an IV pole or other rigid structure. As such the weight of the endoscope housing could be offloaded from the instrument.

Figure 16E:
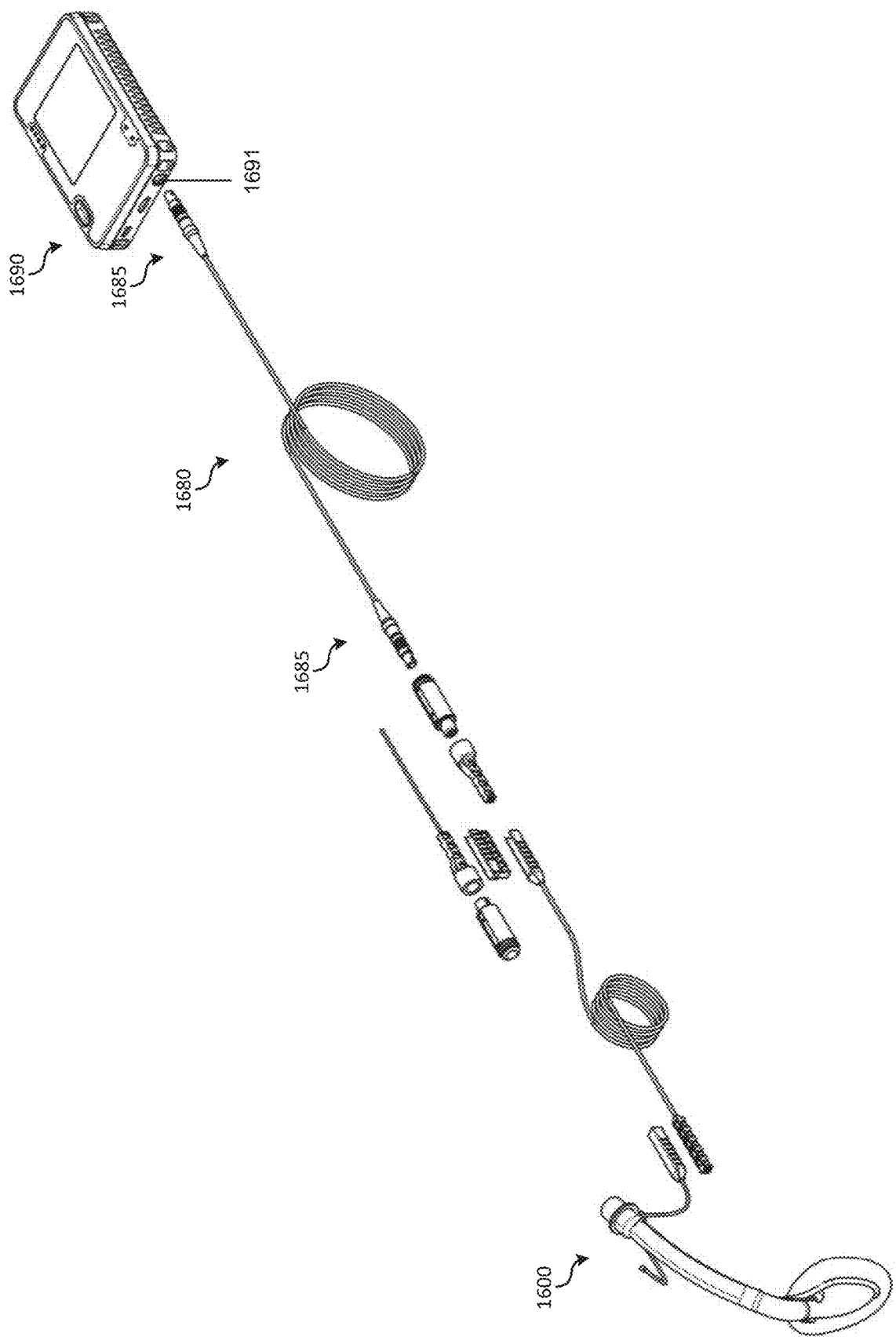
FIG. 16E shows a perspective view of a disassembled modular endoscope system including a control box, in accordance with some implementations of the disclosure.

In some implementations, a battery enabled, portable control box containing electrical circuitry for powering the modular endoscope system and driving the optical circuitry could connect to the endoscope housing 100 via a single cable, thereby simplifying the system setup for a particular surgical procedure. For example, FIG. 16E illustrates a control box 1690 that can couple, via cable connector 1680, to the endoscope 10 as shown in the system configuration of FIGS. 16A-16B or the endoscope 10 as shown in the system configuration of FIGS. 16C-16D. On one side, cable connector 1680 includes a male connector 1685 that plugs into coupler 103 on the backend of endoscope housing 100. On the other side, cable connector includes another male connector 1685 that plugs into connector port 1691 of control box 1690. It should be appreciated that different combinations of male/female connectors can be utilized in coupler 103, cable connector 1680, and/or connector port 1691 that establish a connection between endoscope housing 100 and control box 1690. Functions of the control box 1690 may include one or more of: supplying power, recording video, receiving user input, wireless transmitting data to a computer or other device, docking, providing a portable image display, etc. It should be appreciated that FIG. 16E depicts one example system in which a control box 1690 could be implemented, and that the control box 1690 could be used in a variety of other systems incorporating other medical instruments.

Figure 16F:
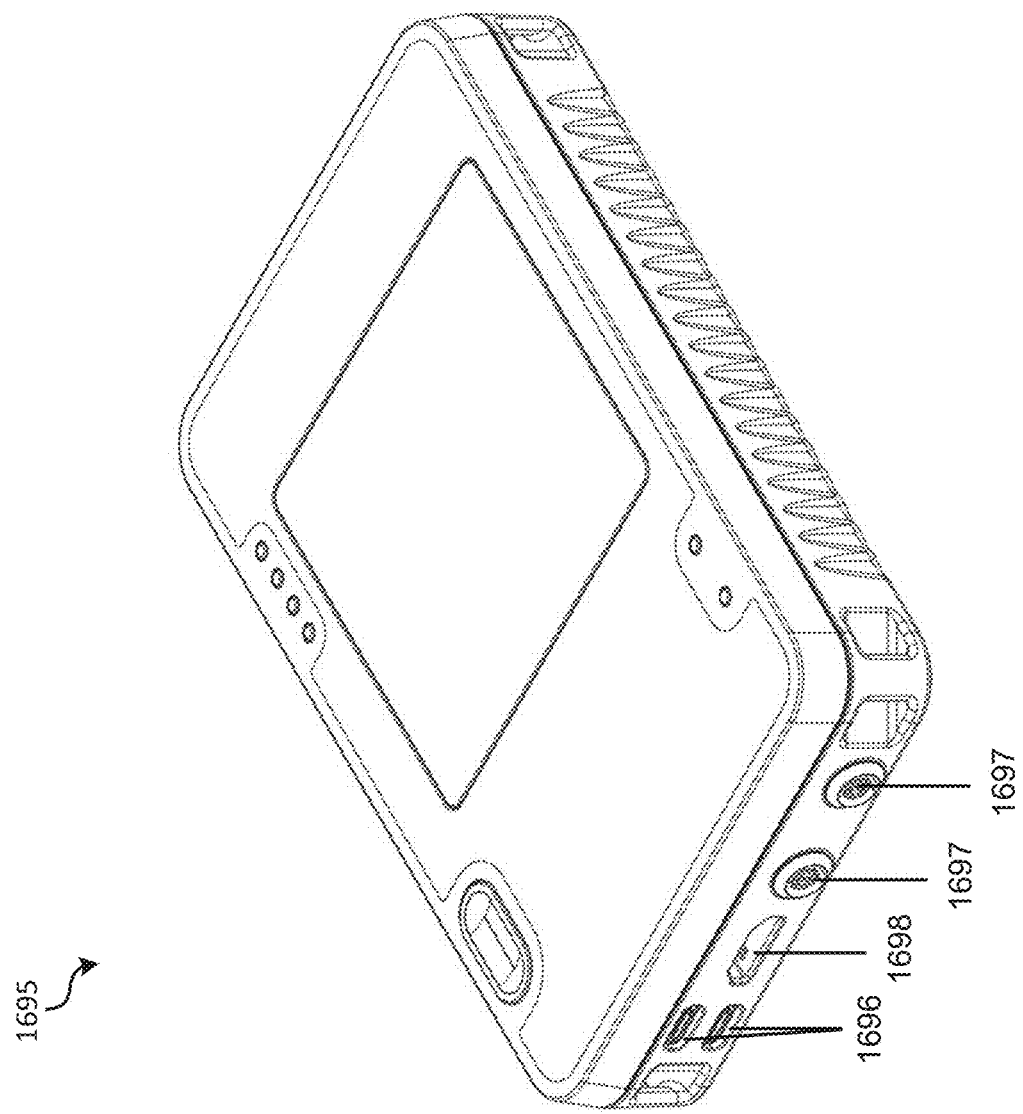
FIG. 16F shows a control box that can be used with a modular endoscope system, in accordance with some implementations of the disclosure.
Figure 17B:
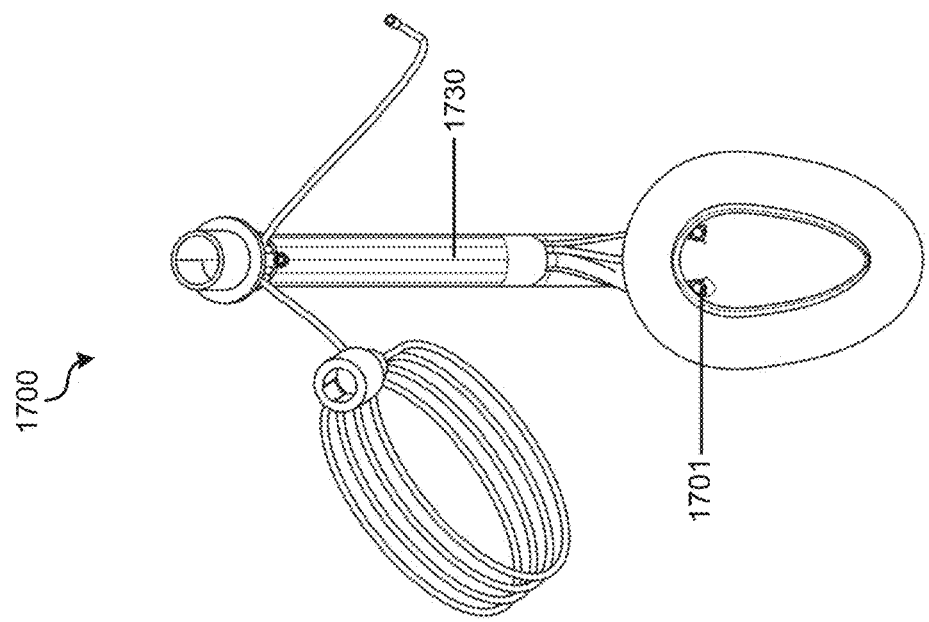
FIG. 17B shows a rear view of the laryngeal mask instrument of FIG. 17A.
Figure 17A:
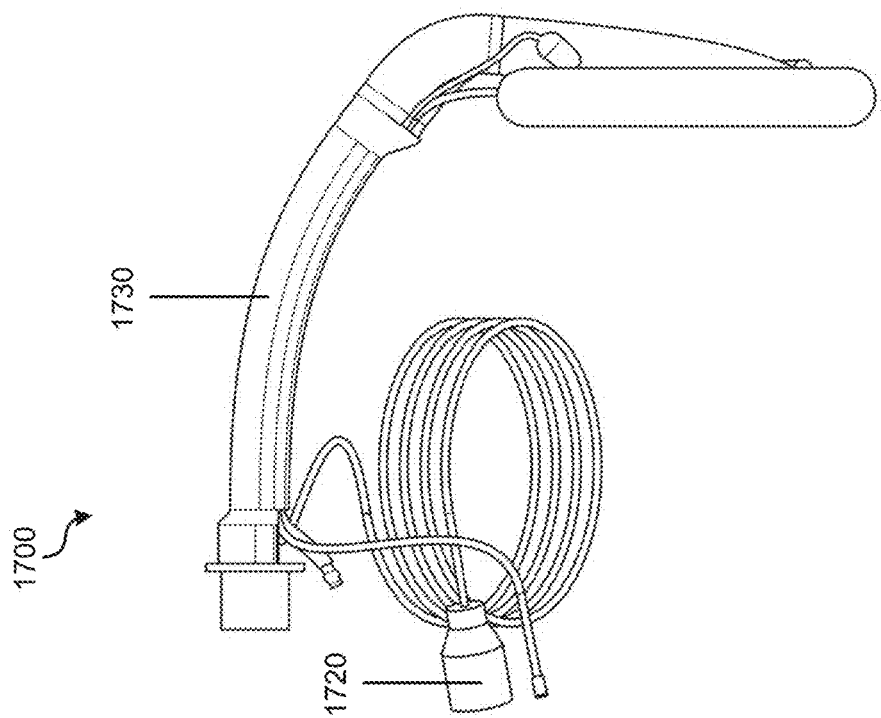
FIG. 17A shows a side view of a laryngeal mask instrument that can be used with a modular endoscope system, in accordance with some implementations of the disclosure.
Figure 17D:
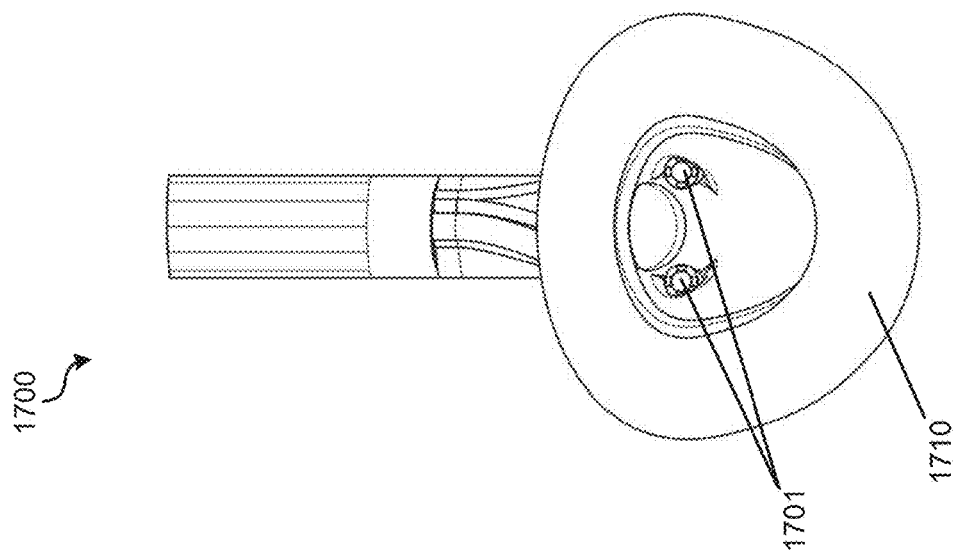
FIG. 17D shows a rear view of the mask of the laryngeal mask instrument of FIG. 17A.
Figure 17C:
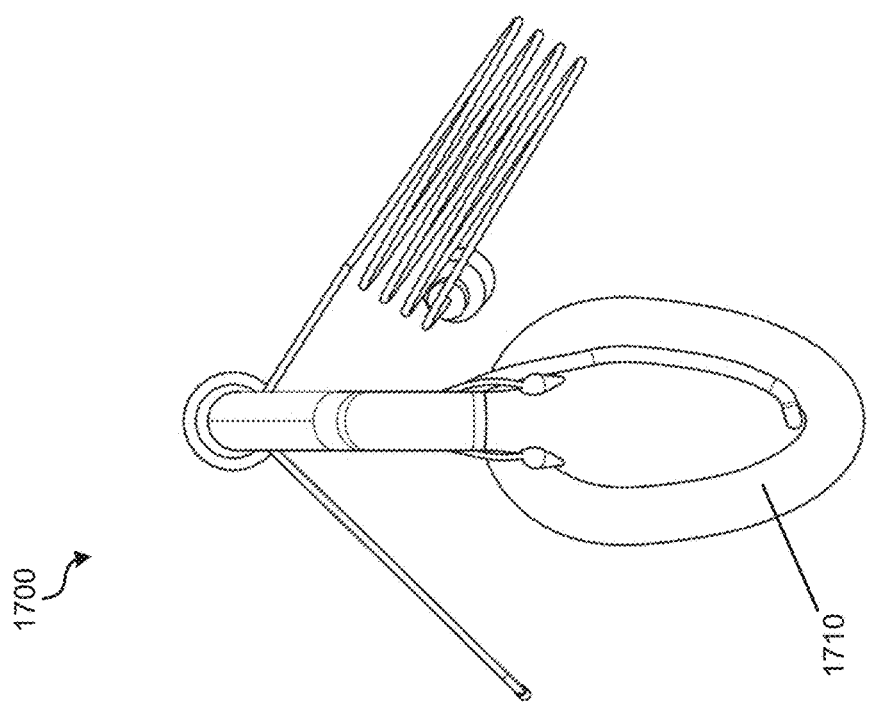
FIG. 17C shows a front view of the laryngeal mask instrument of FIG. 17A.

FIG. 16F illustrates another example implementation of a control box 1695. Control box 1695 includes multiple connector ports for endoscope/device cable inputs/outputs (enabling multiple connections at once), multiple USB connectors 1696, and HDMI connector 1698. Multiple connectors could enable multiple video outputs, including an output for an optional head mounted display (HMD). In some implementations, the control box 1695 could be configured to generate a split screen display signal whereby the display of two imaging devices (e.g., two endoscopes, two instruments, or instrument and endoscope), is combined using image data received from each device. The split screen display signal could be output via one of the display ports (e.g., via the HDMI port, USB C, DisplayPort, wireless HDMI, or some other suitable interface) for presentation to a user/physician. Alternatively, the control box could have an integrated display. In some implementations, the display of two imaging devices could be output via two respective display ports of the control box.

FIGS. 17A-17D illustrate another example implementation of a laryngeal mask instrument 1700 that can be used with the modular endoscope systems described herein. In this implementation, the endoscope housing 100 could attach directly to the female attachment coupler 1720. Image sensors 1701 and LEDs (not shown) placed within the interior of mask 1710, just outside the distal end of airway tube 1730 could enable visualization and lighting of the vocal cords during a surgical procedure. Inserting surgical instruments through airway tube 1730 would allow the surgeon to manipulate laryngeal tissue without the encumbrance of an endotracheal tube going through the vocal cords and obscuring visualization. Such instruments might include, but are not limited to, articulating forceps, curved forceps, suctions, cautery, laser probes, vocal cord retractors, flexible endoscopes. Current methods for direct laryngoscopy without an endotracheal tube require more dangerous and less utilized techniques including jet ventilation and total intravenous anesthesia. A laryngeal mask could provide better airway control, visualization, and the ability operate under a deeper level of anesthesia thereby minimizing risk of laryngospasm during the procedure.

FIGS. 18A-18B illustrate another example implementation of an endoscope housing 1800 that can be used with the modular endoscope systems described herein, in accordance with some implementations of the disclosure. The endoscope housing 1800 includes a circular image rotation dial 1805, a barrel 1810, and a distal endoscope housing connector segment 1820. The endoscope housing connector segment 1820 can removably couple endoscope housing 100 to a rigid attachment coupler, to an endoscope shaft, to a medical instrument, or to some other component. The endoscope housing connector segment 1820 includes a groove 1823 that can slidably receive an elongated rectangular protrusion/bar in an interior of an endoscope connector of the connecting component. The endoscope housing connector segment 1820 also includes one or more electrical contacts 1821 to electrically couple to one or more electrical contacts of the endoscope connector of the other component. Also illustrated is an optional illumination coupling 1824 of endoscope housing connector segment 1820 that can be optically coupled to an illumination coupling of the endoscope connector.

Figure 19A:
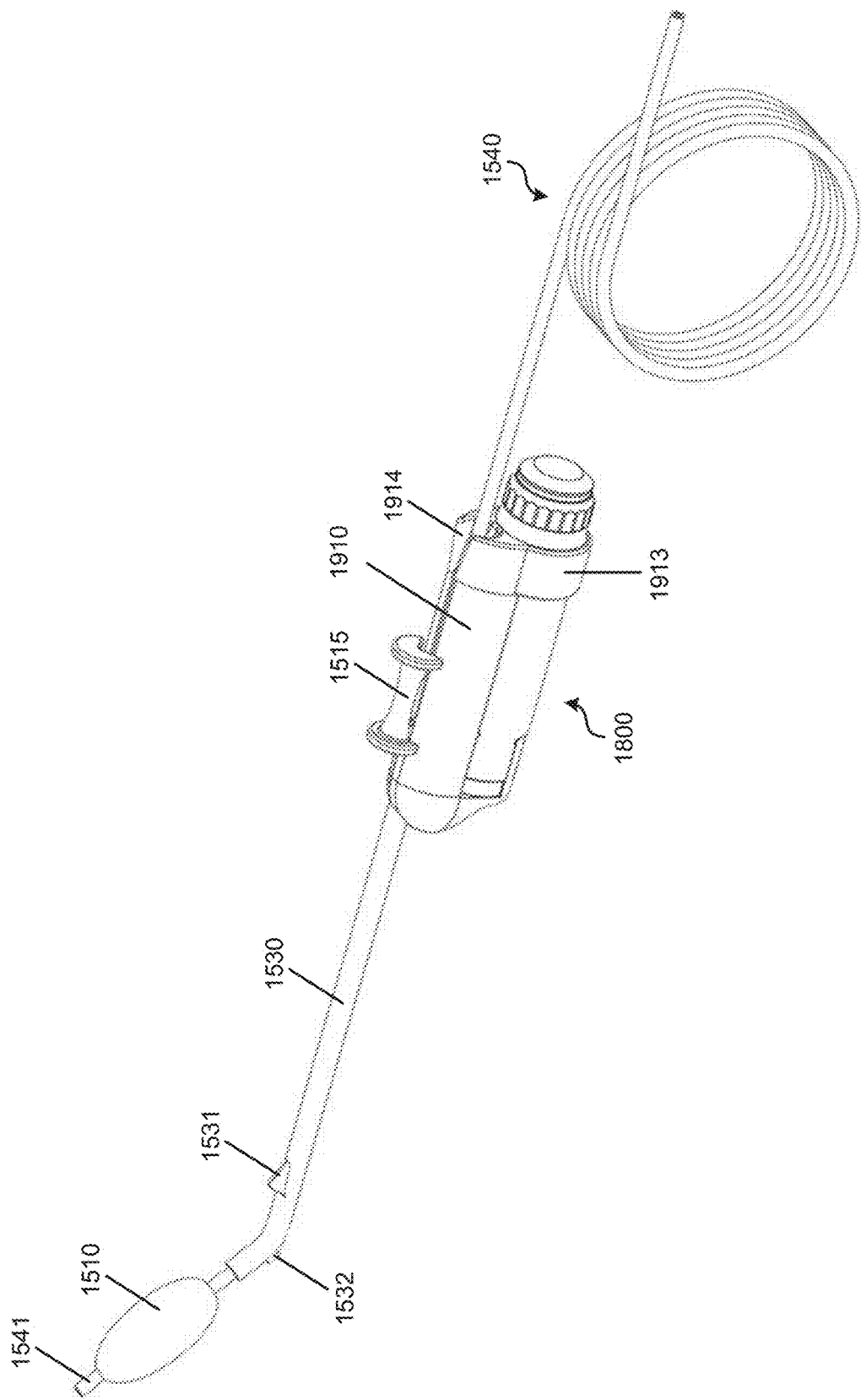
FIG. 19A shows a perspective view of a modular endoscope system that electrically and mechanically couples a balloon dilation instrument to the endoscope housing of FIG. 18A, in accordance with some implementations of the disclosure.
Figure 19B:
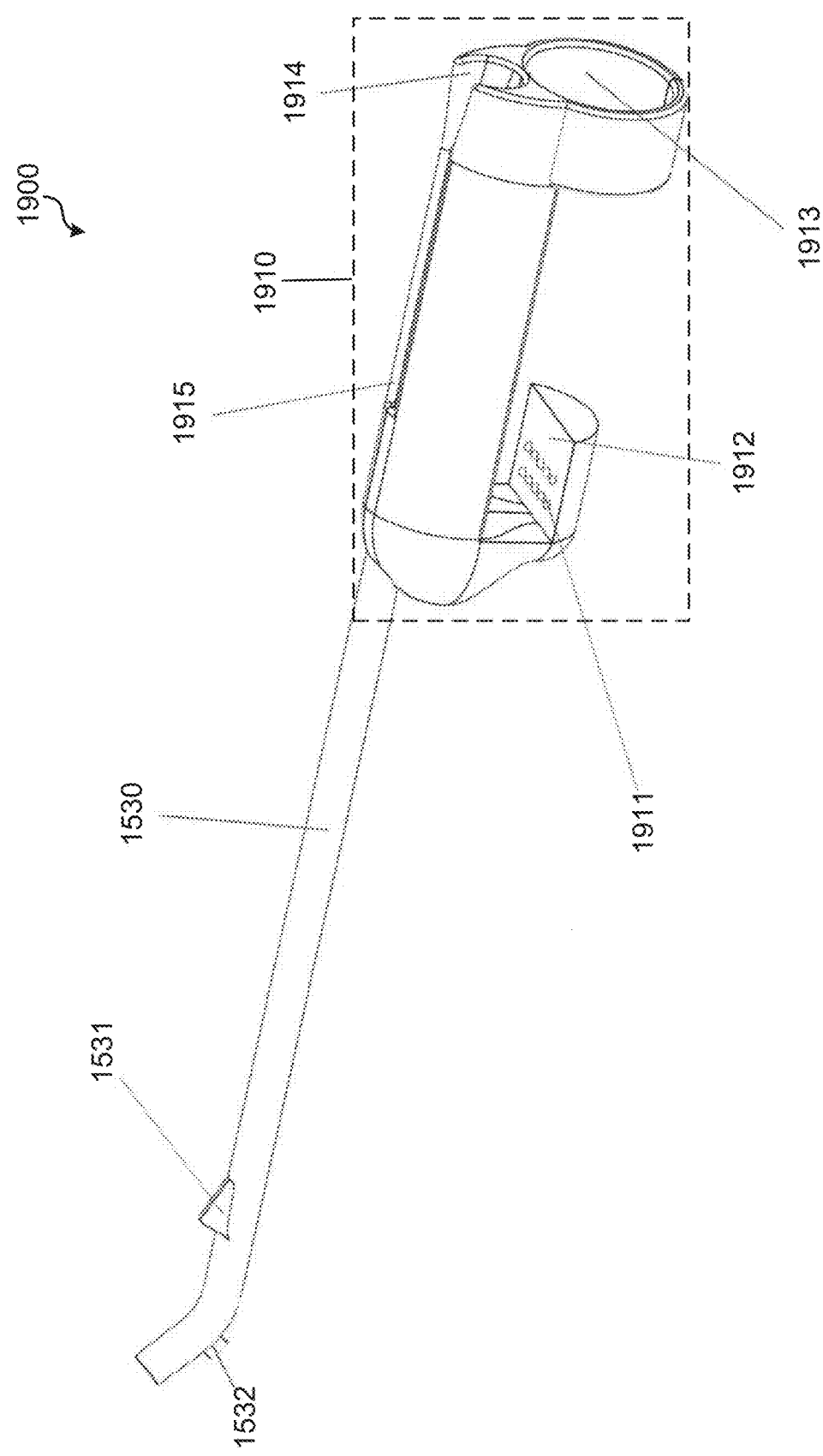
FIG. 19B shows a perspective view of the balloon dilator instrument of the modular endoscope system of FIG. 19A.
Figure 19C:
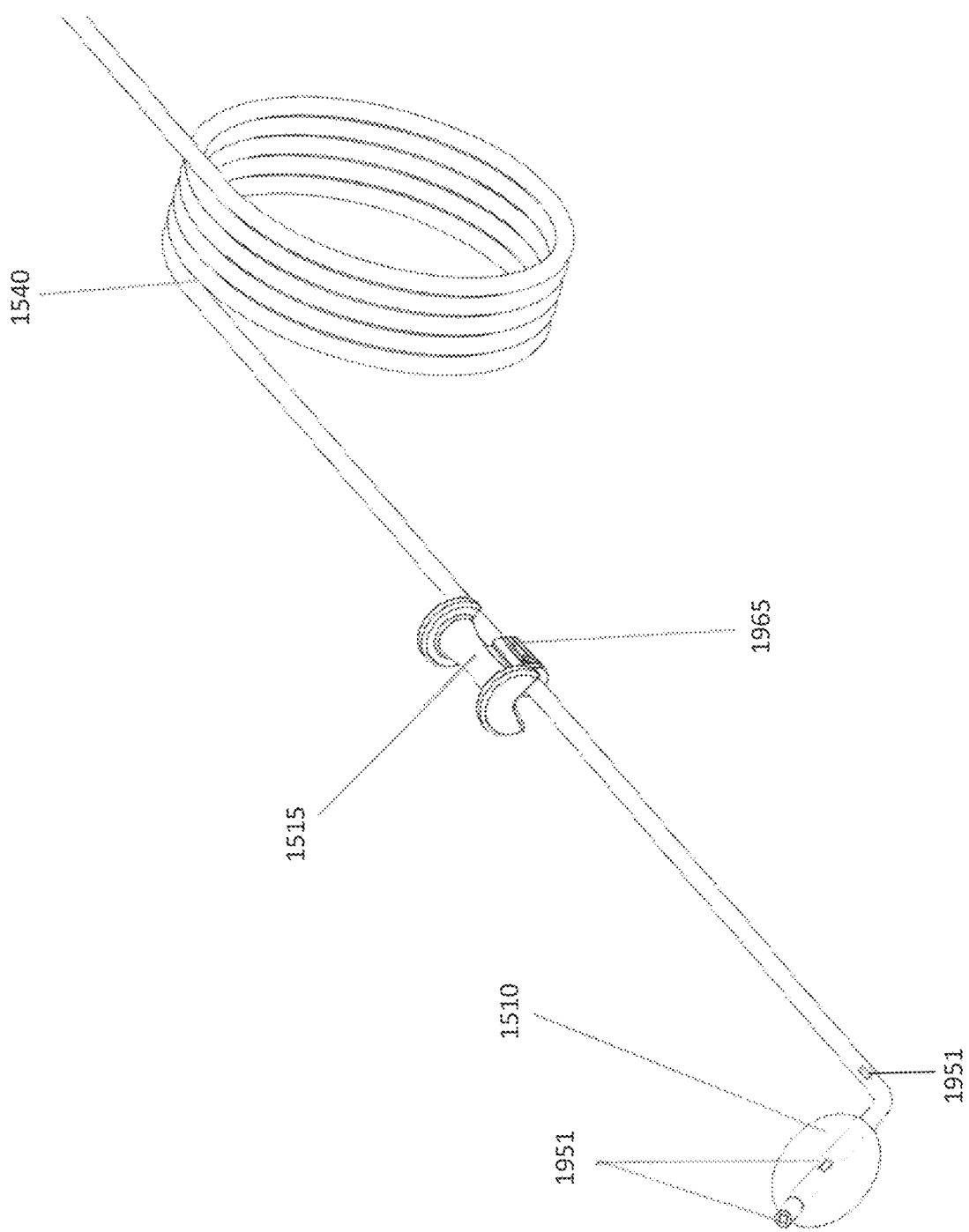
FIG. 19C shows components of the modular endoscope system of FIG. 19A, including a balloon, balloon catheter, and thumb slide.
Figure 19D:
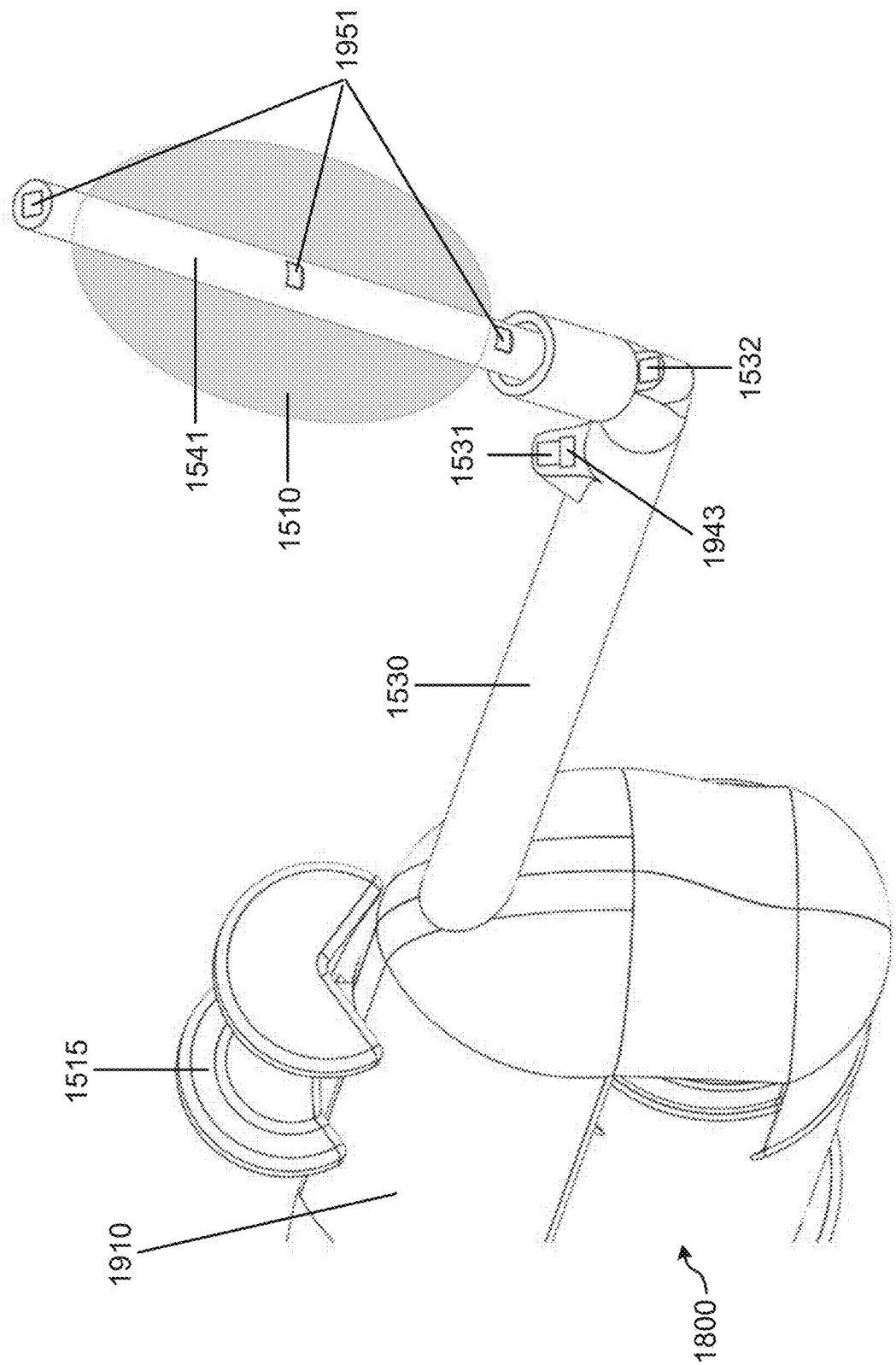
FIG. 19D shows components of the modular endoscope system of FIG. 19A.
Figure 19E:
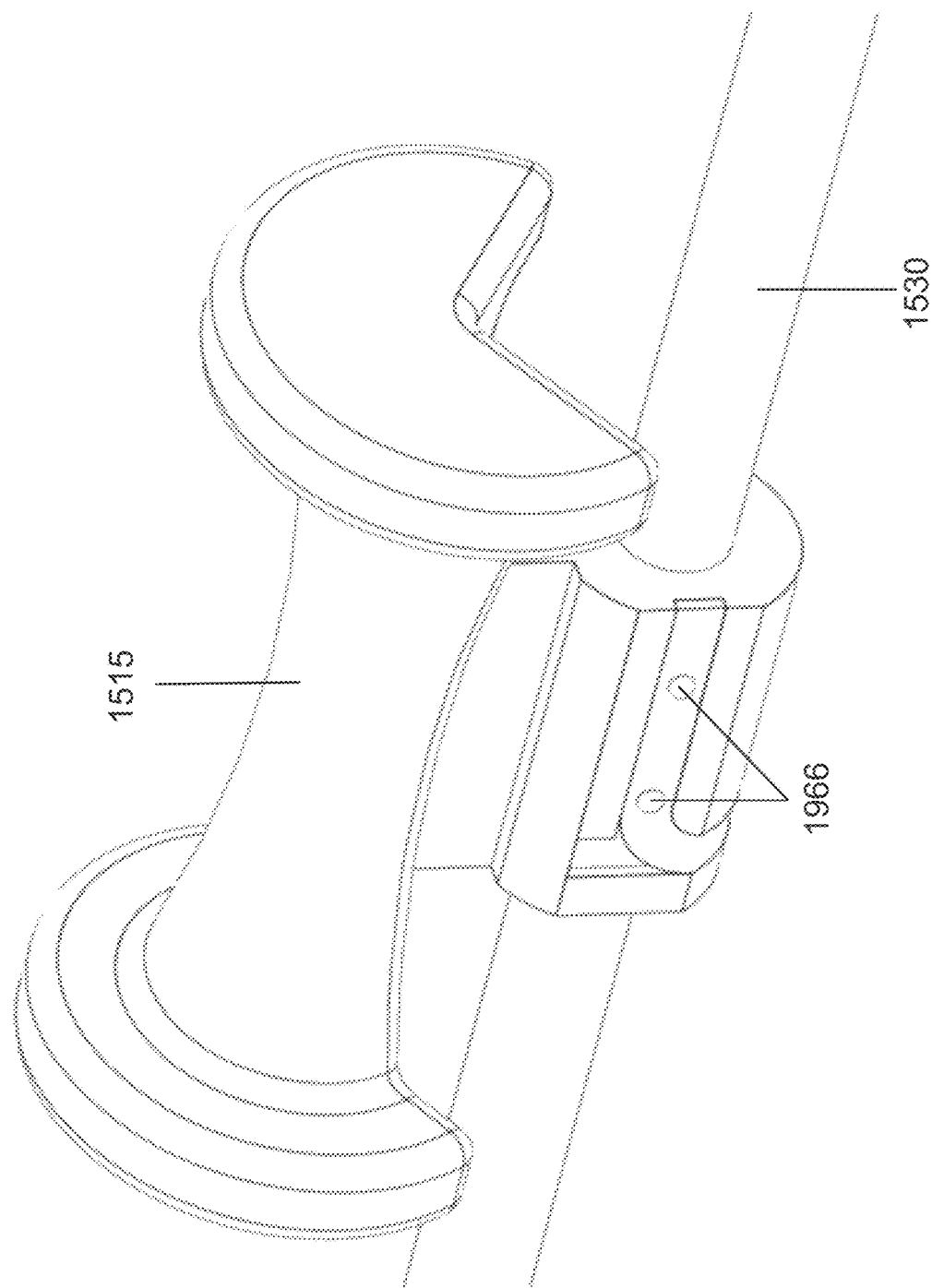
FIG. 19E shows a thumb slide of the modular endoscope system of FIG. 19A.
Figure 19F:
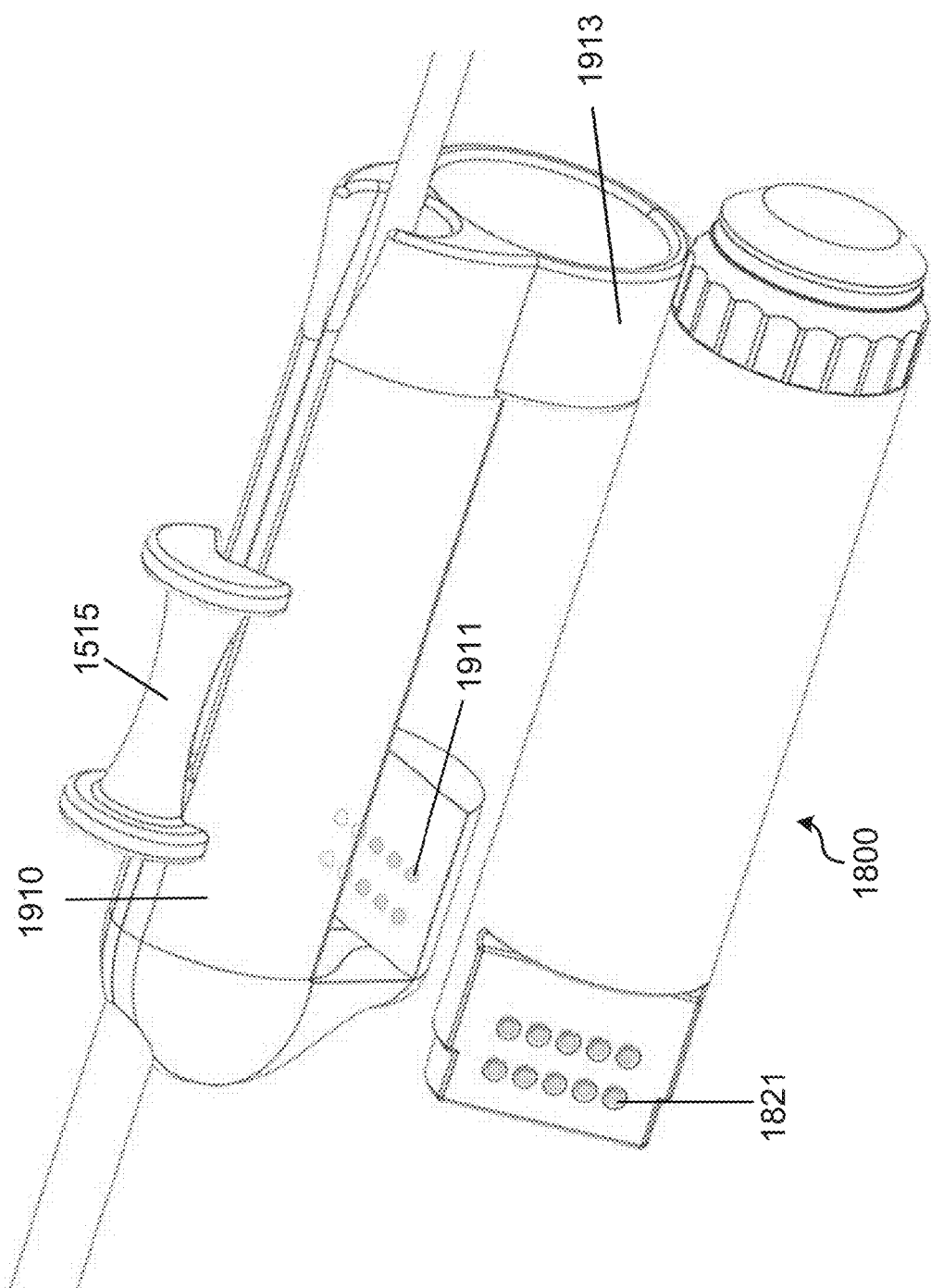
FIG. 19F shows the endoscope housing of FIG. 18A attaching directly to the undersurface of the balloon handle of the balloon dilation instrument of the modular endoscope system of FIG. 19A.

FIGS. 19A-19F illustrate an example implementation of a modular endoscope system that electrically and mechanically couples a balloon dilation instrument 1900 to endoscope housing 1800, in accordance with some implementations of the disclosure. FIGS. 19B and 19F show an implementation whereby endoscope housing 1800 attaches directly to the undersurface of balloon handle 1910 and thus does not use a separate cable connector as shown in the implementation of FIGS. 15A-15B. An underside of the handle includes a surface 1912 having one or more electrical contacts 1911 that electrically couple to contacts 1821 of endoscope housing 1800. An annular portion 1913 supports and secures a proximal end of endoscope housing 1800.

FIGS. 20A-20E show example implementations of optically enabled surgical microdebriders that could attach to the modular endoscopic systems described herein, in accordance with some implementations of the disclosure. Microdebriders are motorized elongated cannulas that have a shaft including an inner and outer cannula. The inner cannula rotates or oscillates within the outer cannula to facilitate debriding of tissue. As depicted, the inner and outer cannula can have an opening at the end of the cannula that has sharp or serrated edges 2012. In other implementations, a burr can be located on the distal tip of the inner shaft that lines up with the side opening of the distal outer cannula tip. By attaching the image sensor directly to the microdebrider shaft, visualization of the tissue cutting opening of the microdebrider can be achieved without the need for a separate endoscope or connected endoscope shaft.

Figure 20A:
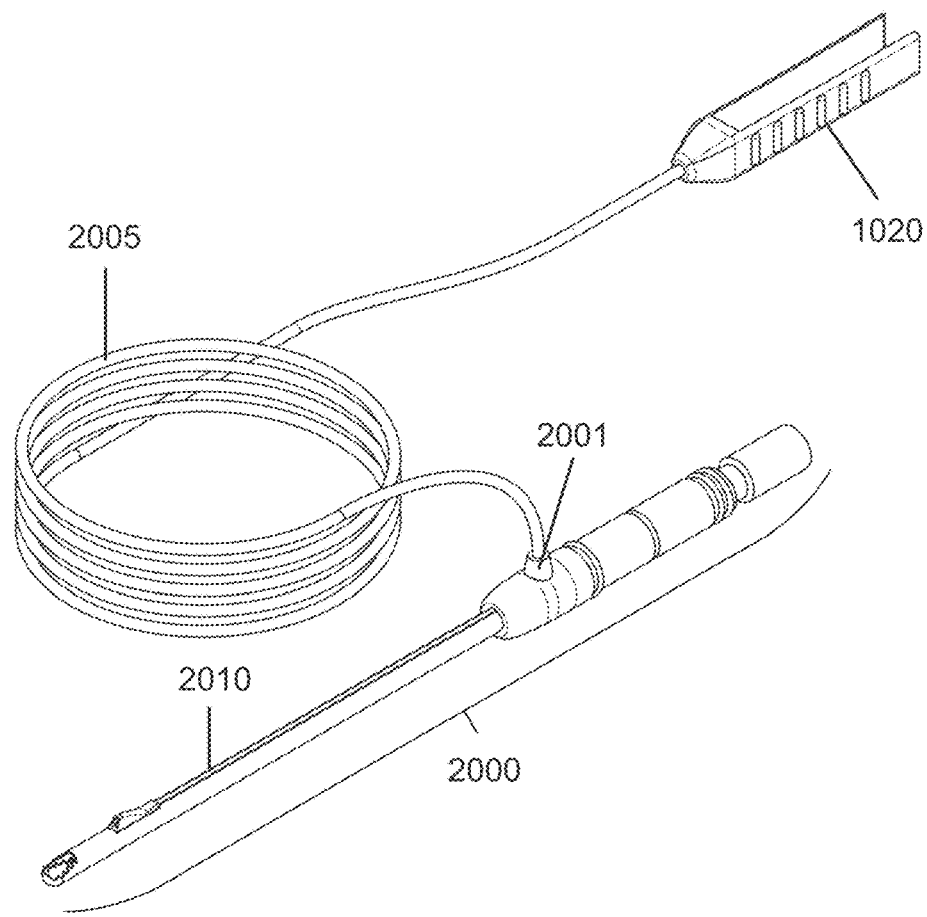
FIG. 20A shows a perspective view of an optically enabled surgical microdebrider that can attach to a modular endoscope system, in accordance with some implementations of the disclosure.
Figure 20B:
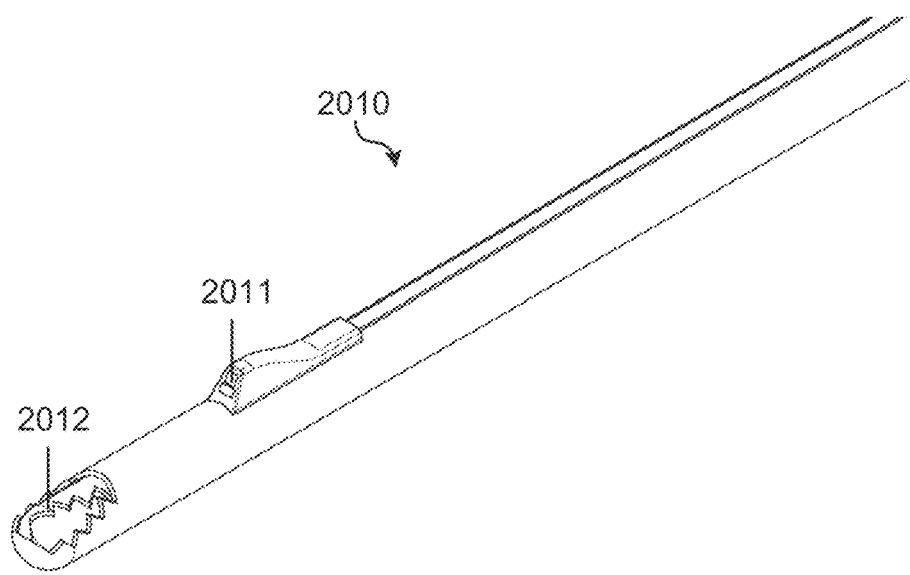
FIG. 20B shows a perspective view of a shaft of the microdebrider of FIG. 20A.

FIGS. 20A-B show a system including an optically enabled microdebrider 2000 including a shaft 2010 without computerized tomography (CT) image guidance capabilities. An open channel connector 1020 is attached via a cable 2005 to a proximal portion 2001 of microdebrider 2000. A distal portion of microdebrider shaft 2010 includes an image sensor 2011 to visualize tissue debridement. It can also include one or more light emitting devices (e.g., LEDs). Image data and electrical power can be delivered through the cable 2005 to a device coupled to open channel connector 1020.

Figure 20C:
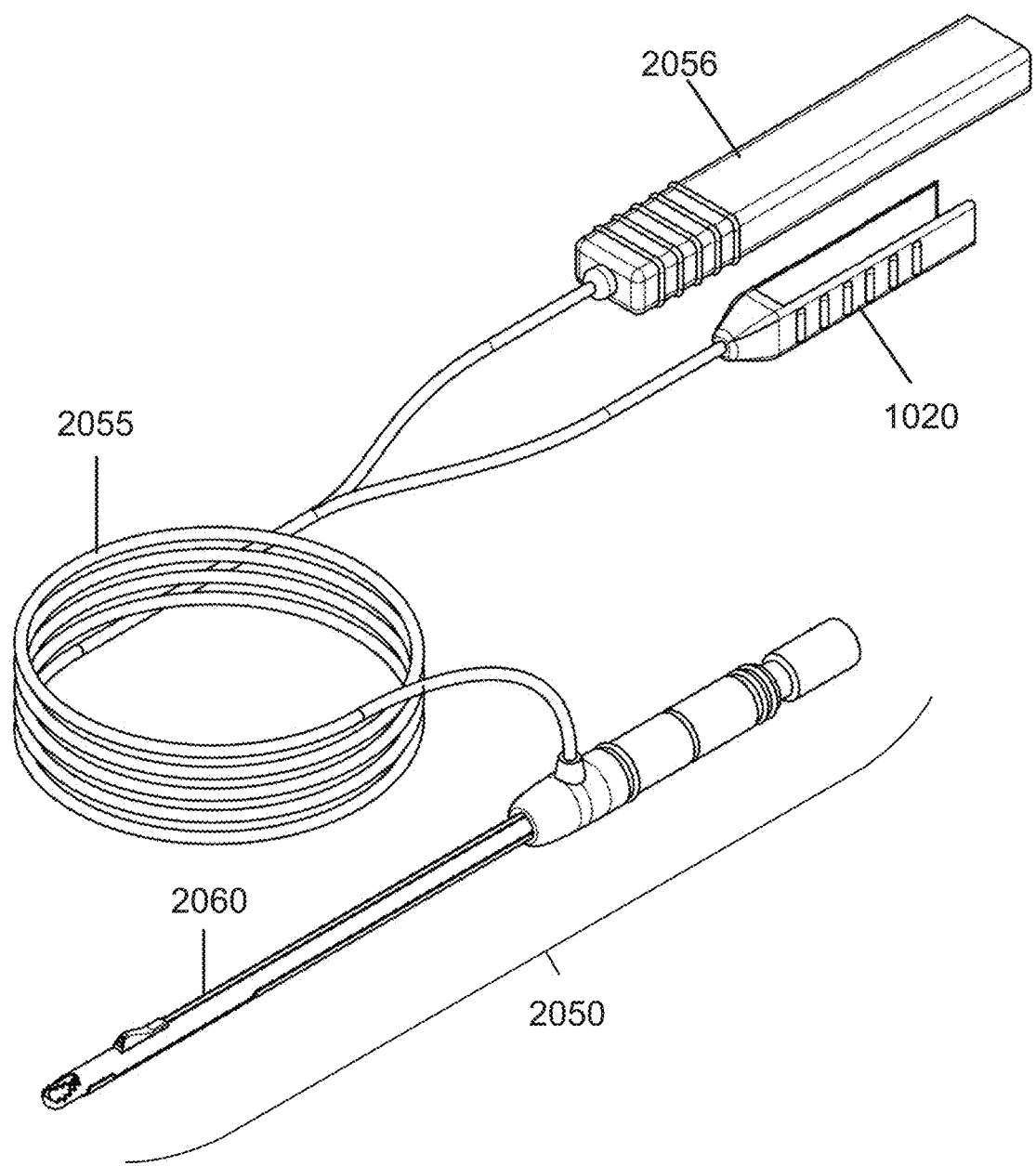
FIG. 20C shows a perspective view of an optically enabled surgical microdebrider with a shaft including image guidance capabilities, which can attach to a modular endoscope system, in accordance with some implementations of the disclosure.
Figure 20D:
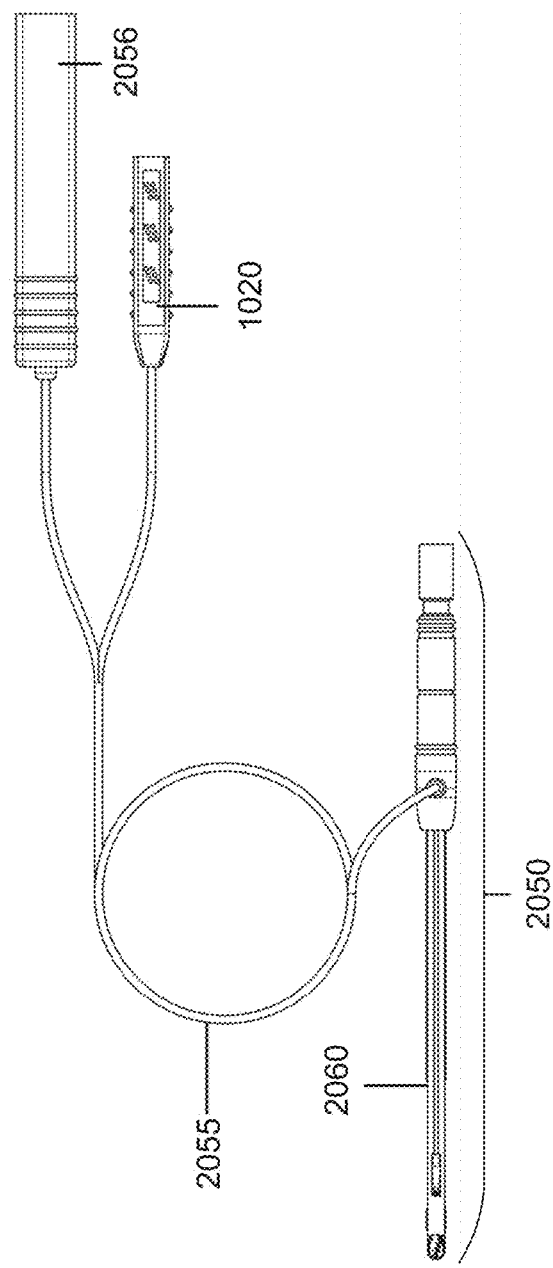
FIG. 20D shows a side view of the optically enabled surgical microdebrider of FIG. 20C.
Figure 20E:
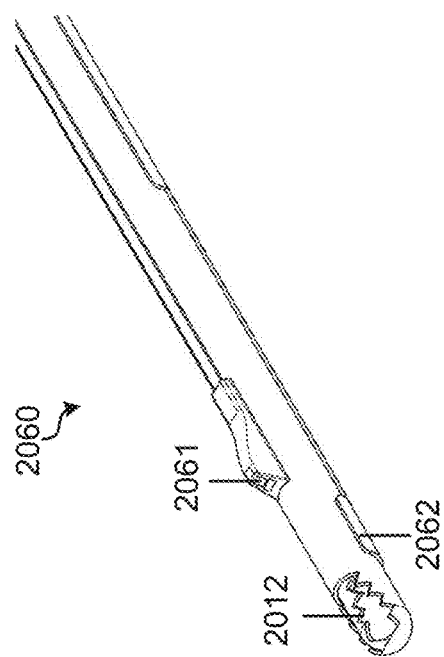
FIG. 20E shows a perspective view of a shaft of the microdebrider of FIG. 20C.

FIGS. 20C-20E show a system including an optically enabled microdebrider 2050 including a shaft 2060 with CT image guidance capabilities. In this implementation, the distal portion of microdebrider shaft 2060 includes a RF image guidance sensor 2062 located distally on the undersurface of the shaft. It also includes an image sensor 2061, and it can also include one or more light emitting devices (e.g., LEDs). A bifurcated cable 2055 extends proximally from microdebrider and with one computer connector 2056 for image guidance and open channel connector 1020 for image and electrical transmission.

Figure 21A:
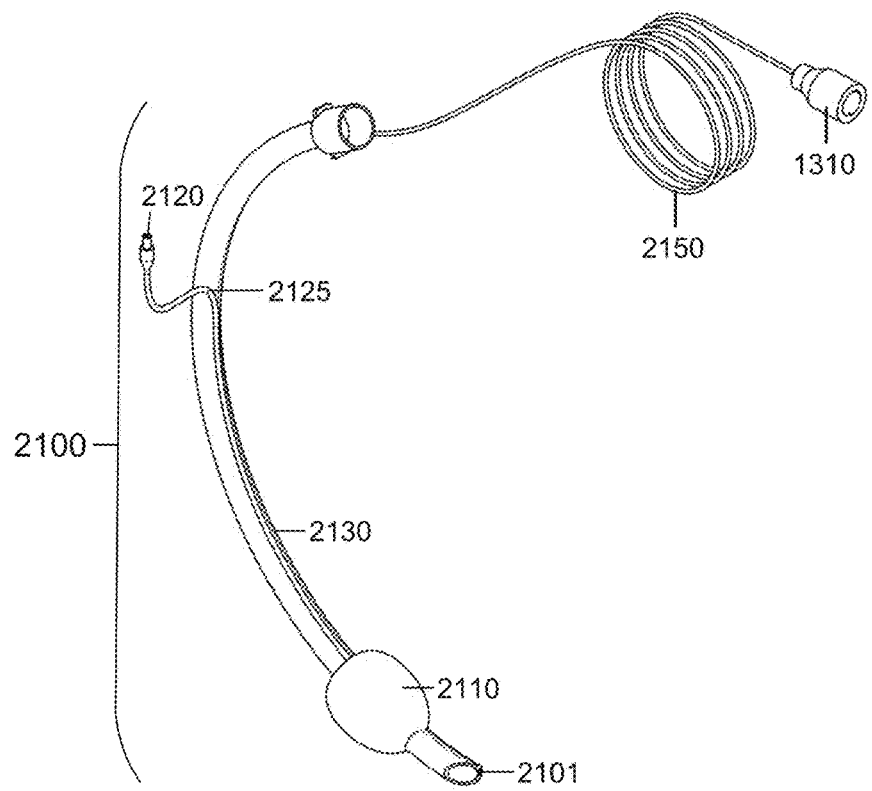
FIG. 21A shows a perspective view of an optically enabled endotracheal tube that can attach to a modular endoscope system, in accordance with some implementations of the disclosure.
Figure 21B:
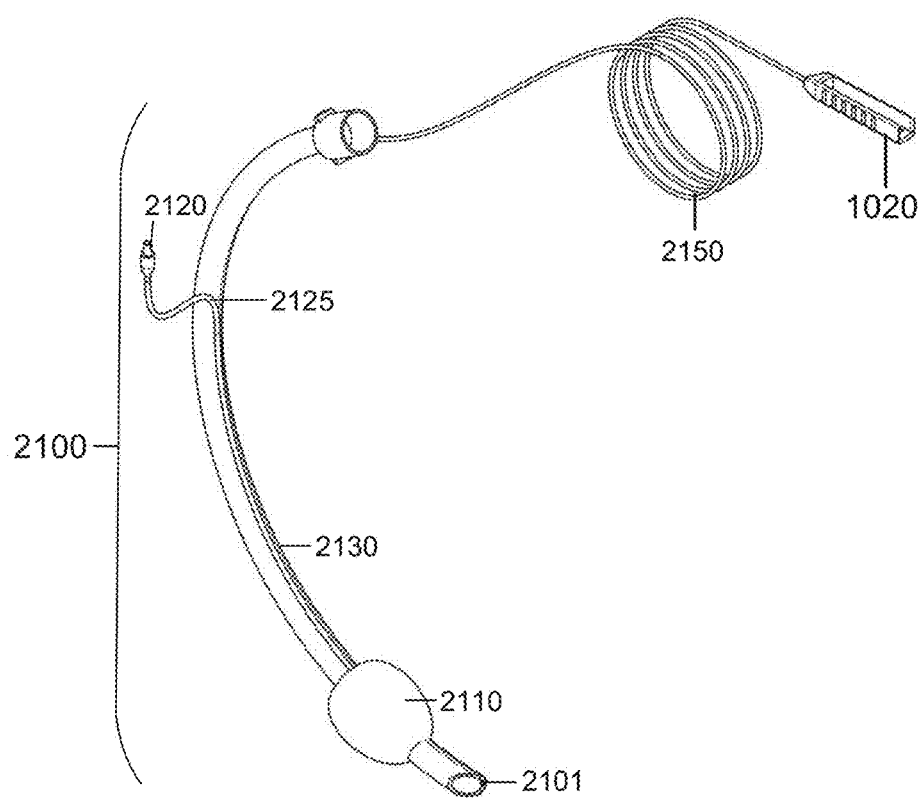
FIG. 21B shows a perspective view of another optically enabled endotracheal tube that can attach to a modular endoscope system, in accordance with some implementations of the disclosure.

FIGS. 21A-21B show example implementations of an optically enabled endotracheal tube 2100 that could attach to the modular endoscopic systems described herein, in accordance with some implementations of the disclosure. An image sensor 2101 with one or more light emitting devices (e.g., LEDs) can be integrated into the tip of the endotracheal tube 2100. A cable 2130 extends from the image sensor 2101, travels along the length of the endotracheal tube 2100 and terminates in a cable 2150 that attaches proximally to a connector. FIG. 21A depicts attachment to an endoscope connector 1310. FIG. 21B depicts attachment to an open channel connector 1020. The connector coupled to endotracheal tube 2100 via cable 2150 can attach to endoscope 10, adapter 900, endoscope housing assembly 500, or some other connector device or connector as described above. A separate inflation tube 2125 and proximal inflation port 2120 are used to inflate the low-pressure balloon cuff 2110 located at the distal end of the endotracheal tube 2100.

Figure 22A:
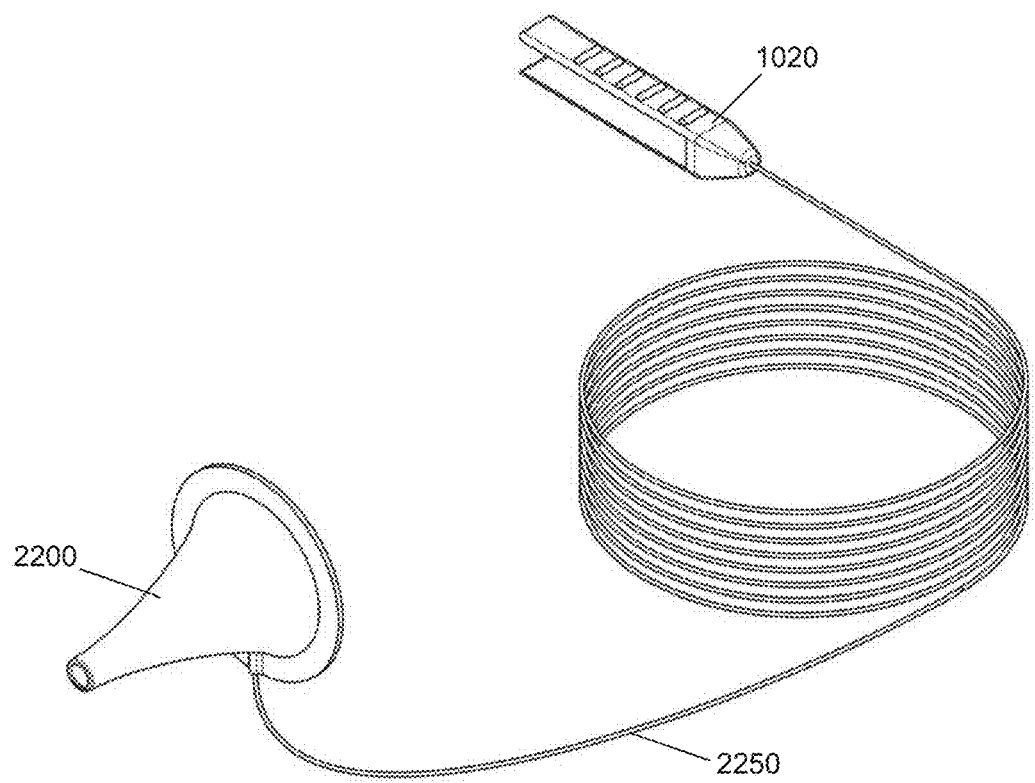
FIG. 22A shows a perspective view of an optically enabled ear speculum that can attach to a modular endoscope system, in accordance with some implementations of the disclosure.
Figure 22B:
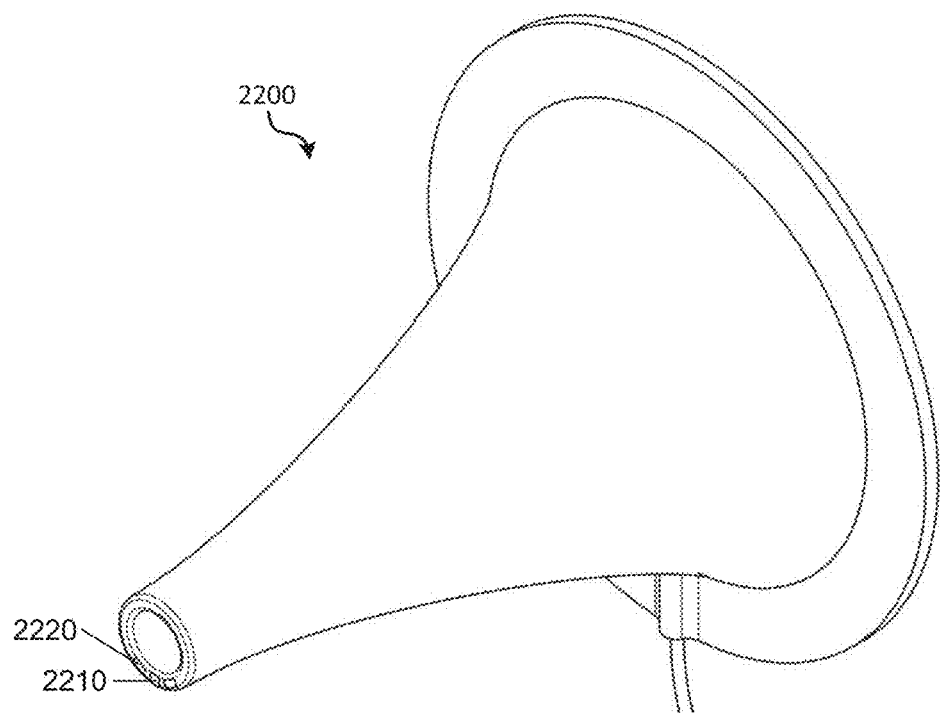
FIG. 22B shows a closeup perspective view of the ear speculum of FIG. 22A.

FIGS. 22A-22B show example implementations of an optically enabled ear speculum 2200 that could attach to the modular endoscopic systems described herein, in accordance with some implementations of the disclosure. Integrated in a tip of the ear speculum 2200 are an image sensor 2210 and one or more light emitting devices 2120 (e.g., LEDs). A cable extends from the image sensor 2210, travels along or through the wall of the ear speculum and terminates in a cable 2250 that attaches proximally to an open channel connector 1020. The open channel connector 1020 coupled to speculum 2100 via cable 2250 can attach to endoscope 10, adapter 900, endoscope housing assembly 500, or some other connector device or connector as described above. In other implementations other connectors as described above besides open channel connector 1020 can instead be included at the end of cable 2250.

The endoscopes, attachment mechanisms, and instruments described herein may be utilized in any suitable application. For example, they may be utilized in Otorhinolaryngologic (Ear, nose, and throat, ENT) surgical applications. They may also be utilized in other surgical and medical specialties such as general surgery, gastroenterology, pulmonology, urology, plastic surgery, neurosurgery, OB/GYN, and orthopedics for applications such as surgical stapling, tissue ablation, arthroscopic surgery, etc. Commercial, non-surgical, applications for the technology disclosed herein are also applicable. It should be noted that the intended modularity of the endoscope systems described herein, by their very nature, provide many possible assemblies, limited only by what components are connected and in what order.

Although described above in terms of various example implementations, it should be understood that the various features, aspects and functionality described in one or more of the individual implementations are not limited in their applicability to the particular implementation with which they are described, but instead can be applied, alone or in various combinations, to one or more of the other implementations of the application, whether or not such implementations are described and whether or not such features are presented as being a part of a described implementation. Thus, the breadth and scope of the present application should not be limited by any of the above-described example implementations.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

To the extent applicable, the terms "first," "second," "third," etc. herein are merely employed to show the respective objects described by these terms as separate entities and are not meant to connote a sense of chronological order, unless stated explicitly otherwise herein.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide some instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various implementations set forth herein are described in terms of example block diagrams, flow charts and other illustrations. As will become apparent to one of ordinary skill in the art after reading this document, the illustrated implementations and their various alternatives can be implemented without confinement to the illustrated examples. For example, block diagrams and their accompanying description should not be construed as mandating a particular architecture or configuration.

While various implementations of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, regarding flow diagrams, operational descriptions and method claims, the order in which the steps are presented herein shall not mandate that various implementations be implemented to perform the recited functionality in the same order unless the context dictates otherwise.

What is claimed is:

1. An endoscope assembly, comprising:
an endoscope housing comprising:
  a distal connector,
  first circuitry configured to receive one or more data signals, and
  second circuitry configured to supply power; and
a rigid attachment segment distally extending from the endoscope housing, the rigid attachment segment comprising:
  a proximal connector configured to removably and electrically couple to the distal connector, the proximal connector including third circuitry configured to electrically couple the rigid attachment segment to the first and second circuitry of the endoscope housing, and
  one or more external, outer surfaces configured to be removably, mechanically, and electrically coupled to an instrument, adapter, or cable connector, wherein:
    the one or more external, outer surfaces comprise a first external, outer surface extending along a longitudinal length of the rigid attachment segment, the first external, outer surface comprising one or more first electrical contacts configured to electrically couple to one or more second electrical contacts of the instrument, the adapter, or the cable connector;
    the instrument, the adapter, or the cable connector is configured to receive power from the endoscope housing or transmit data signals to the endoscope housing when electrically coupled to the one or more external, outer surfaces; and
    the proximal connector is proximal to the one or more external, outer surfaces.

2. The endoscope assembly of claim 1, wherein the one or more external, outer surfaces of the rigid attachment segment further comprise a second external, outer surface extending along the longitudinal length of the rigid attachment segment, the second external, outer surface configured to mechanically couple the rigid attachment segment to the instrument, the adapter, or the cable connector.

3. The endoscope assembly of claim 2, wherein the one or more external, outer surfaces of the rigid attachment segment further comprise a third external, outer surface, opposite the first external, outer surface, the third external, outer surface extending along the longitudinal length of the rigid attachment segment, and the third external, outer surface configured to mechanically couple the rigid attachment segment to the instrument, the adapter, or the cable connector.

4. The endoscope assembly of claim 2, wherein the second external, outer surface comprises a first groove and a first section adjacent the first groove, the first section protruding relative to the first groove and comprising a first recessed indentation or protrusion.

5. The endoscope assembly of claim 2, wherein:
the second external, outer surface comprises multiple grooves and multiple sections alternating along the longitudinal length of the rigid attachment segment;
each of the sections protrudes relative to the grooves and comprises a recessed indentation or protrusion; and
the multiple sections and the multiple grooves are configured such that the instrument, the adapter, or the cable connector can be coupled to the rigid attachment segment in a plurality of lengthwise positions.

6. The endoscope assembly of claim 1, further comprising: an endoscope shaft including a proximal end configured to be fixed or detachably coupled to a distal end of the rigid attachment segment.

7. The endoscope assembly of claim 6, wherein the endoscope shaft is fixed to the distal end of the rigid attachment segment.

8. The endoscope assembly of claim 6, wherein the endoscope shaft is configured to detachably, mechanically, and electrically couple to the distal end of the rigid attachment segment.

9. The endoscope assembly of claim 8, wherein:
the endoscope shaft comprises one or more sensors on a distal end of the endoscope shaft, the one or more sensors configured to generate the one or more data signals; and
the endoscope shaft is configured to be electrically and mechanically coupled to the distal end of the rigid attachment segment such that the endoscope shaft transmits the one or more data signals to the first circuitry.

10. The endoscope assembly of claim 8, wherein: the endoscope shaft comprises one or more light emitting devices, and the second circuitry is configured to supply power to the one or more light emitting devices when the endoscope shaft is coupled to the distal end of the rigid attachment segment.

11. The endoscope assembly of claim 6, wherein:
the one or more external, outer surfaces are configured to be removably, mechanically, and electrically coupled to a handle portion of the instrument; and
the one or more second electrical contacts are on the handle portion of the instrument.

12. The endoscope assembly of claim 6, wherein:
the one or more external, outer surfaces are configured to be removably, mechanically, and electrically coupled to the adapter; and
the one or more second electrical contacts are on the adapter.

13. The endoscope assembly of claim 6, wherein:
the one or more external, outer surfaces are configured to be removably, mechanically, and electrically coupled to a connector on an end of the cable connector; and
the one or more second electrical contacts are on the connector.

14. The endoscope assembly of claim 13, wherein a proximal end of the endoscope housing comprises a connector configured to mechanically and electrically couple the endoscope housing to another cable connector.

15. The endoscope assembly of claim 1, wherein:
the one or more external, outer surfaces are configured to be removably, mechanically, and electrically coupled to a handle portion of the instrument; and
the one or more second electrical contacts are on the handle portion of the instrument.

16. The endoscope assembly of claim 1, wherein:
the one or more external, outer surfaces are configured to be removably, mechanically, and electrically coupled to the adapter; and
the one or more second electrical contacts are on the adapter.

17. The endoscope assembly of claim 1, wherein:
the one or more external, outer surfaces are configured to be removably, mechanically, and electrically coupled to a connector on an end of the cable connector; and
the one or more second electrical contacts are on the connector.

18. The endoscope assembly of claim 1, wherein the first external, outer surface is further configured to mechanically couple the rigid attachment segment to the instrument, the adapter, or the cable connector.

19. The endoscope assembly of claim 1, wherein the endoscope housing is configured to receive data signals from the instrument, the adapter, or the cable connector when the instrument, the adapter, or the cable connector is electrically coupled to the one or more external, outer surfaces.

20. The endoscope assembly of claim 19, wherein the data signals comprise image sensor data.

21. The endoscope assembly of claim 1, wherein:
the one or more external, outer surfaces are configured to be removably, mechanically, and electrically coupled to a handle portion of the instrument; and
the one or more external, outer surfaces are configured to be removably, mechanically, and electrically coupled to a connector on an end of the cable connector.

22. The endoscope assembly of claim 21, wherein:
the one or more external, outer surfaces are configured to be removably, mechanically, and electrically coupled to the adapter.

23. The endoscope assembly of claim 1, wherein:
the one or more external, outer surfaces are configured to be removably, mechanically, and electrically coupled to a handle portion of the instrument; and
the one or more external, outer surfaces are configured to be removably, mechanically, and electrically coupled to the adapter.

24. The endoscope assembly of claim 1, wherein:
the one or more external, outer surfaces are configured to be removably, mechanically, and electrically coupled to a connector on an end of the cable connector; and
the one or more external, outer surfaces are configured to be removably, mechanically, and electrically coupled to the adapter.

25. The endoscope assembly of claim 1, wherein: the one or more second electrical contacts are on an external, outer surface within an open channel of a handle portion of the instrument, a connector of the cable connector, or the adapter.

26. An endoscope assembly, comprising:
an endoscope housing comprising first circuitry configured to receive one or more data signals, and second circuitry configured to supply power; and
a rigid attachment segment distally extending from the endoscope housing, the rigid attachment segment comprising:
  third circuitry configured to electrically couple the rigid attachment segment to the first and second circuitry of the endoscope housing, and
  one or more external, outer surfaces configured to be removably, mechanically, and electrically coupled to an instrument, adapter, or cable connector, wherein:
    the one or more external, outer surfaces comprise a first external, outer surface extending along a longitudinal length of the rigid attachment segment, the first external, outer surface comprising one or more first electrical contacts configured to electrically couple to one or more second electrical contacts of the instrument, the adapter, or the cable connector;
    the instrument, the adapter, or the cable connector is configured to receive power from the endoscope housing or transmit data signals to the endoscope housing when electrically coupled to the one or more external, outer surfaces;
    the first external, outer surface is further configured to mechanically couple the rigid attachment segment to the instrument, the adapter, or the cable connector;
    the first external, outer surface comprises multiple grooves and multiple sections alternating along the longitudinal length of the rigid attachment segment;
    each of the sections protrudes relative to the grooves and comprises a recessed indentation or protrusion; and
    the multiple sections and the multiple grooves are configured such that the instrument, the adapter, or the cable connector can be coupled to the rigid attachment segment in a plurality of lengthwise positions.

27. An endoscope assembly, comprising:
an endoscope housing comprising first circuitry configured to receive one or more data signals, and second circuitry configured to supply power; and
a rigid attachment segment distally extending from the endoscope housing, the rigid attachment segment comprising:
  third circuitry configured to electrically couple the rigid attachment segment to the first and second circuitry of the endoscope housing, and
  one or more external, outer surfaces configured to be removably, mechanically, and electrically coupled to an instrument, adapter, or cable connector; and
an endoscope shaft including a proximal end configured to detachably couple to a distal end of the rigid attachment segment,
wherein:
  the one or more external, outer surfaces comprise a first external, outer surface extending along a longitudinal length of the rigid attachment segment, the first external, outer surface comprising one or more first electrical contacts configured to electrically couple to one or more second electrical contacts of the instrument, the adapter, or the cable connector;
  the instrument, the adapter, or the cable connector is configured to receive power from the endoscope housing or transmit data signals to the endoscope housing when electrically coupled to the one or more external, outer surfaces;
  the endoscope shaft is configured to detachably, mechanically, and electrically couple to the distal end of the rigid attachment segment; and
  the rigid attachment segment is configured to detachably, mechanically, and electrically couple to a distal end of the endoscope housing.

* * * * *